US011943406B2

(12) United States Patent
d'Armancourt et al.

(10) Patent No.: US 11,943,406 B2
(45) Date of Patent: Mar. 26, 2024

(54) METHODS, APPARATUSES, AND SYSTEMS FOR DETECTING PRINTING DEFECTS AND CONTAMINATED COMPONENTS OF A PRINTER

(71) Applicant: Hand Held Products, Inc., Charlotte, NC (US)

(72) Inventors: Sebastien d'Armancourt, Singapore (SG); Thomas Axel Jonas Celinder, Singapore (SG); H Sprague Ackley, Seattle, WA (US); Glenn David Aspenns, Cincinnati, OH (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/146,201

(22) Filed: Dec. 23, 2022

(65) Prior Publication Data
US 2023/0125920 A1 Apr. 27, 2023

Related U.S. Application Data

(63) Continuation of application No. 17/301,259, filed on Mar. 30, 2021, now Pat. No. 11,570,321, which is a
(Continued)

(51) Int. Cl.
*H04N 1/00* (2006.01)
*G06K 5/02* (2006.01)
(Continued)

(52) U.S. Cl.
CPC .......... *H04N 1/00737* (2013.01); *G06K 5/02* (2013.01); *G06T 7/0002* (2013.01); *G06T 7/001* (2013.01);
(Continued)

(58) Field of Classification Search
CPC .......... G06T 2207/30144; G06T 7/001; G06T 2207/10008; G06T 7/0008; G06T 7/0002;
(Continued)

(56) References Cited

U.S. PATENT DOCUMENTS 4,699,531 A 10/1987 Ulinski et al.
5,051,567 A 9/1991 Tedesco
(Continued)

FOREIGN PATENT DOCUMENTS

EP 1085452 A2 3/2001
EP 2270746 1/2011
(Continued)

OTHER PUBLICATIONS

US 8,548,242 B1, 10/2013, Longacre (withdrawn)
(Continued)

*Primary Examiner* — Negussie Worku
(74) *Attorney, Agent, or Firm* — Alston & Bird LLP

(57) ABSTRACT

A method for printing defect detection includes processing and analyzing a difference image obtained by comparing an image scanned with a verifier to a reference image. The detected defects are grouped, and the grouping is refined. Confidence level values are then assigned to the refined groups, and analysis is performed to determine if one or more servicing actions should be taken.

18 Claims, 37 Drawing Sheets

Related U.S. Application Data continuation of application No. 16/790,417, filed on Feb. 13, 2020, now Pat. No. 10,999,460, which is a continuation of application No. 16/240,140, filed on Jan. 4, 2019, now Pat. No. 10,834,283.

(60) Provisional application No. 62/614,089, filed on Jan. 5, 2018.

(51) Int. Cl.
*G06T 7/00* (2017.01)
*G06T 7/254* (2017.01)

(52) U.S. Cl.
CPC ......... *G06T 7/254* (2017.01); *H04N 1/00005* (2013.01); *H04N 1/00015* (2013.01); *H04N 1/00029* (2013.01); *H04N 1/00037* (2013.01); *H04N 1/00039* (2013.01); *H04N 1/00045* (2013.01); *H04N 1/00082* (2013.01); *G06T 2207/30144* (2013.01)

(58) Field of Classification Search
CPC . G06T 2207/10024; G06T 2207/30176; G06T 7/254; G06T 2207/30168; G06T 7/90; G06T 2207/20081; G06T 2207/20092; G06T 2207/20021; G06T 2200/24; G06T 7/33; G06T 1/00; G06T 2207/20224; G06T 7/0004; G06T 7/11; G06T 7/12; G06T 7/13; G06T 7/73; H04N 1/00005; H04N 1/00045; H04N 1/00015; H04N 1/00082; H04N 1/00029; H04N 1/00031; H04N 1/0005; H04N 1/00068; H04N 1/00037; H04N 1/6036; H04N 1/00039; H04N 1/00737; H04N 1/4097; H04N 1/00047; H04N 1/00076; H04N 1/00034; H04N 1/00063; H04N 1/00058; H04N 1/40; H04N 1/605; H04N 1/444; H04N 1/6027; H04N 1/00002; H04N 1/00013; H04N 1/00042; H04N 1/00074; H04N 1/0009; H04N 1/00641; H04N 1/00702; H04N 1/00801; H04N 1/4095; H04N 1/56; H04N 1/6038; H04N 2201/0082; H04N 1/00053; H04N 1/00055; H04N 1/00079; H04N 1/00084; H04N 1/00087; H04N 1/00307; H04N 1/00411; H04N 1/00477; H04N 1/0049; H04N 1/00631; H04N 1/00973; H04N 1/29; H04N 1/3872; H04N 1/40006; H04N 1/40068; H04N 1/6008; H04N 1/6016; H04N 1/6033; H04N 1/6041; B26D 5/007; B26D 7/18; B26D 7/0633; B26D 7/1818; B65H 29/585; B65H 2301/44712; B65H 2301/4473; B65H 2701/1764; B65H 2801/42; B65H 29/044; B65H 2404/2693; B65H 2301/44732; B65H 2402/51; B65H 2403/513; B65H 2701/1762; B65H 29/00; B65H 29/047; B65H 29/58; B65H 29/6618; B65H 29/041; B65H 35/0006; B65H 2404/2691; B65H 29/16; B65H 29/18; B65H 2701/1131; B65H 3/063; G06F 3/1208; G06F 3/121; G06F 3/122; G06F 3/1244; G06F 3/1253; G06F 3/1256; G06F 3/1282
USPC ...................................................... 358/518
See application file for complete search history.

(56) References Cited

U.S. PATENT DOCUMENTS

| | | | |
|---|---|---|---|
| 5,218,190 A | 6/1993 | Hardesty et al. | |
| 5,272,322 A | 12/1993 | Nishida et al. | |
| 5,318,938 A | 6/1994 | Hampl et al. | |
| 5,488,223 A | 1/1996 | Austin et al. | |
| 5,488,233 A | 1/1996 | Ishikawa et al. | |
| 5,521,368 A | 5/1996 | Adachi | |
| 5,564,841 A | 10/1996 | Austin et al. | |
| 5,761,336 A | 6/1998 | Xu et al. | |
| 5,845,008 A * | 12/1998 | Katoh | G07D 7/20 382/137 |
| 5,914,474 A | 6/1999 | Spitz | |
| 6,036,091 A | 3/2000 | Spitz | |
| 6,042,279 A | 3/2000 | Ackley | |
| 6,323,949 B1 | 11/2001 | Lading et al. | |
| 6,511,141 B1 | 1/2003 | Hasegawa et al. | |
| 6,535,299 B1 | 3/2003 | Scherz | |
| 6,567,530 B1 | 5/2003 | Keronen et al. | |
| 6,741,727 B1 | 5/2004 | Hirasawa | |
| 6,763,148 B1 * | 7/2004 | Sternberg | G06V 20/00 707/E17.02 |
| 6,832,725 B2 | 12/2004 | Gardiner et al. | |
| 6,997,627 B2 | 2/2006 | Chiu | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,440,123 B2 | 10/2008 | Chodagiri et al. | |
| 7,471,331 B2 | 12/2008 | Kaneda | |
| 7,519,222 B2 * | 4/2009 | Kisilev | G06T 7/001 382/192 |
| 7,570,788 B2 | 8/2009 | Tsukamoto et al. | |
| 7,600,687 B2 | 10/2009 | Biss et al. | |
| 7,726,575 B2 | 6/2010 | Wang et al. | |
| 7,869,112 B2 | 1/2011 | Borchers et al. | |
| 7,877,004 B2 | 1/2011 | Maruyama et al. | |
| 7,920,283 B2 | 4/2011 | Shimazaki | |
| 7,936,365 B2 | 5/2011 | Jeong | |
| 8,189,229 B2 | 5/2012 | Mori | |
| 8,269,836 B2 | 9/2012 | Zandifar et al. | |
| 8,294,945 B2 | 10/2012 | Natori | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,355,058 B2 | 1/2013 | Shirai | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,482,809 B2 | 7/2013 | Mikami | |
| 8,488,181 B2 | 7/2013 | Wu et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |

(56) References Cited

U.S. PATENT DOCUMENTS

| | | |
|---|---|---|
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,030 B2 | 1/2014 | Chung et al. |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,675,266 B2 | 3/2014 | Watts |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,914 B2 | 5/2014 | French |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,768,102 B1 | 7/2014 | Ng et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,817,327 B2 | 8/2014 | Kamijima |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,085 B2 | 11/2014 | Vandemark et al. |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,037 B1 | 5/2015 | Rudin et al. |
| 9,036,054 B2 | 5/2015 | Koziol et al. |

(56) References Cited

U.S. PATENT DOCUMENTS

| | | |
|---|---|---|
| 9,037,344 B2 | 5/2015 | Chamberlin |
| 9,038,911 B2 | 5/2015 | Xian et al. |
| 9,038,915 B2 | 5/2015 | Smith |
| 9,041,762 B2 | 5/2015 | Bai et al. |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,053,055 B2 | 6/2015 | Caballero |
| 9,053,378 B1 | 6/2015 | Hou et al. |
| 9,053,380 B2 | 6/2015 | Xian et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,079,423 B2 | 7/2015 | Bouverie et al. |
| 9,093,141 B2 | 7/2015 | Liu |
| 9,104,934 B2 | 8/2015 | Li et al. |
| 9,111,166 B2 | 8/2015 | Cunningham, IV |
| 9,137,009 B1 | 9/2015 | Gardiner |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,171,539 B2 | 10/2015 | Funyak et al. |
| 9,171,543 B2 | 10/2015 | Emerick et al. |
| 9,174,457 B1 | 11/2015 | Aihara et al. |
| 9,183,425 B2 | 11/2015 | Wang |
| 9,189,669 B2 | 11/2015 | Zhu et al. |
| 9,219,836 B2 | 12/2015 | Bouverie et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,245,492 B2 | 1/2016 | Ackley et al. |
| 9,248,640 B2 | 2/2016 | Heng |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,282,501 B2 | 3/2016 | Wang et al. |
| 9,292,969 B2 | 3/2016 | Laffargue et al. |
| 9,298,667 B2 | 3/2016 | Caballero |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,310,609 B2 | 4/2016 | Rueblinger et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,724 B2 | 5/2016 | McCloskey et al. |
| 9,342,827 B2 | 5/2016 | Smith |
| 9,355,294 B2 | 5/2016 | Smith et al. |
| 9,361,536 B1 | 6/2016 | Howe et al. |
| 9,361,882 B2 | 6/2016 | Ressler et al. |
| 9,365,381 B2 | 6/2016 | Colonel et al. |
| 9,367,722 B2 | 6/2016 | Xian et al. |
| 9,373,018 B2 | 6/2016 | Colavito et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,411,386 B2 | 8/2016 | Sauerwein, Jr. |
| 9,412,242 B2 | 8/2016 | Van et al. |
| 9,418,252 B2 | 8/2016 | Nahill et al. |
| 9,418,269 B2 | 8/2016 | Havens et al. |
| 9,418,270 B2 | 8/2016 | Van Volkinburg et al. |
| 9,423,318 B2 | 8/2016 | Liu et al. |
| D766,244 S | 9/2016 | Zhou et al. |
| 9,443,123 B2 | 9/2016 | Hejl |
| 9,443,222 B2 | 9/2016 | Singel et al. |
| 9,448,610 B2 | 9/2016 | Davis et al. |
| 9,454,689 B2 | 9/2016 | McCloskey et al. |
| 9,478,113 B2 | 10/2016 | Xie et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| D777,166 S | 1/2017 | Bidwell et al. |
| 9,557,166 B2 | 1/2017 | Thuries et al. |
| 9,558,386 B2 | 1/2017 | Yeakley |
| 9,564,035 B2 | 2/2017 | Ackley et al. |
| 9,569,837 B2 | 2/2017 | Madden et al. |
| 9,582,696 B2 | 2/2017 | Barber et al. |
| 9,606,581 B1 | 3/2017 | Howe et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,641,700 B2 | 5/2017 | Schumann et al. |
| 9,646,189 B2 | 5/2017 | Lu et al. |
| 9,646,200 B2 | 5/2017 | Archibald et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,183 B2 | 5/2017 | Zhu et al. |
| 9,659,198 B2 | 5/2017 | Giordano et al. |
| 9,659,670 B2 | 5/2017 | Choi et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,712,758 B2 | 7/2017 | Noda |
| 9,715,614 B2 | 7/2017 | Todeschini et al. |
| 9,734,493 B2 | 8/2017 | Gomez et al. |
| 9,752,864 B2 | 9/2017 | Laffargue et al. |
| 9,762,793 B2 | 9/2017 | Ackley et al. |
| 9,767,581 B2 | 9/2017 | Todeschini |
| 9,786,101 B2 | 10/2017 | Ackley |
| 9,794,392 B2 | 10/2017 | Hejl |
| 9,823,059 B2 | 11/2017 | Li et al. |
| 9,826,106 B2 | 11/2017 | Ackley |
| 9,852,102 B2 | 12/2017 | Kohtz et al. |
| 9,857,167 B2 | 1/2018 | Jovanovski et al. |
| 9,861,182 B2 | 1/2018 | Oberpriller et al. |
| 9,891,612 B2 | 2/2018 | Charpentier et al. |
| 9,892,876 B2 | 2/2018 | Bandringa |
| 9,897,434 B2 | 2/2018 | Ackley et al. |
| 9,898,814 B2 | 2/2018 | Kitai et al. |

(56) References Cited

U.S. PATENT DOCUMENTS

| | | |
|---|---|---|
| 9,924,006 B2 | 3/2018 | Schoon et al. |
| 9,930,050 B2 | 3/2018 | Yeakley et al. |
| 9,954,871 B2 | 4/2018 | Hussey et al. |
| 9,978,088 B2 | 5/2018 | Pape |
| 9,984,685 B2 | 5/2018 | Braho et al. |
| 10,007,112 B2 | 6/2018 | Fitch et al. |
| 10,019,334 B2 | 7/2018 | Caballero et al. |
| 10,021,043 B2 | 7/2018 | Sevier |
| 10,038,716 B2 | 7/2018 | Todeschini et al. |
| 10,060,729 B2 | 8/2018 | Laffargue et al. |
| 10,066,982 B2 | 9/2018 | Ackley et al. |
| 10,121,466 B2 | 11/2018 | Pecorari |
| 10,139,495 B2 | 11/2018 | Payne |
| 10,195,880 B2 | 2/2019 | D'Armancourt |
| 10,269,342 B2 | 4/2019 | Braho et al. |
| 10,427,424 B2 | 10/2019 | Creencia et al. |
| 10,546,160 B2 | 1/2020 | Sprague et al. |
| 10,552,848 B2 | 2/2020 | Soborski |
| 10,621,470 B2 | 4/2020 | Ackley |
| 10,628,723 B2 | 4/2020 | D'Armancourt et al. |
| 10,672,588 B1 | 6/2020 | Pathangi et al. |
| 10,795,618 B2 | 10/2020 | Gutierrez et al. |
| 10,834,283 B2 | 11/2020 | D'Armancourt et al. |
| 10,999,460 B2 | 5/2021 | D'Armancourt et al. |
| 11,157,217 B2 | 10/2021 | Gutierrez et al. |
| 11,210,483 B2 | 12/2021 | Ackley et al. |
| 2001/0016054 A1 | 8/2001 | Banker et al. |
| 2001/0035971 A1 | 11/2001 | Koakutsu et al. |
| 2002/0067925 A1 | 6/2002 | Yamano |
| 2002/0181805 A1 | 12/2002 | Loeb et al. |
| 2003/0102376 A1 | 6/2003 | Meier et al. |
| 2004/0029068 A1 | 2/2004 | Sachdeva et al. |
| 2004/0033098 A1 | 2/2004 | Chiu |
| 2004/0036089 A1 | 2/2004 | Chen |
| 2004/0057768 A1 | 3/2004 | Oshino et al. |
| 2004/0120569 A1 | 6/2004 | Hung et al. |
| 2004/0156630 A1 | 8/2004 | Tsukamoto et al. |
| 2005/0105104 A1 | 5/2005 | Sakai et al. |
| 2006/0012664 A1 | 1/2006 | Jeong |
| 2006/0039690 A1 | 2/2006 | Steinberg et al. |
| 2006/0110024 A1* | 5/2006 | Wakabayashi ......... G06T 7/0006 382/141 |
| 2006/0197795 A1 | 9/2006 | Takatsuka et al. |
| 2006/0269342 A1 | 11/2006 | Yoshida et al. |
| 2007/0139703 A1 | 6/2007 | Shimamura et al. |
| 2007/0146755 A1 | 6/2007 | Mindler et al. |
| 2007/0195337 A1 | 8/2007 | Takayama et al. |
| 2008/0144080 A1 | 6/2008 | Randt |
| 2008/0185432 A1 | 8/2008 | Caballero et al. |
| 2008/0218551 A1 | 9/2008 | Inaba |
| 2009/0002749 A1 | 1/2009 | Koyano |
| 2009/0058348 A1 | 3/2009 | Ryu |
| 2009/0085952 A1 | 4/2009 | Yamazaki |
| 2009/0087022 A1 | 4/2009 | Fukuda et al. |
| 2009/0134221 A1 | 5/2009 | Zhu et al. |
| 2009/0316161 A1 | 12/2009 | Yamaguchi et al. |
| 2010/0165022 A1 | 7/2010 | Makuta et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0182618 A1 | 7/2010 | Akiyama et al. |
| 2010/0188714 A1 | 7/2010 | Yamakawa |
| 2010/0265880 A1 | 10/2010 | Rautiola et al. |
| 2011/0102850 A1 | 5/2011 | Watanabe |
| 2011/0109918 A1 | 5/2011 | Conlon et al. |
| 2011/0202554 A1 | 8/2011 | Powilleit et al. |
| 2011/0286043 A1 | 11/2011 | Hagisawa et al. |
| 2011/0292435 A1 | 12/2011 | Cok et al. |
| 2012/0039384 A1* | 2/2012 | Reznik ............... H04N 19/61 375/E7.23 |
| 2012/0085823 A1 | 4/2012 | Nakamura |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0182374 A1 | 7/2012 | Matsuda et al. |
| 2012/0182571 A1 | 7/2012 | Wu et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2012/0263483 A1 | 10/2012 | Suzuki |
| 2012/0330447 A1 | 12/2012 | Gerlach et al. |
| 2013/0038670 A1 | 2/2013 | Chen |
| 2013/0043312 A1 | 2/2013 | Van Horn |
| 2013/0082104 A1 | 4/2013 | Kearney et al. |
| 2013/0148987 A1 | 6/2013 | Arakawa |
| 2013/0153661 A1 | 6/2013 | Yamaguchi |
| 2013/0175341 A1 | 7/2013 | Kearney et al. |
| 2013/0175343 A1 | 7/2013 | Good |
| 2013/0250369 A1 | 9/2013 | Kitai et al. |
| 2013/0250370 A1 | 9/2013 | Kojima et al. |
| 2013/0257744 A1 | 10/2013 | Daghigh et al. |
| 2013/0257759 A1 | 10/2013 | Daghigh |
| 2013/0258368 A1 | 10/2013 | Shigemoto et al. |
| 2013/0259301 A1 | 10/2013 | Chen et al. |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0322701 A1 | 12/2013 | Szymanski |
| 2013/0332996 A1 | 12/2013 | Fiala et al. |
| 2013/0335759 A1 | 12/2013 | Hirose |
| 2013/0342717 A1 | 12/2013 | Havens et al. |
| 2014/0001267 A1 | 1/2014 | Giordano et al. |
| 2014/0002842 A1 | 1/2014 | Ito |
| 2014/0008439 A1 | 1/2014 | Wang |
| 2014/0009529 A1 | 1/2014 | Teshigawara et al. |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078345 A1 | 3/2014 | Showering |
| 2014/0079292 A1 | 3/2014 | Kaneko et al. |
| 2014/0097249 A1 | 4/2014 | Gomez et al. |
| 2014/0098792 A1 | 4/2014 | Wang et al. |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |

(56) References Cited

U.S. PATENT DOCUMENTS

| | | |
|---|---|---|
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166759 A1 | 6/2014 | Liu et al. |
| 2014/0168709 A1 | 6/2014 | Tokumaru |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191684 A1 | 7/2014 | Valois |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | Digregorio |
| 2014/0278391 A1 | 9/2014 | Braho et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0291401 A1 | 10/2014 | Nakamura |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0060544 A1 | 3/2015 | Feng et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0063889 A1* | 3/2015 | Kojima .................. G03G 15/36 399/394 |
| 2015/0069130 A1 | 3/2015 | Gannon |
| 2015/0071819 A1 | 3/2015 | Todeschini |
| 2015/0078627 A1 | 3/2015 | Fukase |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Tao |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0193644 A1 | 7/2015 | Kearney et al. |
| 2015/0220753 A1 | 8/2015 | Zhu et al. |
| 2015/0221077 A1 | 8/2015 | Kawabata et al. |
| 2015/0281019 A1 | 10/2015 | Hashizume |
| 2015/0312780 A1 | 10/2015 | Wang et al. |
| 2015/0324623 A1 | 11/2015 | Powilleit |
| 2015/0327012 A1 | 11/2015 | Bian et al. |
| 2016/0025697 A1 | 1/2016 | Alt et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0104019 A1 | 4/2016 | Todeschini et al. |
| 2016/0104274 A1 | 4/2016 | Jovanovski et al. |
| 2016/0117627 A1 | 4/2016 | Raj et al. |
| 2016/0125217 A1 | 5/2016 | Todeschini |
| 2016/0125342 A1 | 5/2016 | Miller et al. |
| 2016/0171597 A1 | 6/2016 | Todeschini |
| 2016/0171666 A1 | 6/2016 | McCloskey |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |

(56) References Cited

U.S. PATENT DOCUMENTS

| | | |
|---|---|---|
| 2016/0180594 A1 | 6/2016 | Todeschini |
| 2016/0180663 A1 | 6/2016 | McMahan et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz, Sr. et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0255241 A1 | 9/2016 | Harashima et al. |
| 2016/0282807 A1 | 9/2016 | Kinoshita et al. |
| 2016/0292477 A1 | 10/2016 | Bidwell |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0327614 A1 | 11/2016 | Young et al. |
| 2016/0343163 A1 | 11/2016 | Venkatesha et al. |
| 2016/0364914 A1 | 12/2016 | Todeschini |
| 2016/0373847 A1 | 12/2016 | Vargo et al. |
| 2016/0377414 A1 | 12/2016 | Thuries et al. |
| 2017/0010141 A1 | 1/2017 | Ackley |
| 2017/0010328 A1 | 1/2017 | Mullen et al. |
| 2017/0010780 A1 | 1/2017 | Waldron, Jr. et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0060494 A1 | 3/2017 | Palmen et al. |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0083734 A1 | 3/2017 | Henning et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0111523 A1 | 4/2017 | Ackley |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0182819 A1 | 6/2017 | Gonzalez et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van Horn et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2017/0206643 A1 | 7/2017 | Weiss et al. |
| 2017/0309011 A1 | 10/2017 | Hori et al. |
| 2018/0007215 A1 | 1/2018 | Zakharov |
| 2018/0131815 A1 | 5/2018 | Spivakovsky et al. |
| 2018/0198937 A1* | 7/2018 | Yoshizawa ......... H04N 1/00702 |
| 2018/0227463 A1 | 8/2018 | Fukase |
| 2018/0268534 A1 | 9/2018 | Kaneko |
| 2019/0116275 A1 | 4/2019 | Edwards et al. |
| 2019/0213369 A1 | 7/2019 | Ackley et al. |
| 2019/0215410 A1 | 7/2019 | D'Armancourt et al. |
| 2020/0082131 A1* | 3/2020 | Ackley ............. H04N 1/00331 |
| 2020/0145546 A1 | 5/2020 | Alaganchetty et al. |
| 2020/0234422 A1* | 7/2020 | Esumi ................ H04N 1/00005 |
| 2021/0045268 A1* | 2/2021 | Easton .................... H02B 5/00 |
| 2021/0197601 A1 | 7/2021 | Celinder et al. |
| 2021/0218857 A1 | 7/2021 | D'Armancourt et al. |
| 2021/0295117 A1* | 9/2021 | Lim .................... H04N 1/2323 |
| 2021/0405938 A1 | 12/2021 | Gutierrez et al. |
| 2022/0067316 A1 | 3/2022 | Ackley |
| 2022/0222500 A1 | 7/2022 | Ackley |
| 2023/0041346 A1 | 2/2023 | Ackley et al. |

FOREIGN PATENT DOCUMENTS

| | | |
|---|---|---|
| EP | 3336770 | 6/2018 |
| JP | 09-027049 A | 1/1997 |
| JP | 2002-281287 A | 9/2002 |
| JP | 2004-341764 A | 12/2004 |
| JP | 4644283 B2 | 3/2011 |
| JP | 2011-110777 A | 6/2011 |
| JP | 2013-151126 A | 8/2013 |
| KR | 10-0767433 B1 | 10/2007 |
| WO | 2013/163789 | 11/2013 |
| WO | 2013/173985 | 11/2013 |
| WO | 2014/019130 | 2/2014 |
| WO | 2014/110495 | 7/2014 |

OTHER PUBLICATIONS

US 8,616,454 B2, 12/2013, Havens et al. (withdrawn)
U.S. Appl. No. 17/301,259, filed Mar. 30, 2021, U.S. Pat. No. 11,570,321, Patented.
U.S. Appl. No. 17/790,417, filed Feb. 13, 2020, U.S. Pat. No. 10,999,460, Patented.
U.S. Appl. No. 16/240,140, filed Jan. 4, 2019, U.S. Pat. No. 10,834,283, Patented.
Notice of Allowance and Fees Due (PTOL-85) dated Feb. 27, 2023 for U.S. Appl. No. 17/468,425.
Notice of Allowance and Fees Due (PTOL-85) dated Jan. 25, 2023 for U.S. Appl. No. 17/454,148.
Notice of Allowance and Fees Due (PTOL-85) dated Jan. 31, 2023 for U.S. Appl. No. 17/468,425.

(56) References Cited

OTHER PUBLICATIONS

Notice of Allowance and Fees Due (PTOL-85) dated Jul. 28, 2020 for U.S. Appl. No. 16/240,140.
Notice of Allowance and Fees Due (PTOL-85) dated Jun. 2, 2020 for U.S. Appl. No. 16/240,295.
Notice of Allowance and Fees Due (PTOL-85) dated Jun. 8, 2022 for U.S. Appl. No. 17/301,259.
Notice of Allowance and Fees Due (PTOL-85) dated Jun. 12, 2019 for U.S. Appl. No. 16/240,109.
Notice of Allowance and Fees Due (PTOL-85) dated Mar. 13, 2023 for U.S. Appl. No. 17/468,425.
Notice of Allowance and Fees Due (PTOL-85) dated Mar. 15, 2023 for U.S. Appl. No. 17/454,148.
Notice of Allowance and Fees Due (PTOL-85) dated Nov. 6, 2019 for U.S. Appl. No. 16/240,140.
Notice of Allowance and Fees Due (PTOL-85) dated Nov. 23, 2022 for U.S. Appl. No. 17/468,425.
Notice of Allowance and Fees Due (PTOL-85) dated Sep. 23, 2020 for U.S. Appl. No. 16/240,140.
Notice of Allowance and Fees Due (PTOL-85) dated Sep. 23, 2022 for U.S. Appl. No. 17/301,259.
Notice of Allowance for U.S. Appl. No. 16/240,109, dated Aug. 14, 2019, 10 pages.
Notice of Allowance received for U.S. Appl. No. 16/688,197, dated Nov. 22, 2021, 8 pages.
Notice of Allowance received for U.S. Appl. No. 16/930,022, dated Aug. 23, 2021, 3 pages.
Notice of Allowance received for U.S. Appl. No. 16/930,022, dated Jun. 8, 2021, 12 pages.
Notice of Allowance received for U.S. Appl. No. 16/930,022, dated Sep. 22, 2021, 2 pages.
Office Action for U.S. Appl. No. 14/824,455 dated Nov. 30, 2018, 17 pages.
Supplemental Notice of Allowability (PTOL-37) dated Sep. 10, 2020 for U.S. Appl. No. 16/240,295.
Supplemental Notice of Allowability dated Aug. 21, 2020 for U.S. Appl. No. 16/240,295.
Supplemental Notice of Allowability received for U.S. Appl. No. 17/010,515, dated Oct. 15, 2021, 2 pages.
U.S. Patent Application for "Methods, Apparatuses, And Systems For Verifying Printed Image And Improving Print Quality", Unpublished (Filing date Feb. 23, 2023), (Jose Guiterrez, Inventor), (Hand Held Products, Inc., Assignee), U.S. Appl. No. 18/173,463.
U.S. Appl. No. 13/367,978 for a Laser Scanning Module Employing an Elastomeric U-Hinge Based Laser Scanning Assembly, filed Feb. 7, 2012, Feng et al.
U.S. Appl. No. 14/277,337 for Multipurpose Optical Reader, filed May 14, 2014, Jovanovski et al.
U.S. Appl. No. 14/283,282 for Terminal Having Illumination and Focus Control filed May 21, 2014, Liu et al.
U.S. Appl. No. 14/446,391 for Multifunction Point of Sale Apparatus With Optical Signature Capture filed Jul. 30, 2014, Good et al.
U.S. Appl. No. 14/676,109 for Indicia Reader, filed Apr. 1, 2015, Richard Walter Huck.
"Detecting Barcodes in Images with Python and OpenCV" [online] [retrieved on May 27, 2019] Retrieved from the Internet: <https://www.pyimagesearch.com/2014/11/24/detecting-barcodes-images-python-opencv/> dated Nov. 24, 2014.
Annex to the communication dated Feb. 20, 2023 for EP Application No. 19150494.
Anonymous: "How can I quantify difference between two images?—Stack Overflow", [online] [retrieved on May 27, 2019] Retrieved from the Internet:URL:https://stackoverflow.com/questions/189943/how-can-i-quantify-difference-between-two-images> dated Apr. 21, 2015, pp. 1-5.
Basic Image Enhancement and Analysis Techniques, 4 pages, [online], [retrieved on Oct. 3, 2016]. Retrieved from the Internet <URL:https://in.mathworks.com/help/images/image-enhancement-and-analysis.html>.
Communication about intention to grant a European patent dated Dec. 23, 2022 for EP Application No. 19150493.5.
Communication about intention to grant a European patent received for EP Application No. 19150495.0, dated Nov. 15, 2021, 6 pages.
Communication from the Examining Division dated Jul. 15, 2021 for EP Application No. 19150493.5.
Communication Pursuant to Article 94(3) issued in European Application No. 19150495.0 dated Jul. 9, 2021, 6 pages.
Communication Pursuant to Article 94(3) received for European Application No. 19150494.3, dated Aug. 13, 2021, 6 pages.
Communication pursuant to Rules 70(2) and 70a(2) for European Application No. 19150493.5, dated Jul. 15, 2019, 2 pages.
Communication pursuant to Rules 70(2) and 70a(2) for European Application No. 19150494.3, dated Jul. 15, 2019, 2 pages.
Communication pursuant to Rules 70(2) and 70a(2) for European Application No. 19150495.0, dated Jul. 15, 2019, 2 pages.
Corrected Notice of Allowability (PTOL-37) dated Sep. 23, 2020 for U.S. Appl. No. 16/240,140.
Corrected Notice of Allowability dated Aug. 7, 2020 for U.S. Appl. No. 16/240,140.
Corrected Notice of Allowability dated Jul. 21, 2020 for U.S. Appl. No. 16/240,295.
Corrected Notice of Allowability dated Jun. 24, 2020 for U.S. Appl. No. 16/240,067.
Corrected Notice of Allowability dated Sep. 2, 2020 for U.S. Appl. No. 16/240,067.
Corrected Notice of Allowability received for U.S. Appl. No. 16/930,022, dated Sep. 9, 2021, 3 pages.
Corrected Notice of Allowability received for U.S. Appl. No. 17/010,515, dated Nov. 5, 2021, 2 pages.
Decision to grant a European patent received for European Application No. 19150495.0, dated Mar. 24, 2022, 2 pages.
EP Office Action dated Feb. 20, 2023 for EP Application No. 19150494.
European search report and Search opinion dated May 24, 2019 for EP Application No. 19150493.5.
Examiner initiated interview summary (PTOL-413B) dated Apr. 16, 2020 for U.S. Appl. No. 16/240,067.
Extended European Search Report for European Application No. 19150494.3 dated Jun. 6, 2019.
Extended European Search Report for European Application No. 19150495.0 dated Jun. 4, 2019.
Extended European search report dated Jun. 22, 2022 for EP Application No. 22160775.7, 7 pages.
Faulty Barcode Detection, 11 pages, [online], [retrieved on Oct. 24, 2016]. Retrieved from the Internet <URL:http://tewson.com/sites/default/files/barcode.pdf>.
Final Rejection dated Jan. 10, 2020 for U.S. Appl. No. 16/240,067.
Find Image Rotation and Scale Using Automated Feature Matching, 7 pages, [online], [retrieved on Oct. 3, 2016]. Retrieved from the Internet <URL: hhttps://www.mathworks.com/examples/matlab-computer-vision/mw/vision_product-visionrecovertform-find-image-rotation-and-scale-using-automated-feature-matching>.
Image Analysis, 1 page, [online], [retrieved on Nov. 7, 2016]. Retrieved from the Internet <URL: http://in.mathworks.com/help/images/image-analysis.html>.
Image Enhancement, 1 page, [online], [retrieved on Oct. 3, 2016]. Retrieved from the Internet <URL: http://in.mathworks.com/help/images/image-enhancement-and-restoration.html>.
Imshowpair—compare differences between images, 6 pages, [online], [retrieved on Nov. 7, 2016]. Retrieved from the Internet <URL: http://in.mathworks.com/help/images/ref/imshowpair.html?requestedDomain=in.mathworks.com#bta3zrg>.
Non-Final Rejection dated Aug. 2, 2022 for U.S. Appl. No. 17/468,425, 8 pages.
Non-Final Rejection dated Aug. 25, 2020 for U.S. Appl. No. 16/790,417.
Non-Final Rejection dated Feb. 2, 2023 for U.S. Appl. No. 17/651,977.
Non-Final Rejection dated Feb. 8, 2022 for U.S. Appl. No. 17/301,259.
Non-Final Rejection dated Jul. 11, 2019 for U.S. Appl. No. 16/240,067.
Non-Final Rejection dated Jun. 26, 2019 for U.S. Appl. No. 16/240,140.
Non-Final Rejection dated Mar. 12, 2020 for U.S. Appl. No. 16/240,140.

(56) References Cited

OTHER PUBLICATIONS

Non-Final Rejection dated May 2, 2019 for U.S. Appl. No. 16/240,109.
Non-Final Rejection dated May 26, 2021 for U.S. Appl. No. 16/688,197.
Non-Final Rejection dated Nov. 27, 2020 for U.S. Appl. No. 16/688,197.
Notice of allowability dated Jan. 27, 2021 for U.S. Appl. No. 16/790,417.
Notice of Allowability dated Sep. 16, 2020 for U.S. Appl. No. 16/240,140.
Notice of Allowance and Fees Due (PTOL-85) dated Apr. 16, 2020 for U.S. Appl. No. 16/240,067.
Notice of Allowance and Fees Due (PTOL-85) dated Aug. 11, 2021 for U.S. Appl. No. 17/010,515.
Notice of Allowance and Fees Due (PTOL-85) dated Dec. 21, 2022 for U.S. Appl. No. 17/301,259.
Notice of Allowance and Fees Due (PTOL-85) dated Dec. 31, 2020 for U.S. Appl. No. 16/790,417.
Notice of Allowance and Fees Due (PTOL-85) dated Feb. 8, 2023 for U.S. Appl. No. 17/468,425.
Notice of Allowance and Fees Due (PTOL-85) dated Feb. 9, 2023 for U.S. Appl. No. 17/454,148.
Decision to grant a European patent dated May 8, 2023 for EP Application No. 19150493, 2 page(s).
Notice of Allowance and Fees Due (PTOL-85) dated Jun 14, 2023 for U.S. Appl. No. 17/651,977, 8 page(s).
Extended European Search Report dated Jun. 29, 2023 for EP Application No. 23163411, 7 page(s).
Intention to grant dated Jun. 5, 2023 for EP Application No. 19150494, 9 page(s).
Non-Final Rejection dated Jul. 27, 2023 for U.S. Appl. No. 18/173,463, 8 page(s).
Decision to grant a European patent dated Sep 14, 2023 for EP Application No. 19150494, 2 page(s).
Notice of Allowance and Fees Due (PTOL-85) dated Sep 29, 2023 for U.S. Appl. No. 17/651,977, 8 page(s).
Notice of Allowance and Fees Due (PTOL-85) dated Nov. 15, 2023 for U.S. Appl. No. 18/173,463, 9 page(s).
Non-Final Rejection dated Dec. 21, 2023 for U.S. Appl. No. 18/306,904, 7 page(s).
Extended European Search Report dated Dec. 21, 2023 for EP Application No. 23195821, 8 page(s).

* cited by examiner

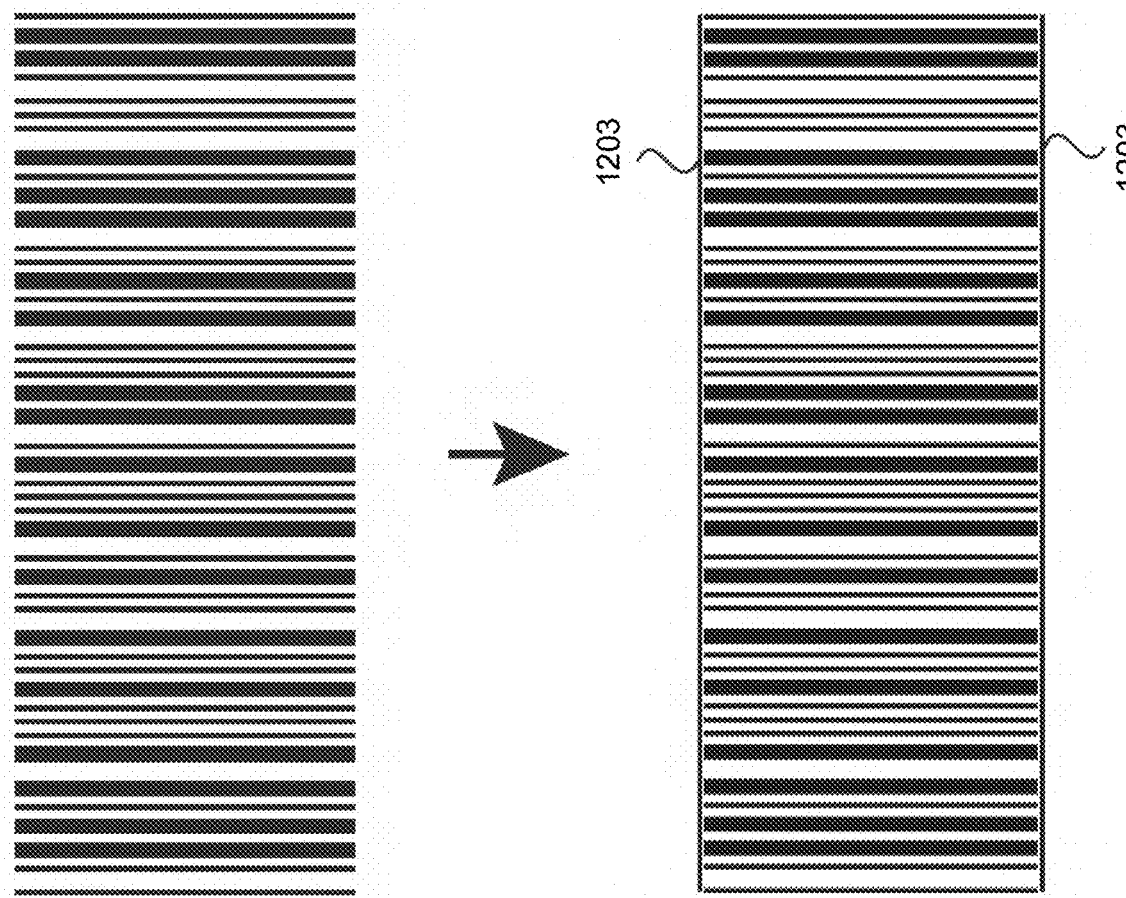

METHODS, APPARATUSES, AND SYSTEMS FOR DETECTING PRINTING DEFECTS AND CONTAMINATED COMPONENTS OF A PRINTER

CROSS-REFERENCE TO RELATED APPLICATIONS

This application is a continuation application of U.S. patent application Ser. No. 17/301,259, filed Mar. 30, 2021, which is a continuation application of U.S. patent application Ser. No. 16/790,417, filed Feb. 13, 2020, which is a continuation application of U.S. patent application Ser. No. 16/240,140, filed Jan. 4, 2019 (now U.S. Pat. No. 10,834,283 issued Nov. 10, 2020), which claims the benefit of U.S. Provisional Patent Application No. 62/614,089, filed Jan. 5, 2018, the entire contents of which are incorporated herein by reference.

FIELD OF THE INVENTION

The present invention relates to printing, and more particularly to visual printing defect detection and analysis.

BACKGROUND

Generally speaking, both thermal direct and thermal transfer printers are the preferred technology for printing barcodes. However, printouts may exhibit visible printing defects that may impact the ANSI grading or visual output of the labels. For example, the produced output is often plagued by printing defects, such as "ribbon wrinkle," "white banding," "black banding," "voids," or "ink split." Such problems may stem from media and printhead contamination, improper ribbon setup, printer wear and tear, uneven pressure, mechanical design margin, and other triggers that may not be related to thermal management algorithms. Printing defect degrades label print quality, and may lead to unusable media. Such issues may lead to equipment damage and supply waste.

SUMMARY

Accordingly, the present invention embraces methods for visual printing defect detection.

In accordance with various embodiments of the preset invention, a method for printing defect detection is provided. The method comprises scanning an image with a verifier to generate a scanned image; processing the scanned image to obtain a difference image by comparing the scanned image to a reference image and match parameters of the scanned image to the reference image; analyzing the difference image to detect one or more printing defects; grouping the one or more detected printing defects in one or more groups; refining the grouping of the detected printing defects; assigning confidence level values to the one or more refined groups; and performing a confidence level analysis to determine if one or more servicing actions should be performed.

In some embodiments, refining the grouping includes performing image processing of the difference image to detect at least one bright pixel common for two or more groups.

In some embodiments, the method further comprises extracting and/or reassigning one or more pixels to a correct group.

In some embodiments, the confidence level is calculated based on a ratio of a total amount of bright pixels in a selected area over a total amount of pixels in that area.

In some embodiments, performing a confidence level analysis includes performing a confidence level history analysis.

In some embodiments, the method further comprises analyzing the scanned image to determine presence or absence of printhead, platen roller and/or media contamination.

In some embodiments, the method further comprises determining a type of a printing defect by comparing the assigned confidence level to a predetermined table of confidence levels.

In some embodiments, performing a confidence level analysis includes calculating confidence level values for one or more defect groups, and monitoring changes in the calculated values from one or more previous images to the current scanned image.

In some embodiments, scanning an image with a verifier includes scanning an image displaying a barcode symbol, text, and/or graphics.

In accordance with various embodiments of the preset invention, a method for printing defect analysis is provided. The method comprises capturing an image of a printout on a media; checking the captured image for one or more printing defects; analyzing evolution of the detected printing defects between the current captured image and one or more images of preceding printouts; and using results of the evolution analysis to determine if one or more predetermined corrective actions should be initiated.

In some embodiments, checking for printing defects includes generating and analyzing a difference image obtained by comparing the captured image to a reference image, and/or processing the captured image to detect printhead, platen roller and/or media contamination.

In some embodiments, generating a difference image includes comparing a binary version of the captured image to a binary version of the reference image.

In some embodiments, checking the captured image for one or more printing defects includes detecting at least one of ribbon wrinkles, printhead, platen roller and/or media contamination, black and/or white banding, and/or black and/or white ink split.

In some embodiments, analyzing evolution includes comparing one or more evolution characteristics of the defects to a predetermined threshold.

In some embodiments, the method further comprises verifying the one or more evolution characteristics when one or more characteristics are found to exceed the predetermined threshold, and determining if one or more predetermined corrective actions should be initiated.

In some embodiments, the method further comprises initiating one or more predetermined corrective actions when the one or more evolution characteristics are slowly rising without exceeding the predetermined threshold. In some embodiments, initiating corrective actions includes triggering an alert, producing an error message, stopping printer operation, and/or prescribing a recommended course of action.

In some embodiments, the method further comprises providing feedback to a self-learning defect database. In some embodiments, the method further comprises using the provided feedback to dynamically update one or more algorithms for checking the image for printing defects, and/or for analyzing evolution of the detected defects.

In some embodiments, capturing an image of a printout on a media includes scanning an image with a printer-verifier device.

In accordance with various embodiments of the preset invention, a method for generating a difference image is provided. The method comprises adjusting position, size, and luminance of a scanned image with respect to a reference image, such as aligning a scanned image with a reference image, scaling the scanned image to match a size of the reference image, and adjusting luminance of the scaled scanned image; conducting a pixel-to-pixel analysis between the scanned image and the reference image; and generating a difference image based on results of the pixel-to-pixel analysis.

In some embodiments, the method further comprises obtaining the scanned image with a printer-verifier device.

In some embodiments, the scanned image includes stretching or compressing the scanned image in a transverse direction and/or longitudinal direction. In some embodiments, the method further comprises analyzing the difference image to identify one or more printing errors.

In some embodiments, identifying printing errors includes detecting at least one of ribbon wrinkles, printhead and/or media contamination, platen roller contamination, black and/or white banding, and/or black and/or white ink split.

In accordance with various embodiments of the preset invention, a method for image processing is provided. The method comprises normalizing a size of a produced image to match a size of a reference image; normalizing a luminance of the produced image to match a luminance of the reference image; and producing a difference image by comparing the normalized produced image to the reference image.

In some embodiments, normalizing a luminance includes performing level adjustment to match white and/or black colors in the produced image and white and/or black colors in the reference image. In some embodiments, normalizing a luminance includes performing level adjustment to match red, green and/or blue colors in the produced image and red, green and/or blue colors in the reference image. In some embodiments, normalizing a size of a produced image includes adjusting a size of the produced image to align corners and/or edges of the produced image with corners and/or edges of the reference image. In some embodiments, normalizing a size of a produced image includes equalizing a distance between a rightmost printed area and a leftmost printed area of the image.

In some embodiments, comparing the normalized produced image to the reference image includes comparing information of the produced image to a print command string.

In some embodiments, the method further includes detecting one or more printing defects.

In some embodiments, detecting one or more printing defects includes detecting at least one of ribbon wrinkles, printhead and/or media contamination, black and/or white banding, and/or black and/or white ink split.

In some embodiments, the method further includes capturing the produced image with an integrated verifier device.

In accordance with various embodiments of the preset invention, a method for print defect detection is provided. The method comprises scanning an image with a verifier to generate a captured image; processing the captured image to match one or more parameters of the captured image to one or more parameters of a reference image; comparing the captured image to the reference image to detect one or more bright pixels; and detecting one or more print defects.

In some embodiments, processing the captured image includes scaling, rotating, adjusting luminance and/or adjusting one or more colors.

In some embodiments, comparing the captured image to the reference image includes comparing a binary version of the captured image to a binary version of the reference image.

In some embodiments, the mothed further comprises performing a bright pixel analysis. In some embodiments, performing a bright pixel analysis includes grouping and/or connecting bright pixels located within a predetermined distance from each other.

In some embodiments, capturing an image with a verifier includes capturing an image displaying a barcode symbol, text, and/or graphics.

In accordance with various embodiments of the preset invention, a method for determining an origin of printing distortion is provided. The method includes generating an image of a printed barcode symbol with a printer-verifier; processing the image to detect deviation of parameters of elements of the barcode symbol from a predetermined threshold; checking for a malfunction of heating elements; and determining an origin of printing distortion.

In some embodiments, wherein processing the image of the printed barcode symbol includes calculating widths of the one or more elements of the barcode symbol. In some embodiments, the method further comprises averaging the calculated widths for a group of the elements of the barcode symbol. In some embodiments, the method further comprises plotting the averaged widths.

In some embodiments, processing the image of the printed barcode symbol includes comparing the image with a reference image.

In some embodiments, checking for a malfunction of one or more heating elements includes checking for a burnout of one or more heating elements.

In some embodiments, processing the image of the printed barcode symbol includes processing the image of the printed barcode symbol with an image processor.

In accordance with various embodiments of the preset invention, the present invention embraces methods for automated detection of a contaminated printhead.

In accordance with various embodiments of the preset invention, a method for detecting a contaminated thermal printhead is provided. The method includes identifying a barcode symbol in a verifier image, and analyzing its scan lines; calculating element widths of the scan lines using a predetermined threshold; and analyzing the calculated element widths to detect contamination of a thermal printhead.

In some embodiments, identifying a barcode symbol in a verifier image includes identifying a barcode symbol in an image obtained from an integrated printer-verifier device.

In some embodiments, analyzing the calculated element widths includes plotting an average deviation within a group of the element widths.

In some embodiments, calculating element widths includes calculating widths of one or more narrow bars.

In some embodiments, calculating element widths includes calculating widths of one or more narrow spaces between bars of the barcode.

In some embodiments, the method further comprises issuing a notification reporting the detected contamination, and prescribing a recommended course of action.

In accordance with various embodiments of the preset invention, a method for detecting printhead contamination is provided. The method includes detecting one or more indicia in an image of a printed image; analyzing elements of the detected indicia; conducting a pattern match analysis between the detected indicia and a reference image to produce a difference image; and analyzing the difference image to detect a presence of printhead contamination.

In some embodiments, detecting one or more indicia in an image of a printed image includes detecting indicia using a verifier integrated into a thermal printer. In some embodiments, detecting one or more indicia includes detecting one or more 1D barcodes, 2D barcodes, graphics, and/or text.

In some embodiments, the method including reporting the presence of printhead contamination. In some embodiments, reporting the presence of printhead contamination includes sending a message to an entity responsible for printhead maintenance. In some embodiments, reporting the presence of printhead contamination includes printing a specifically formatted label.

In some embodiments, the method further comprises triggering one or more predetermined actions in response to the detected contamination, wherein the predetermined actions are selected based on user sensitivity to print quality.

In accordance with various embodiments of the preset invention, an image processing method is provided. The method includes capturing an image of a label; processing the captured image to produce a difference image having a plurality of bright pixels by comparing the captured image to a reference image; consecutively connecting the bright pixels located within a predetermined radius to form a line until there are no pixels within the radius left to connect; and iteratively connecting the pixels until all the pixels of the plurality of bright pixels having neighboring pixels within the predetermined radius are connected, and one or more lines are formed.

In some embodiments, consecutively connecting the pixels further includes monitoring a running average slope defining an orientation of the line being formed.

In some embodiments, monitoring a running average slope includes determining an angle of the slope with a point-slope technique.

In some embodiments, the method further comprises making a connection between two consecutive pixels when a resulting change in the running average slope does not exceed a predetermined angle threshold.

In some embodiments, the method further comprises making a connection between two consecutive pixels when a resulting change in the running average slope does not exceed a predetermined dynamic angle value.

In some embodiments, the method further comprises monitoring an average direction of the running average slope, and making a connection between two consecutive pixels when such connection follows a forward direction of the slope.

In accordance with various embodiments of the preset invention, a method for determining a ribbon wrinkle is provided. The method includes creating a difference image to locate one or more bright points by comparing a captured image of a media after printing to a reference image; grouping the bright points located near each other to form one or more primary lines characterized by a running average slope; and connecting the primary lines having a similar running average slope to form one or more secondary lines.

In some embodiments, the method further comprises assigning a confidence level value to the one or more primary and/or secondary lines. In some embodiments, the method further comprises requesting capturing an additional image to replace the captured image having one or more primary and/or secondary lines with low confidence level values.

In some embodiments, creating a difference image includes using the reference image stored in a self-learning database.

In some embodiments, using the reference image stored in a self-learning database includes using the reference image stored in an external database.

In some embodiments, comparing a captured image of a media includes comparing a captured image of a media displaying a barcode.

In accordance with various embodiments of the preset invention, a ribbon wrinkle detection method is provided. The method includes identifying a barcode symbol having a plurality of elements displayed on a media; surrounding the barcode symbol with a bounding box encompassing top and bottom parts and outer edges of the barcode symbol, and/or one or more finder patterns; locating one or more unprinted points located near the elements of the barcode symbol; connecting co-localized unprinted points to form one or more lines; determining an angle of the one or more lines relative to the bounding box; and verifying that each of the determined angles exceeds a predetermined threshold value.

In some embodiments, identifying a barcode symbol includes identifying a two-dimensional barcode symbol.

In some embodiments, the method further comprises determining a number of the one or more lines. In some embodiments, the method further comprises displaying a result of the angle verification.

In some embodiments, determining an angle includes determining an angle with a point-slope technique. In some embodiments, determining an angle includes determining an angle with a linear regression technique. In some embodiments, verifying that each of the determined angles exceeds a predetermined threshold value includes exceeding a predetermined dynamic angle value. In some embodiments, verifying that each of the determined angles exceeds a predetermined threshold value includes exceeding a predetermined fixed angle value.

In accordance with various embodiments of the preset invention, the present invention embraces methods of detecting platen roller contamination. In an embodiment, the method for determining a platen roller contamination can include creating a difference image to locate one or more bright points by comparing a captured image of a media after printing to a reference image, and grouping the bright points located near each other to form one or more voids. Additionally, the method can include analyzing the void pattern, and/or determining whether the contamination is on the platen roller or on the media and/or ribbon.

In accordance with various embodiments of the preset invention, a platen roller contamination detection method is provided. The method comprises capturing an image of a label; processing the captured image to produce a difference image having a plurality of bright pixels by comparing the captured image to a reference image; consecutively connecting the bright pixels located within a predetermined radius to form a cluster and detecting a void mark, until there are no pixels within the radius left to connect; and iteratively connecting the pixels until all the pixels of the plurality of bright pixels having neighboring pixels within the predetermined radius are connected, and one or more void marks are detected.

In some embodiments, consecutively connecting the bright pixels includes grouping each cluster of pixels depending on proximity between neighboring bright pixels, a slope change between clusters of pixels, and a void space existing between the clusters of pixels.

In some embodiments, the method further comprises determining a repeat pattern of the detected one or more void marks at a defined distance along a vertical line, wherein the defined distance corresponds to circumference of the platen roller.

In some embodiments, the method further comprises issuing a priority message of a first level for an operator in an instance when a count of the one or more void marks are less than a threshold value. In some embodiments, the method further comprises initiating a blast of compressed air in a defined proximity to the platen roller in an instance when the count of the one or more void marks exceed the threshold value.

In some embodiments, detecting the void mark includes identifying one or more areas of the bright pixels falling within a defined circular area, wherein in accordance with a first criteria, separation of two bright pixels is more than a defined threshold separation in an instance when a count of the bright pixels is one or more, wherein in accordance with a second criteria, no three bright pixels can lie on a straight line in an instance when the count of the bright pixels is within a first range, wherein in accordance with a third criteria, no group of five bright pixels can lie on the straight line when the count of the bright pixels is beyond the first range, wherein, in an instance when the first, second and third criteria are met, a printed label is deemed to have defects caused by a contaminated platen roller.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 12C graphically depicts a linear barcode symbol (top) and the linear barcode symbol surrounded with a bounding box (bottom);

DETAILED DESCRIPTION OF THE INVENTION

Figure 1:
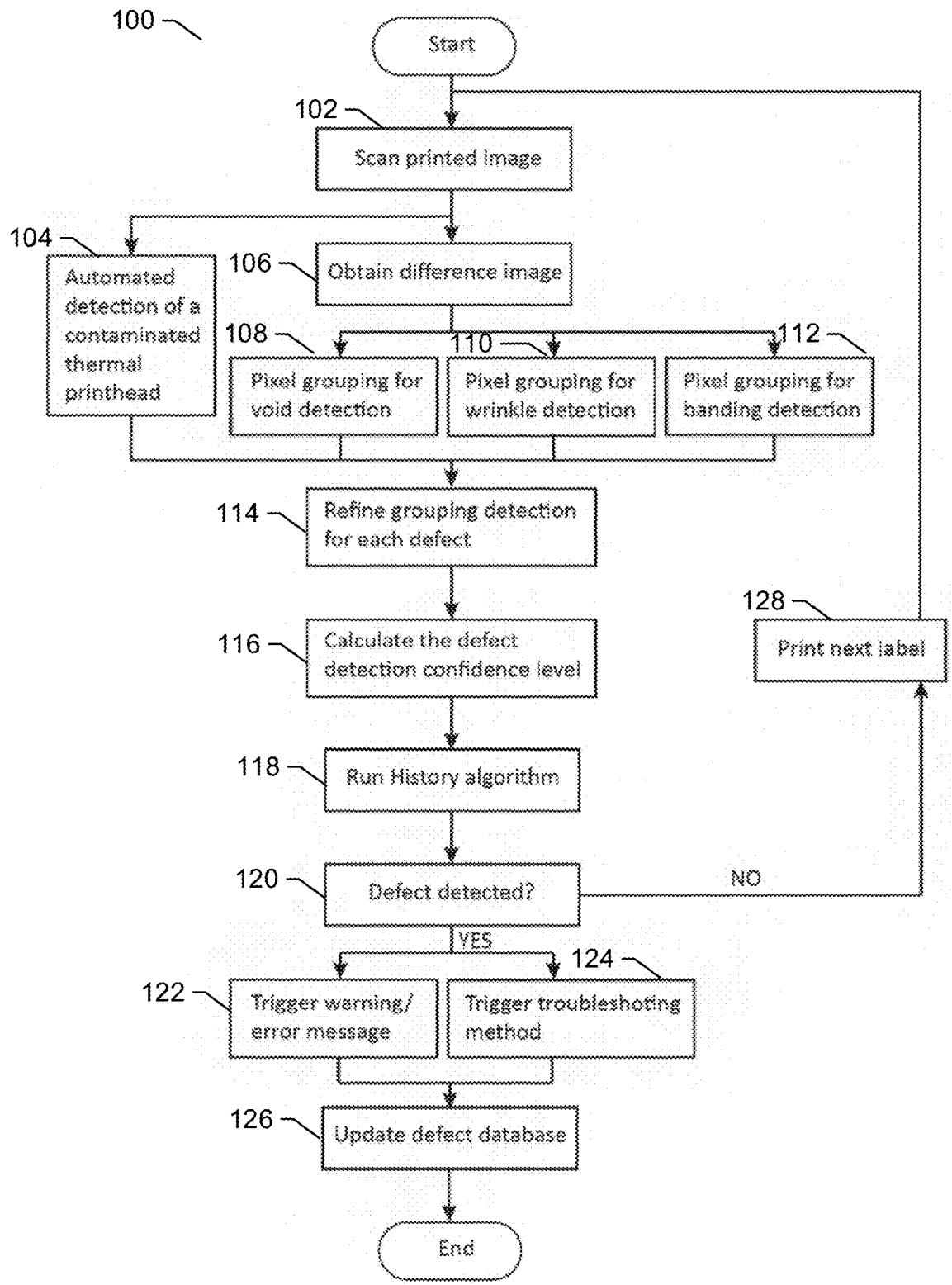
FIG. 1 schematically depicts a defect detection algorithm, according to an embodiment.

In accordance with various embodiments of the present invention, methods, apparatuses, and systems for visual printing defect detection and analysis are provided.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The headings provided herein are for convenience only and do not limit the scope or meaning of the claimed invention.

Various embodiments of the present invention will be described in relation to a thermal transfer printer. However, the present invention may be equally applicable to other types and styles of printers (inclusive of printer-verifiers) (e.g., a thermal direct printer, a laser toner printer, an ink drop printer, etc.).

As used herein, the terms "media" and "print media" include label stock, label, ribbon, card stock, and other materials used in a printing process, such as a thermal transfer printing process or a direct thermal printing process.

As used herein, the terms "target image," "reference image," and "buffer image" may be used interchangeably and considered synonymous depending on the context, unless further definition is provided.

As used herein, the terms "scanned image," "produced image," "blend image," "verifier image," and "captured image" may be used interchangeably and considered synonymous depending on the context, unless further definition is provided.

As used herein, the terms "pixel," "dot," and "point" may be used interchangeably and considered synonymous depending on the context, unless further definition is provided.

I. OVERVIEW

Generally speaking, thermal printing has become the dominant means of generating barcode labels on demand. Thermal printers can include any printing technology that utilizes a "print command string," such as thermal direct, laser toner, ink drop, sublimation, impact dot matrix, and thermochromic and, by reverse image, phototypeset, screen, gravure and offset. Over time, printheads get contaminated, causing reduced print quality and increasing wear, which in turn can shorten printhead life. Preventative maintenance may be instituted; however, this can be wasteful when the printhead does not need cleaning, or worse, can be damaging when the printhead needs cleaning prior to the scheduled maintenance. Further, in many situations, proper cleaning is ignored until printer failure. Therefore, a need exists for an automated method of detecting a contaminated thermal printhead so that the issue could be resolved in a timely fashion.

Further, platen roller contamination can significantly affect print quality of labels, rendering them defective and unusable. For example, printing labels in industrial settings can lead to dust, grit and other airborne particulate getting into the printer components. Making matters worse, this contamination is often statically charged, causing it to be especially attracted to polymers, which form the basis of the media-moving assemblies (e.g., the platen rollers) in the printers. Therefore, a need exists for an automated method for detecting platen roller contamination to overcome this issue.

Moreover, media contamination can also lead to the printing quality reduction. Ribbon wrinkle may be caused by a setup of the printer and/or loading of media and/or ribbon. Additionally, the amount of heat applied or the appearance of the label pattern may also affect the printing quality. For example, printing only on the side of the label may cause the ribbon to pull unevenly and wrinkle. When the heat from the printhead does not adequately get to the media due to a wrinkle or contamination of printer parts (such as a platen roller) and/or media or ribbon contamination, a part of the intended image is not created. This can look like an unprinted dot, void or a line in an otherwise printed area. When the resulting label print quality is degraded due to such contamination or a ribbon wrinkle, these problems need to be identified and addressed. Therefore, a need exists for an automated method for detecting and correction of ribbon wrinkle.

In addition to printhead, platen roller, and media contamination described above, other issues may exist that may cause printing defects. To handle such issues more efficiently, the printing process should utilize an algorithm to automatically detect a wide variety of visual printing defects, followed by providing user notification, guidance and/or taking actions to resolve the detected issues.

Although some attempts have been made to create printing defect detection, none of the proposed methods combines determining a quality grading of a label immediately after printing with performing printing diagnostics not covered by the grading criteria, or focuses on creating an exact match to the reference image, or covers a reference image represented as a print command string.

Therefore, a need exists for a method capable of combining automatic detection of various visual printing defects (such as banding, void, ribbon wrinkle, ink split, and printhead, media and/or platen roller contamination) that may occur during the printout, alerting the user in real-time, and providing advice on the corrective actions.

II. PRINTING DEFECT DETECTION

FIG. 1 depicts an example implementation of a defect detection algorithm, in which a printer-scanned image (that may be obtained with a verifier) is compared to an original reference image (e.g., a graphically rearranged print command string) in order to highlight the printout difference between the two (as described further hereinafter).

Referring to FIG. 100, at step 102, a printed image may be scanned. In an embodiment, an image, such as a printer-scanned image, may be obtained with a verifier. In an embodiment, scanning an image with a verifier can include scanning an image displaying a barcode symbol, text, and/or graphics. The image may be captured by any method of digital image capture, such as imagers, image sensors (such as an integrated 1D, 2D, or 3D image sensor), verifiers, fax scanners and cameras. Various examples of the image sensors may include, but are not limited to, a contact image sensor (CIS), a charge-coupled device (CCD), or a complementary metal-oxide semiconductor (CMOS) sensor. For example, the captured image can be created by an optical head that captures sequential digital "snap shots" of a single line traversing the label's width as the media moves through the printer. Such image may be slightly wider and/or longer than the reference image due to optical effects, such as aperture distortion. There may also be distortions caused by the imperfect movement of the media through the printer. Such an image should be processed with a scaling algorithm so that the captured and reference images are exactly of the same size. If there is a perfectly printed label, a binarized version of the captured image will be indistinguishable from a printout of the bitmap of the reference image.

In an embodiment, at step 104, a contaminated thermal printhead may be automatically determined based on the printer-scanned image, as described in FIGS. 6A to 9.

In accordance with another embodiment, at step 106, the captured image may be compared with the reference image, such as a print command string for determining a difference image to detect one or more printing defects. The print command string (which is computer code) can be shown graphically (where a "to print" command is depicted as black and a "no-print" command is depicted as white) and then rearranged into rows and columns to mimic approximately what the printed image will look like. The graphically rearranged print command string can be referred to as the "reference image." After printing a label or tag, the printed image can be optically scanned where light is reflected off the printed image and captured, using one or more photosensitive semiconductor elements producing a captured image of the printed matter.

The captured image may have a slight stretch/compression or a small tilt in the image compared to the reference image. In this case, the first step can include "re-aligning" the captured image with the reference image. A scaling/rotation algorithm may be used to ensure that the corners and edges of the images align with each other if the two images were to overlap. Width and length of the captured image may differ from the reference image by different factors.

The scaling algorithm that can be applied to the captured image in the horizontal (across the web) direction can be configured to compress the image so that the distance between the leftmost printed area and the rightmost printed area is equal. For example, the size of the reference image is known exactly because it maps directly into the dots of the printhead. A typical printhead may be described as having 300 dots per inch (dpi), whereas the actual size of the dots is 0.0833 mm (often referred to as 12 dots per mm). Optical scanner such as a verifier often differs from this number, and is typically 24 pixels per mm. Combined with optical distortions, this can yield a different value of the printing width. A horizontal scaling algorithm can be based on the following equations:

Processed captured image=Reference image dimension/Original captured image dimension*Every original captured image pixel;

Processed captured image=the above result digitized into 12 dots per mm.

The result is a pixel-to-pixel comparison between the captured and reference images. Similar scaling algorithm can be applied for the vertical direction (in the direction of the web motion), except that the captured image may be longer or shorter due to mechanical effects in addition to the optical effects. The determination of the difference image is further described in FIGS. 2A to 5.

In an embodiment, comparing the scanned image to the reference image may include comparing a binary version of the scanned image to a binary version of the reference image to detect bright pixels marking the areas where the two images do not match.

Based on the determination of the difference image, grouping of the detected bright pixels (also referred to as difference pixels) may be performed. In other words, the one or more the detected printing defects may be grouped. In an embodiment, grouping of the detected difference pixels may be performed for printhead contamination at step 104 (further described in FIGS. 6A to 9). In another embodiment, grouping of the detected difference pixels may be performed for wrinkles and void detection at steps 108 and 110 (further described in FIGS. 10 to 14E). In another embodiment, grouping of the detected difference pixels may be performed for banding detection at step 112 (covering horizontal, vertical white and black banding) (further described in FIGS. 15 to 17D).

At step 114, the grouping data is then refined to ensure that bright pixels belong to correct defect types. The grouping data may be refined by performing image processing of the difference image to detect at least one bright pixel common for two or more groups. For example, a separate difference image can be created for each detected defect type (void, wrinkle, banding, ink split, etc.). Such difference images can be generated to have the same size (length and width), and consequently the same total number of pixels. Each difference image contains coordinates (unique x and y positions within the image) of each of the bright pixels detected. Thus, refining the grouping can include determining whether a particular bright pixel is common for any of the difference images obtained by comparing the scanned image to the reference image. For example, if a pixel in row 17, column 28 is defined as "bright" in the void difference image, but as "dark" in the wrinkle difference image, then it is not a common pixel. But if the pixel is defined as bright in both images, then it is a common pixel. The method 100 can further include extracting and/or reassigning one or more pixels to a correct group.

Step 114 is especially beneficial for defect analysis when multiple defects occur simultaneously and are overlapping with each other (for example, banding and wrinkle). By preventing pixels from being assigned to a wrong defect type, it can improve the quality of defect severity assessment. For instance, to detect ribbon wrinkles, neighboring bright pixels in the difference image can be consecutively connected to form one or more lines. To detect printhead and/or media contamination, bright pixels located within a predetermined radius in the difference image can be connected to form one or more voids. To detect uneven printout, such as banding or ink split, co-located bright pixels in the difference image can be assembled in groups. Secondary analysis can also be applied for further defect recognition.

At step 116, once all the bright pixels are assigned to proper defect groups, a confidence level (CL) value is assigned to each visual defect type (or refined groups), as described in Table 1 below. This value indicates how certain ("confident") the algorithm is in detecting a particular defect type. In an embodiment, the confidence level can be calculated based on a ratio of a total amount of bright pixels in a selected area over a total amount of pixels in that area. Performing a confidence level analysis can include performing a confidence level history analysis. Additionally or alternatively, performing a confidence level analysis can include calculating confidence level values for one or more defect groups, and monitoring changes in the calculated values from one or more previous images to the current scanned image. The CL value can then be transmitted to a "history algorithm."

Figure 19:
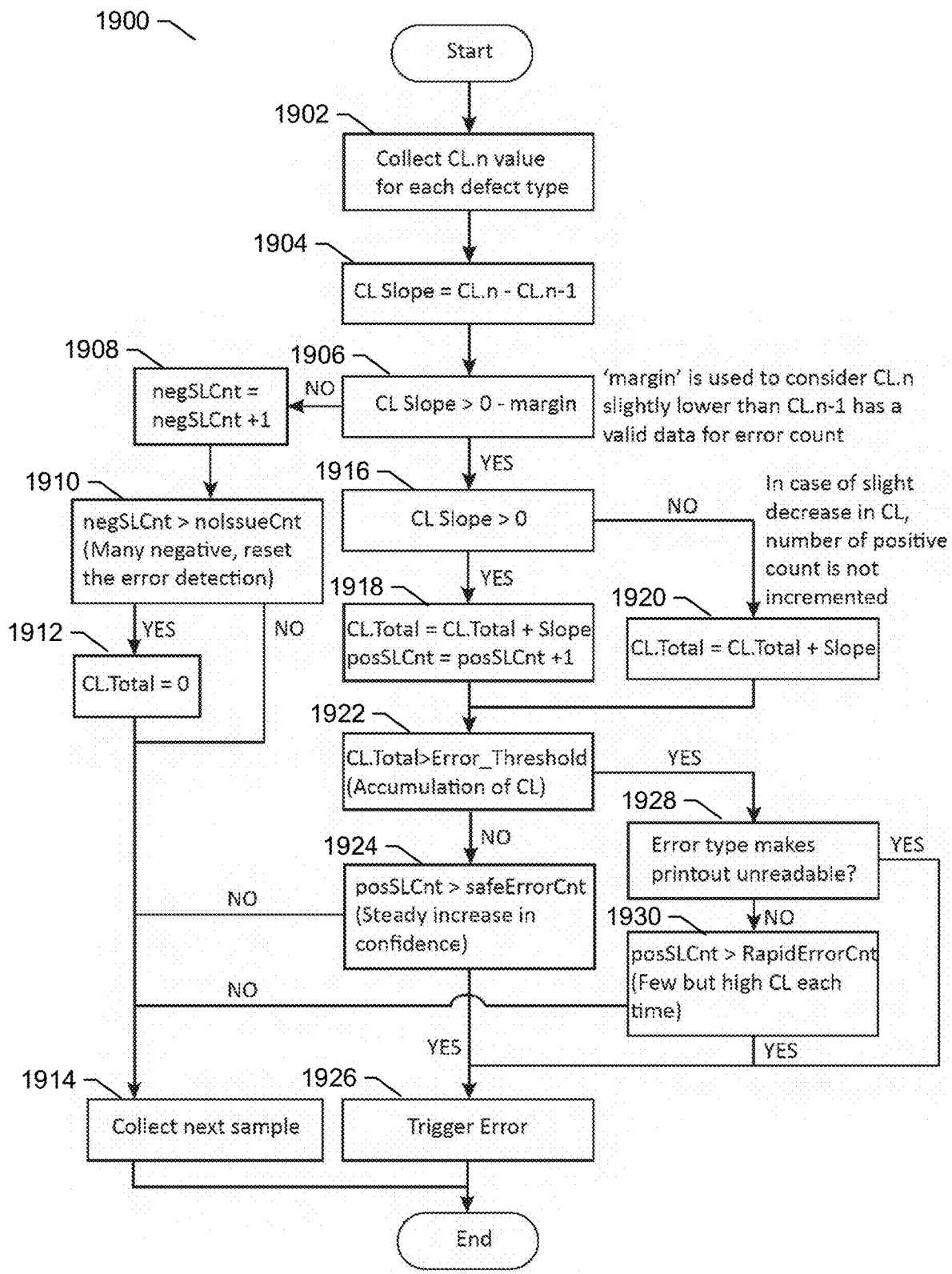
FIG. 19 schematically depicts a history algorithm, according to an embodiment.

At step 118, the history algorithm performs analysis for each defect type to detect how quickly the Confidence Level value evolved within one label (or from one label to another) as described in FIG. 19. At step 120, based on the level of the detected changes, a warning and/or error message (at step 122) can be produced. In addition to alerting a user, at step 124, the algorithm can also provide advice to the user on how to address the error if the system cannot resolve the issue automatically.

At step 126, the processed data can then be transmitted to update a defect database (internal or external), and used to provide an alert and/or troubleshooting method more precisely and/or more quickly in case of a future event.

If, at step 120, no defect is detected, then the method 100 may proceed with printing the next label at step 128.

Figure 2A:
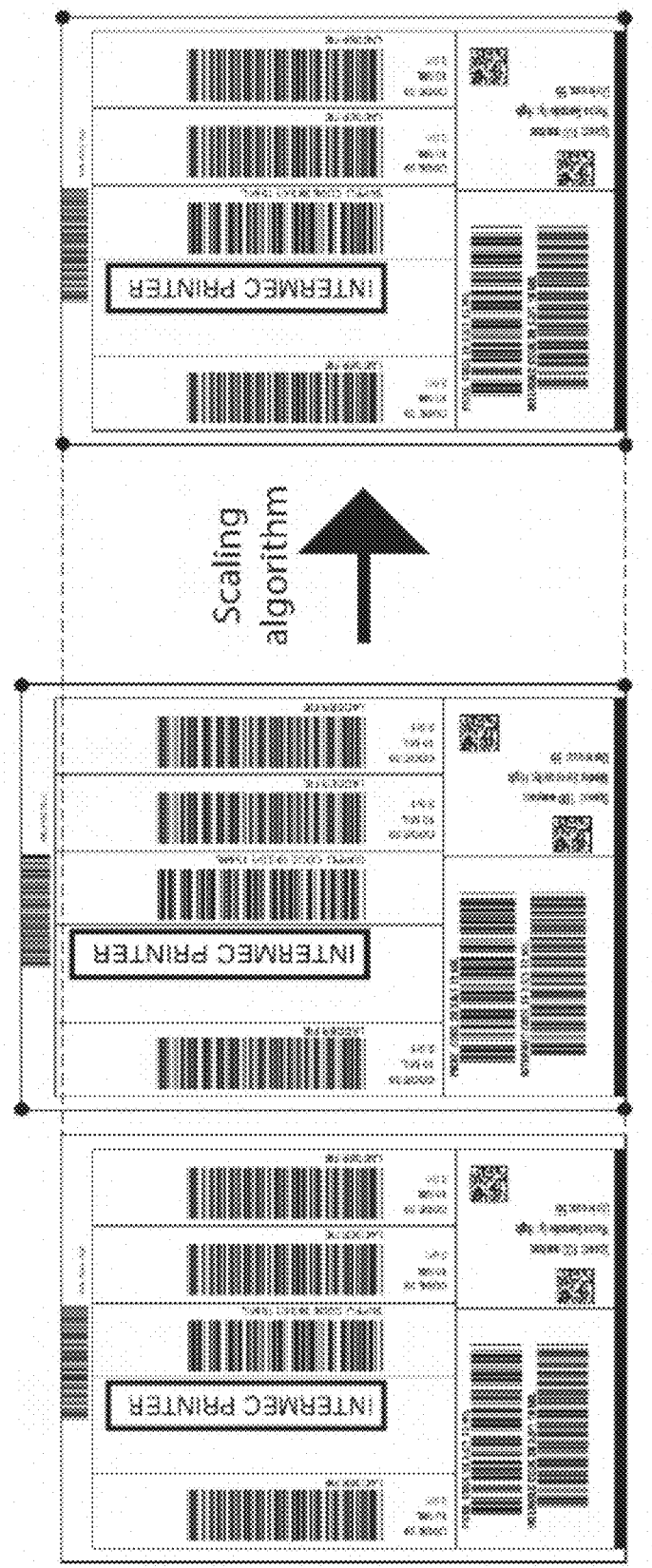
FIG. 2A graphically depicts a diagram of rescaling of a captured image, according to an embodiment.

FIG. 2A shows a diagram of rescaling of a captured image to be the same size as the reference image using an example scaling algorithms. Specifically, the reference image on the leftmost is of a precise size because it is a bitmap representing the commands transmitted to the printhead. The original captured image is shown in the middle, and may represent an image obtained by an optical scanner such as a verifier. In this example, the captured image is slightly larger than the reference image (by a different factor in the horizontal and vertical directions). On the rightmost is the captured image that was rescaled to have the same dimensions as the reference image so that a pixel-by-pixel analysis can be performed.

In addition to normalizing the captured image in size, the captured image's luminance, "Y," can also be normalized to match luminance of the reference image. Luminance is a standardized value (which ranges between 0 and 1), where for a monochrome sensor 0 represents a pure black, and 1 a pure white. For a color sensor, each channel (red "R," green "G," and blue "B") should be evaluated individually. For red, 0 is also a pure black, while 1 is a pure red. Similar logic is applied to the green and blue channels. The captured image is not likely to be as perfect as the reference image in terms of luminance and color. Some small deterioration may happen due to the media, heat setting, scanner element, etc., resulting in the white not being as pure white (very light grey) and the black not being as dark as it should be (dark grey color instead).

A "level adjustment" can be performed in order to match the white of the captured image with white of the reference image, and the black of the captured image with black of the reference image. The formula can be applied to estimate the luminance Y for black-and-white image, as well as to the RGB channels for color image. In the formula below, Y' is the new value of the luminance, and Y is the original value. For RGB value, Y should be replaced with R, G or B based on:

$$\text{Captured}(Y') = \{\text{Captured}(Y) - \text{Captured}(\min(Y))\} * \{\text{Reference}(\max(Y)) - \text{Reference}(\min(Y))\} / \{\text{Captured}(\max(Y)) - \text{Captured}(\min(Y))\}.$$

Figure 2B:
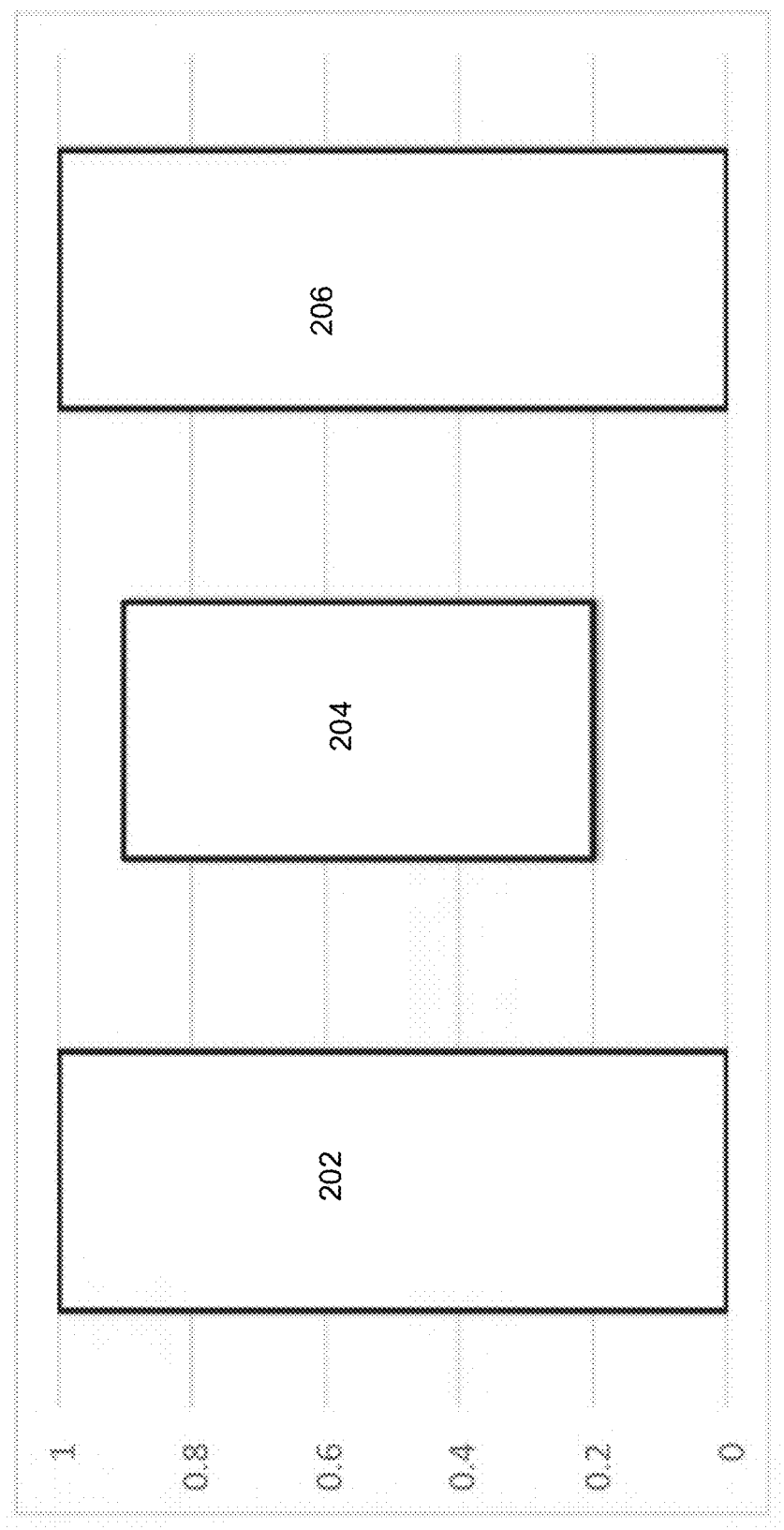
FIG. 2B graphically depicts a representative luminance range of reference and captured images, according to an embodiment.

FIG. 2B shows a result of application of the luminance equation. Specifically, representative Y' range after application of the luminance adjustment algorithm is shown. As shown by a bar 202 on the left, the reference image reflectance ranges from 0 to 1 (i.e., 0% being black and 100% being white). The captured image will have a lower reflectance, as shown by a bar 204 in the middle. The processed captured image has been expanded to have the same reflectance as the reference image so that the processed image and reference image have the same range of luminance, as shown by a bar 206 on the right.

Once the captured image has been processed to resemble the reference image in terms of size and luminance (or RGB), the difference image can be rendered. A "difference" algorithm can be used to compare the reference image and the captured image to detect a visible difference between the two. For each pixel composing the two images, a simple formula can be applied to create a difference image:

$$\text{Difference\_pixel}(Y,R,G,B) = |\text{Reference\_pixel\_pixel}(YR,G,B) - \text{Captured\_pixel}(YR,G,B)|.$$

A "perfectly" printed label has had its size and luminance adjusted according to the present invention, and processed with the difference algorithm. A perfectly printed label will result in a perfectly black image. Any imperfections will be rendered in a grays cale range, where pure white will be a full mismatch in pixel comparison. This approach can be used to quantify printing errors beyond those simply evaluated according to a print quality standard (e.g., ISO/IEC 15415). It may be noted that the above color scheme is merely for exemplary purposes and should not be construed to limit the scope of the disclosure. Other color schemes, such as a color scheme inverse of the exemplary color scheme described above, or an entirely different color scheme may be implemented, without deviation from the scope of the disclosure.

Figure 3:
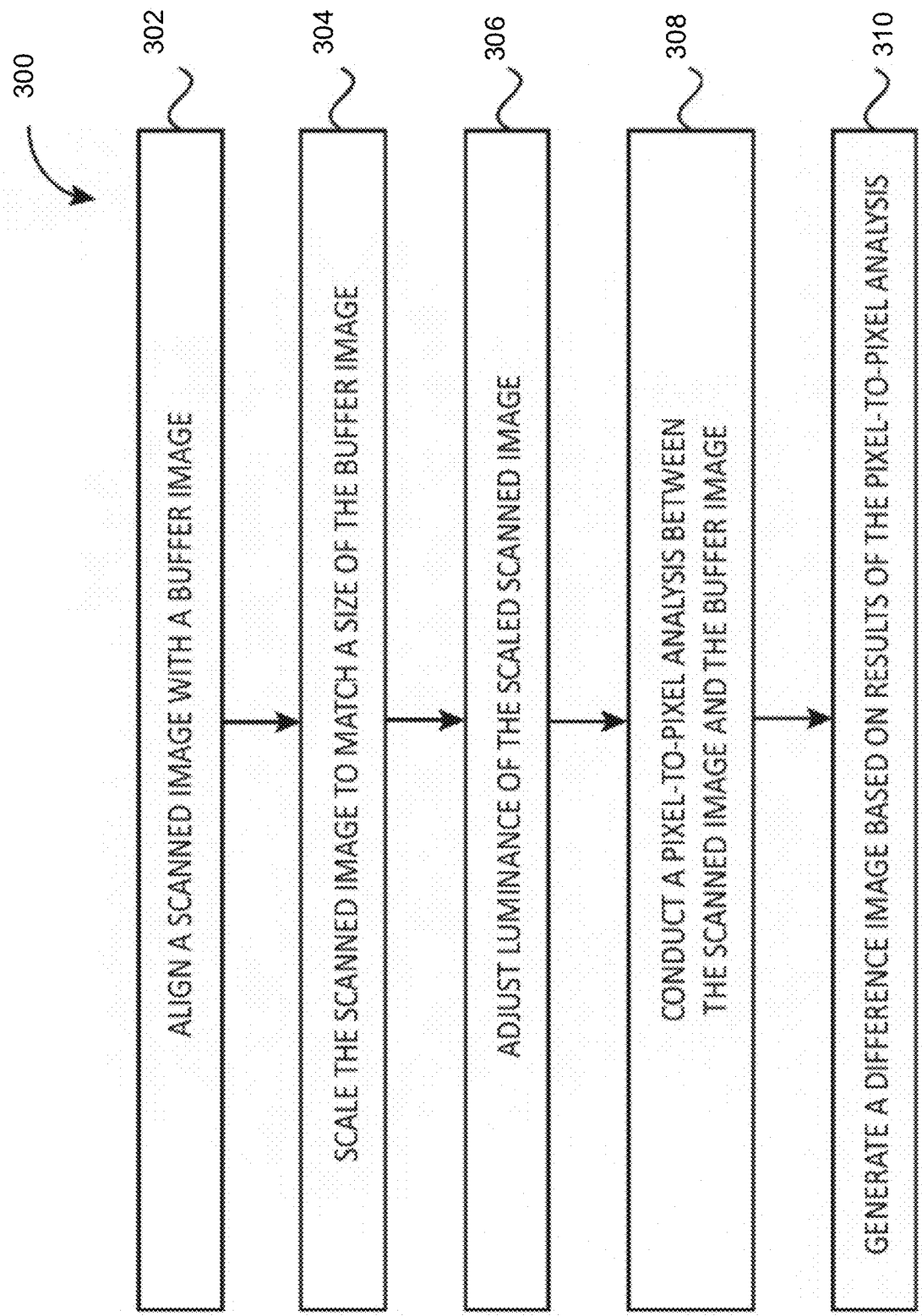
FIG. 3 schematically depicts a method for generating a difference image, according to an embodiment.

FIG. 3 shows a method 300 for generating a difference image, according to an embodiment. At step 302, a scanned image is aligned with a reference image. At step 304, the scanned image is scaled to match a size of the reference image. At step 306, luminance of the scaled scanned image is adjusted. At step 308, a pixel-to-pixel analysis is conducted between the scanned image and the reference image. And at step 310, a difference image is generated based on results of the pixel-to-pixel analysis.

In an embodiment, the method 300 can include obtaining the scanned image using a printer-verifier device. The scanned image can include an image of a printed media (e.g., a label or a tag), and may be generated by stitching together a series of consecutive linear images of the media. In an embodiment, the stitched images may be 2D in case a different imaging technology is used to acquire the images. The reference image can include a print command string, and be stored internally in the printer memory, or in an external database, such as a cloud database. The external database may be updated over time.

The method 300 can also include analyzing the difference image to identify one or more printing errors. For example, the method can include detecting at least one of ribbon wrinkles, printhead and/or media contamination, platen roller contamination, black and/or white banding, and/or black and/or white ink split. Scaling the scanned image at 304 can include stretching or compressing the scanned image in a transverse direction and/or longitudinal direction.

Figure 4:
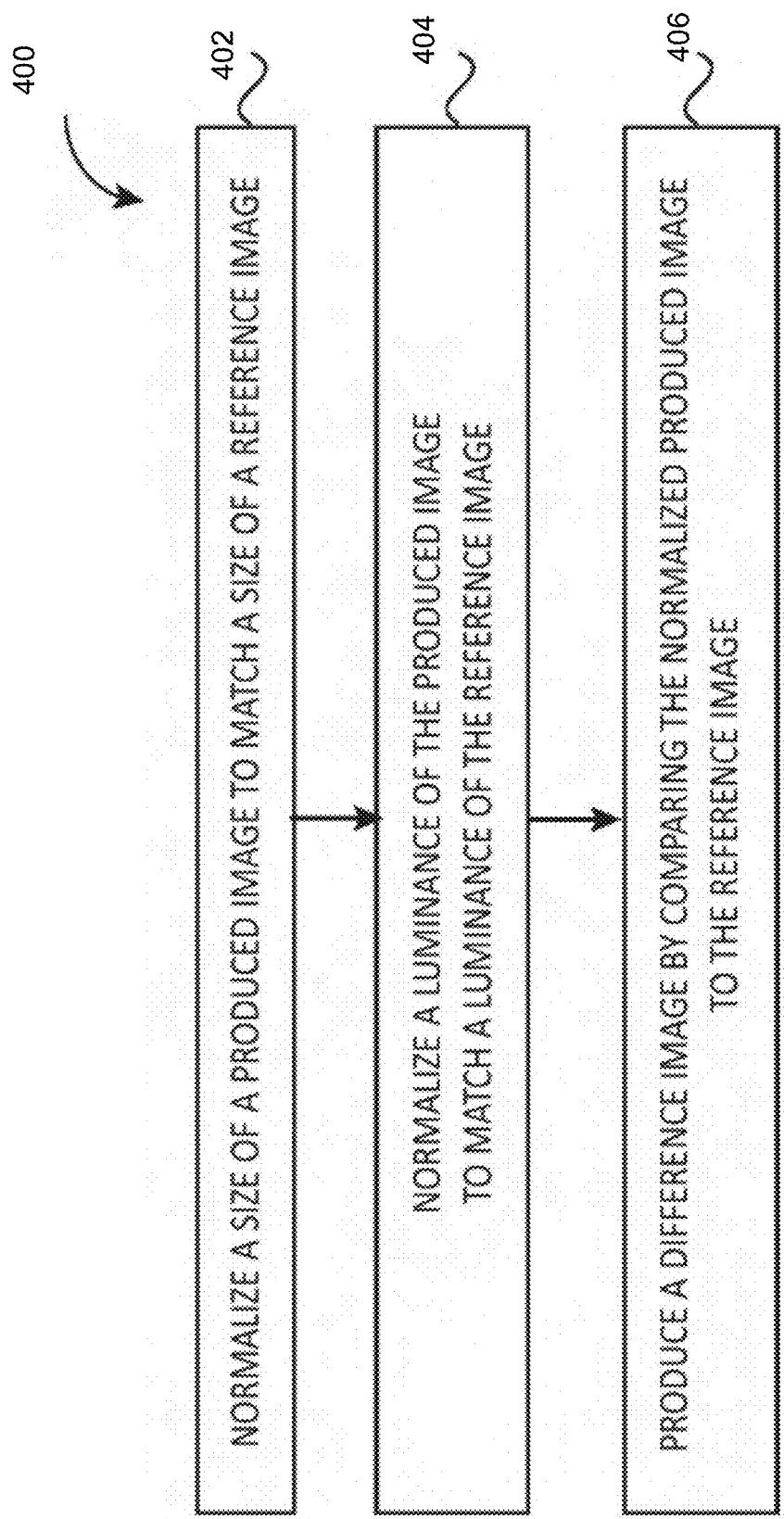
FIG. 4 schematically depicts a method for image processing, according to an embodiment.

FIG. 4 shows a method 400 for image processing, according to an embodiment. At step 402, a size of a produced image is normalized to match a size of a reference image. At step 404, a luminance of the produced image is normalized to match a luminance of the reference image. And at step 406, a difference image is produced by comparing the normalized produced image to the reference image.

The method 400 can include capturing the produced image with an image scanning device, e.g., an integrated verifier device. Comparing the normalized produced image to the reference image at step 406 can include comparing information of the produced image to a print command string. The reference image can be stored internally, or in an external database, such as a cloud database. The database may be updated over time.

In an embodiment, normalizing a luminance at step 404 can include performing level adjustment to match white and/or black colors in the produced image and white and/or black colors in the reference image. Additionally or alternatively, normalizing a luminance at step 404 can include performing level adjustment to match red, green and/or blue colors in the produced image and red, green and/or blue colors in the reference image. Normalizing a size of a produced image at step 402 can include adjusting a size of the produced image to align corners and/or edges of the produced image with corners and/or edges of the reference image. Additionally or alternatively, normalizing a size of a produced image at step 402 can include equalizing a distance between a rightmost printed area and a leftmost printed area of the image.

In an embodiment, the method 400 can include detecting one or more printing defects. For example, the printing defects can include detecting at least one of ribbon wrinkles, printhead and/or media contamination, platen roller contamination, black and/or white banding, and/or black and/or white ink split. For instance, to detect ribbon wrinkles, neighboring bright pixels in the difference image can be consecutively connected to form one or more lines. To detect printhead and/or media contamination, bright pixels located within a predetermined radius in the difference image can be connected to form one or more voids. To detect uneven printout, such as banding or ink split, co-located bright pixels in the difference image can be assembled in groups. Secondary analysis can also be applied for further defect recognition.

Figure 5:
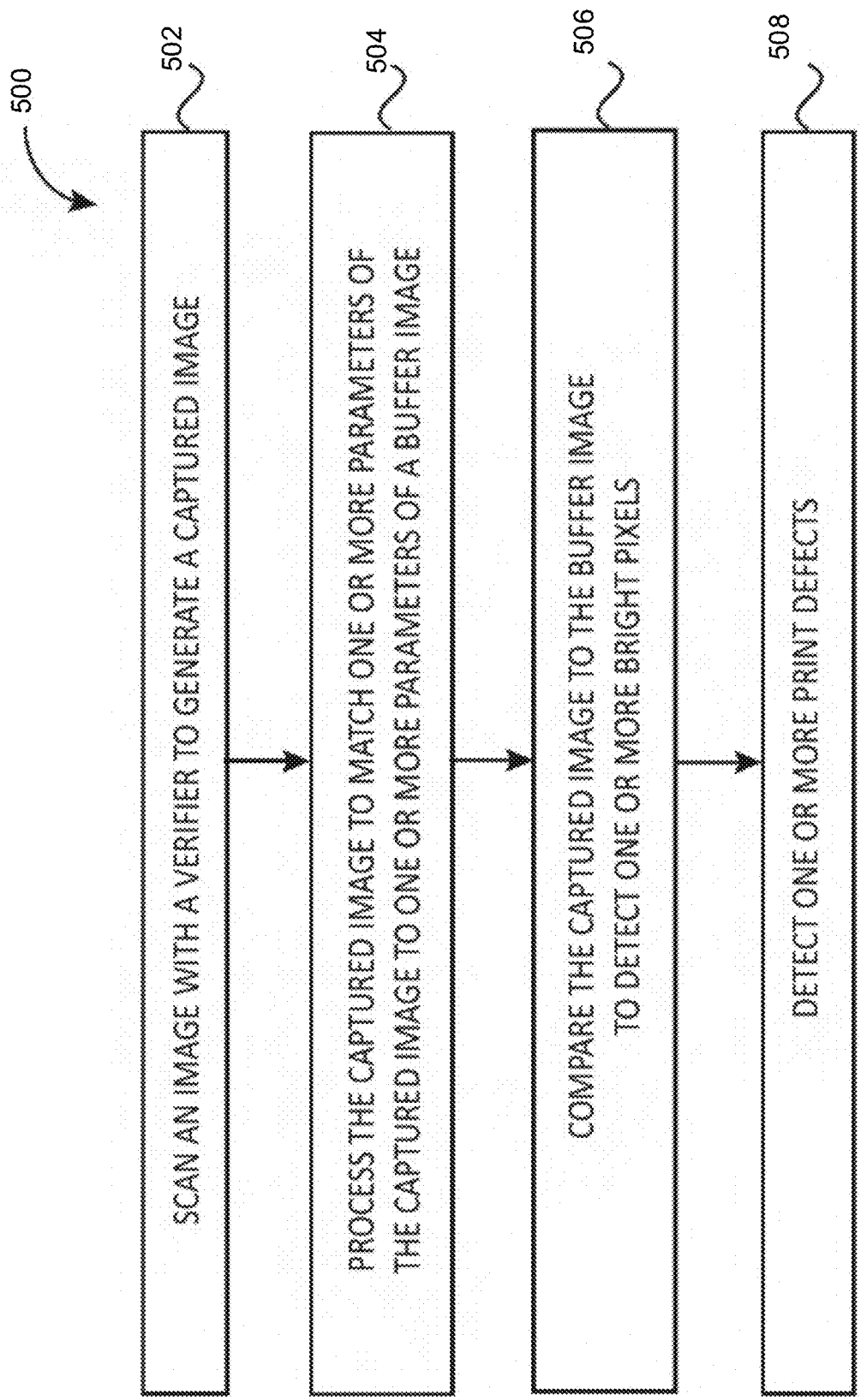
FIG. 5 schematically depicts a method for print defect detection, according to an embodiment.

FIG. 5 shows a method 500 for print defect detection, according to an embodiment. At step 502, an image is scanned with a verifier to generate a captured image. At step 504, the captured image is processed to match one or more parameters of the captured image to one or more parameters of a reference image. At step 506, the captured image is compared to the reference image to detect one or more bright pixels. At step 508, one or more print defects are detected.

In an embodiment, processing the captured image at step 504 can include scaling, rotating, adjusting luminance and/or adjusting one or more colors. Comparing the captured image to the reference image at step 506 can include comparing a binary version of the captured image to a binary version of the reference image. Capturing an image with a verifier at step 502 can include capturing an image displaying a barcode symbol, text, and/or graphics.

In an embodiment, the method 500 can include performing a bright pixel analysis. For example, performing a bright pixel analysis can include grouping and/or connecting bright pixels located within a predetermined distance from each other. For instance, neighboring bright pixels in the difference image can be consecutively connected to form one or more lines and/or voids. Additionally or alternatively, co-located bright pixels in the difference image can be assembled in groups. Secondary bright pixel analysis can be performed for further printing defect analysis.

III. THERMAL PRINTHEAD CONTAMINATION DETECTION

In accordance with an embodiment, there are two primary indications of printhead contamination. The first is localized reduced heat conduction causing less ribbon color to be transferred for thermal transfer ribbon (TTR) printing or a lighter color for direct thermal (DT) printing (referred to as Case I herein). The second is when contamination causes the media to lose contact with the printhead and no localized color is printed (referred to as Case II herein).

Figure 6A:
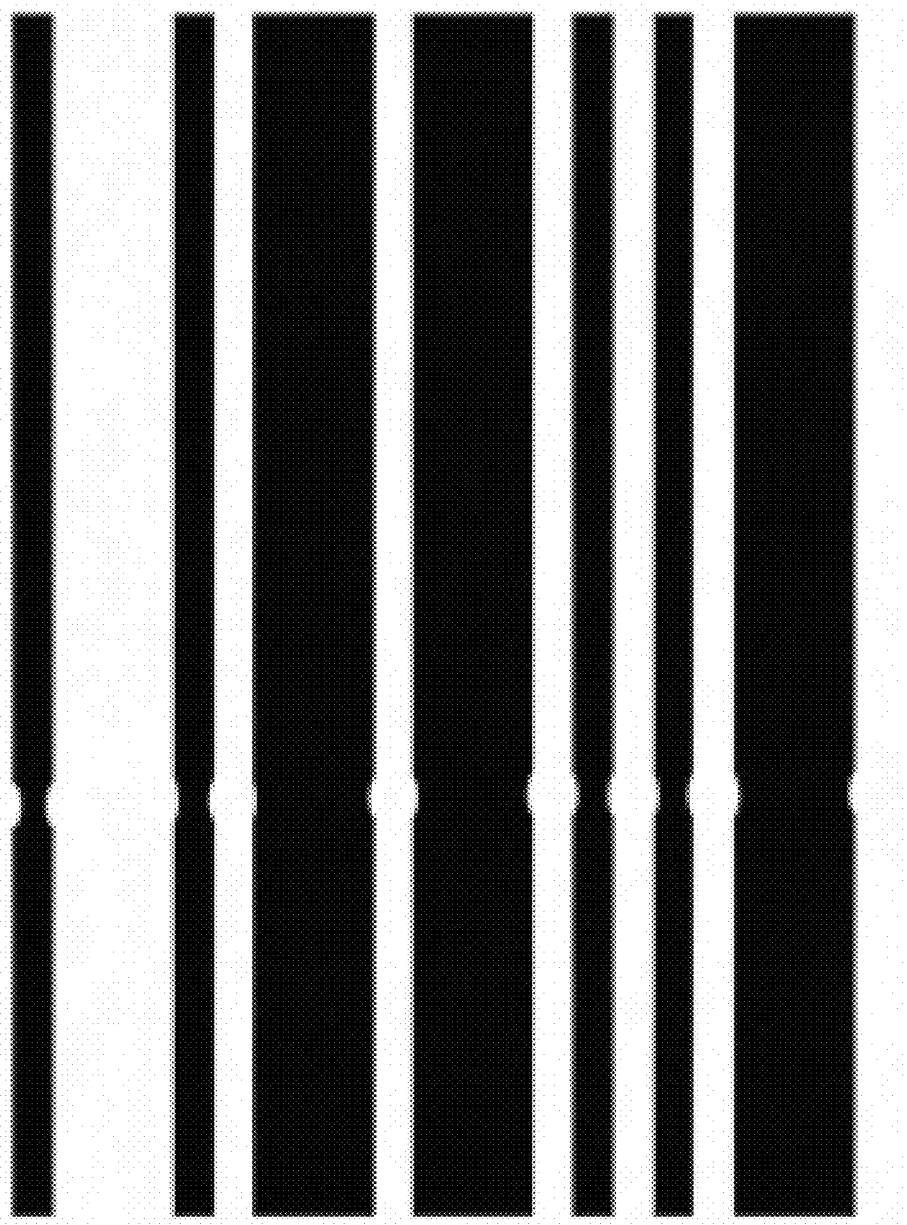
FIG. 6A schematically depicts an exemplary embodiment of a portion of a typical barcode printed with printhead contamination.

When contamination slowly accumulates on the printhead (Case I), the heat transfer gradually becomes less efficient. At the early stage of Case I, this is difficult to detect in the printing and is not problematic. As contamination gets worse, the printing suffers specific distortions that can be detected with a verifier. This can be illustrated with barcodes printed in "ladder" configuration. FIG. 6A demonstrates a typical case where a barcode is printed using a contaminated thermal printhead. Specifically, the reduced heating of the ribbon, or of the thermally sensitive coating for TD printing, causes less color to be apparent on the label. Every bar is affected in this illustration, but in general the narrow bars are affected slightly more than the wide bars. Note that only the first few bars of the symbol are shown.

This type of printing distortion may not cause a noticeable drop in print quality grades (e.g., as measured according to widely accepted norms ISO/IEC 15415 for 2D barcodes and ISO/IEC 15416 for linear barcodes, often called "ANSI grading"). Because grading occurs along a number of scan paths that are perpendicular to the bars, even if one scan path hits the distortion, the other paths may average it out. Similarly, scanning performance is not adversely affected. Significant problems with this type of distortion may occur when barcode symbols are arranged in the "picket fence" configuration (e.g. where the bars are arranged perpendicular to the movement of the print media), as well as with text and/or graphics. As contamination lingers on the printhead, permanent printhead damage becomes more likely.

One algorithm for detecting this type of contamination can start with identifying a barcode symbol in a verifier image and analyzing "scan lines" parallel to the motion of the media (i.e., perpendicular to the bars in the example shown in FIG. 6A). The "scan lines" are the reflectance values of every pixel in the image scanner as the media moves under the scan head. In this example, the printer-verifier includes a line scan head arranged perpendicular to the media motion that captures successive line images and assembles them into a two-dimensional image that may be nearly indistinguishable from a single image taken by a digital camera.

The algorithm can compute element widths of each scan line using a suitable threshold, e.g., (Rmax+Rmin)/2. Although the image shown in FIG. 6A is "perfect," the image from an actual printed label may show minor variations in the widths of the bars. One way to minimize this effect is to average the widths for a group of bars, e.g., all the narrow bars. Generally, there may be more than 20 or so narrow bars in a typical barcode, thus making the averaging step particularly powerful. Although FIG. 6A shows a linear (1D) barcode to exemplify the present invention, a 2D barcode (either matrix or stacked) can be analyzed as well to determine if repetitive distortion in the direction of printing is present.

Figure 6B:
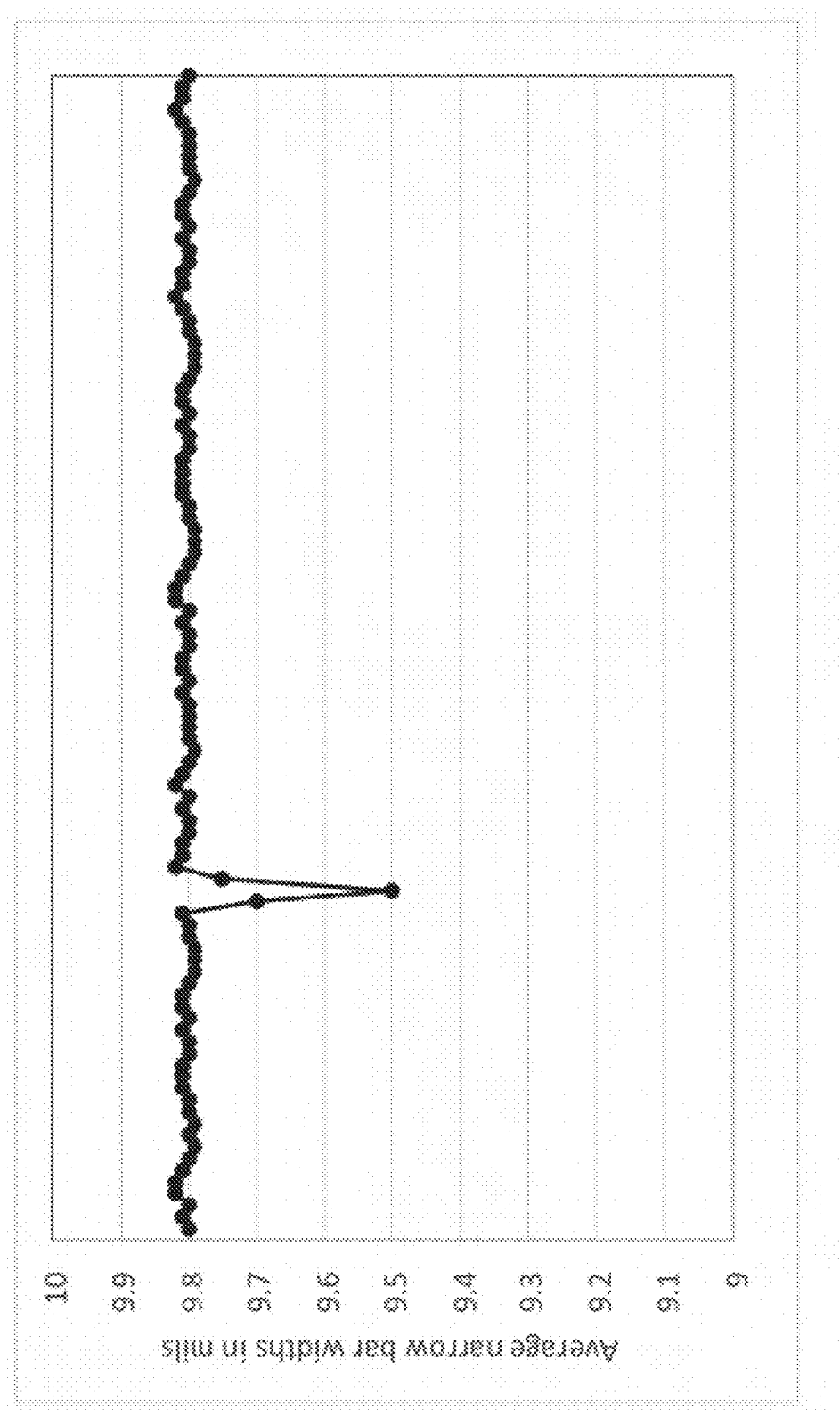
FIG. 6B graphically depicts a plot of average narrow bars widths across the barcode shown in FIG. 6A.

Once the element widths of the narrow bars are averaged for every scan line in the image, they can be plotted. It is important to note that the printing distortion from a contaminated printhead is parallel to the media motion. Consequently, distortions that do not occur in the same place in every sequentially printed area are not caused by printhead contamination. FIG. 6B shows a plot of the average narrow bar widths across the barcode symbol section shown in FIG. 6A. Here, the fact that printing distortion is located in the same place in every printed bar makes it particularly easy to detect using the averaging technique.

In other embodiments, narrow spaces may be used instead of narrow bars. Additionally, linear barcodes with more than two element widths can be analyzed. Most combination of small and large bars and spaces may be combined to provide a stable measurement of Case I and Case II contamination.

Another algorithm that can be used for detecting Case I distortions involves a pattern match between reference and what the verifier detects in the image. Such algorithm does not dependent on the type of printing.

In an embodiment, the reference may include a print command string, which is computer code that can be shown graphically (where a "to print" command is depicted as black and a "no-print" command is depicted as white). They are rearranged into rows and columns to mimic approximately what the printed image will look like. The graphically rearranged print command string can be referred to as a "reference" or "reference image."

Figure 6C:
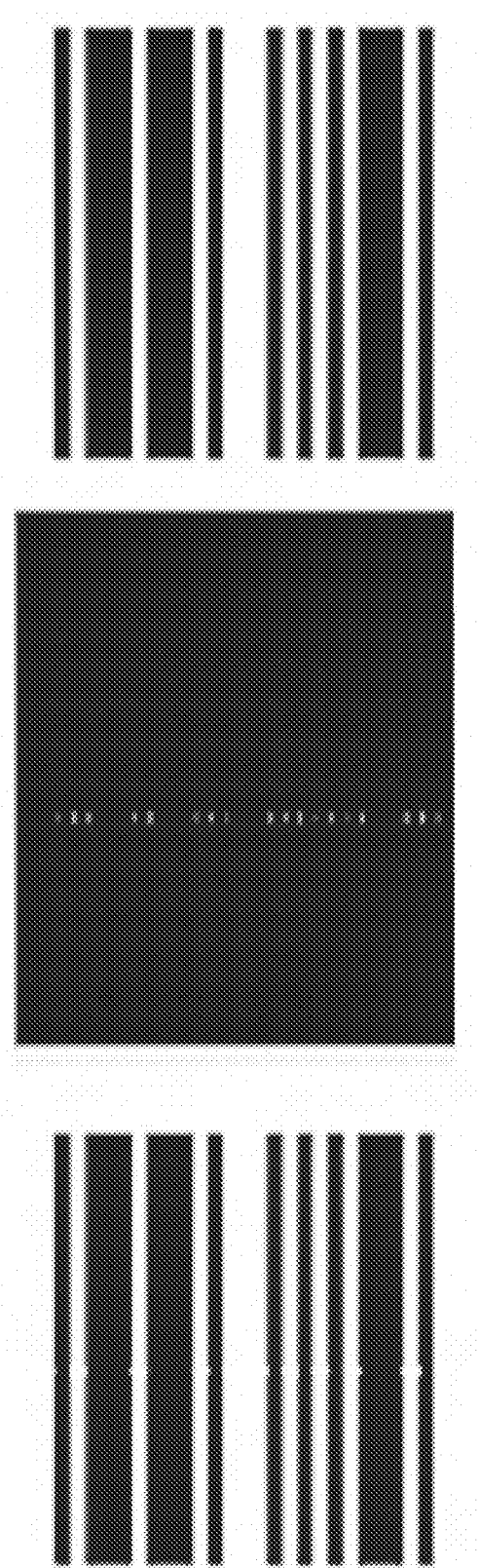
FIG. 6C schematically depicts an exemplary embodiment of pattern match analysis for the barcode shown in FIG. 6A.

FIG. 6C shows an example based on the image from FIG. 6A, although this technique may be equally applicable to situations where printhead contamination shows up in text, 2D barcodes, and/or graphics. Specifically, the rightmost image in FIG. 6C is an image buffer, which may be stored in the printer and eventually shifted out to the printhead when printing. The leftmost image is an illustrative image simulating a barcode printed with a contaminated printhead similar to FIG. 6A. The middle image is a bit-by-bit difference image, where a clear pattern is visible along the center-left of the barcode.

Figure 6D:
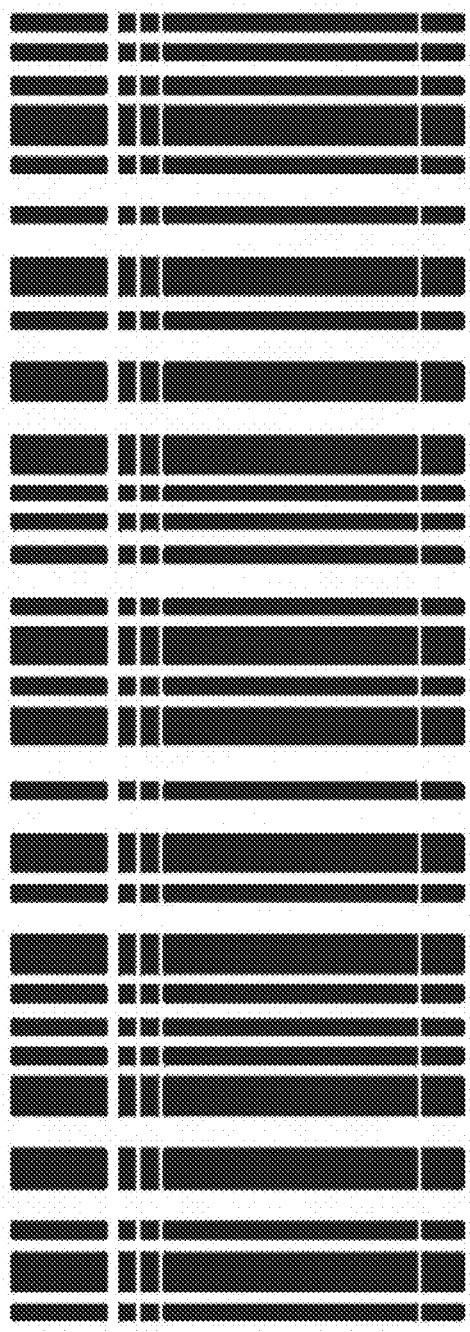
FIG. 6D schematically depicts an exemplary embodiment of a printed label produced with a speck of dust physically adhered to a printhead.

Case II contamination can occur in dusty environments and/or with inexpensive media, where a speck of material adheres to the printhead, causing a complete void in the printing. Case II contamination printing looks identical to label printed with a "burned out dot" (i.e., a dot that can no longer produce heat) in the printhead, and manifests itself as an unprinted line running from one end of the label to the other perpendicular to the printhead. This type of printhead contamination can be particularly damaging to the printhead. FIG. 6D shows an example of a printed label made with a Case II contaminated printhead.

Case II contamination can be detected using similar algorithms to Case I contamination. When an integrated printer-verifier is used, the printer may be configured to detect when a dot is "burned out" by measuring printhead resistance. Therefore, if the printer shows that no dots are "burned out," and algorithms for detecting printing caused by burned out dots return a positive value, then the printer-verifier can conclude with a high degree of certainty that there is Case II printhead contamination.

Other Case II scenarios that can be detected by the present invention include but are not limited to: overheated media (some popular products on the market today may consistently fracture the thermal layer if overheated); preprinted or floodcoated direct thermal media (the inks will typically build up on the printhead more quickly than the base material); adhesives (aggressive, heavy coat weight, or cold-temperature adhesives that are prone to flow and build up on the printhead can be detected long before they become Case II contamination problems).

There are various actions that the printer can be configured to take when printhead contamination is detected. For low levels of Case I contamination, for instance, the printer can transmit a message (e.g., over Wi-Fi, network, or by other means of communication, such as cellular wireless communication, sounds, and/or flashing lights) to the IT department (or other departments responsible for maintenance, such as quality control or inventory) notifying that the printer should be cleaned at the next media roll change. For higher levels of Case I contamination (e.g., when the average narrow bar widths change by more than 5%), a message can be transmitted to the maintenance depai linent to perform a printhead cleaning process within a predetermined timeframe, such as the next hour for instance. Additionally or alternatively, a specially formatted printed label can notify the user to stop the print run and clean the printhead. For high levels of Case I contamination or when Case II contamination is detected, the printer can be configured to notify the IT department, print a label telling the user to clean the printhead immediately and/or stop the printer until the printhead is cleaned.

Additionally or alternatively, the algorithm may include modifying the thermal management (firing the dot earlier, longer, or hotter) to offset the effects of Case I contamination, while notifying the user/maintenance/IT about the need to clean the printhead. This may improve print quality prior to printhead cleaning, which may be particularly valuable for printing high ANSI-grade-mandated symbols in healthcare, retail (compliance labeling for major retailers), electronics (wireless phone distribution to major carriers), and other fields relying on high-quality symbols. Degraded-quality symbols may lead to penalties in the form of returned shipments or charge-backs for increased handling (required when the pallet label does not scan, and the retailer/carrier must manually scan each carton on the pallet).

Additionally, instead of an integrated printer-verifier, a stand-alone verifier (for example, as described below in connection with FIG. 22) can be used with the algorithms of the present invention. For instance, during a normal statistical quality check (e.g., every 100th label is brought to a verifier to measure its ANSI grade), the verifier can have a special setting to notify the user about printhead contamination and optionally prescribe a recommended course of action (such as to clean the printhead).

The algorithms described herein can be implemented into a hand-held barcode scanner or scanner-enabled mobile terminal. In these cases, the scanner may be programmed to transmit the data to its host and perform a secondary transmission to the quality department, and/or to maintain a running file of printhead contamination for later use by the maintenance department at the end of a shift.

The resulting printer's capability to validate that the dot is firing normally can enable the printer to positively identify contamination versus a failed printhead, thereby saving the cost of an unnecessary replacement due to misdiagnosis. Additionally, the present invention can assist in defining appropriate cleaning protocols. The most common cleaning methodology is cleaning the printhead with a cloth, nonwoven card, or swab that is saturated with isopropyl alcohol. This combination may be rather inefficient for removing some common forms of buildup, such as Case II contamination, that may be better eliminated with very fine abrasive sheets. However, use of abrasive sheets on printheads without contamination will abrade the protective coatings on the printhead, leading these to be rarely recommended for fear of accelerating printhead wear. Positive identification of the type of buildup, and validating the effectiveness of cleaning methodologies, can enable a data-driven and optimized recommendation for printhead cleaning and maintenance, extending printhead life and reducing total cost of ownership.

Figure 7:
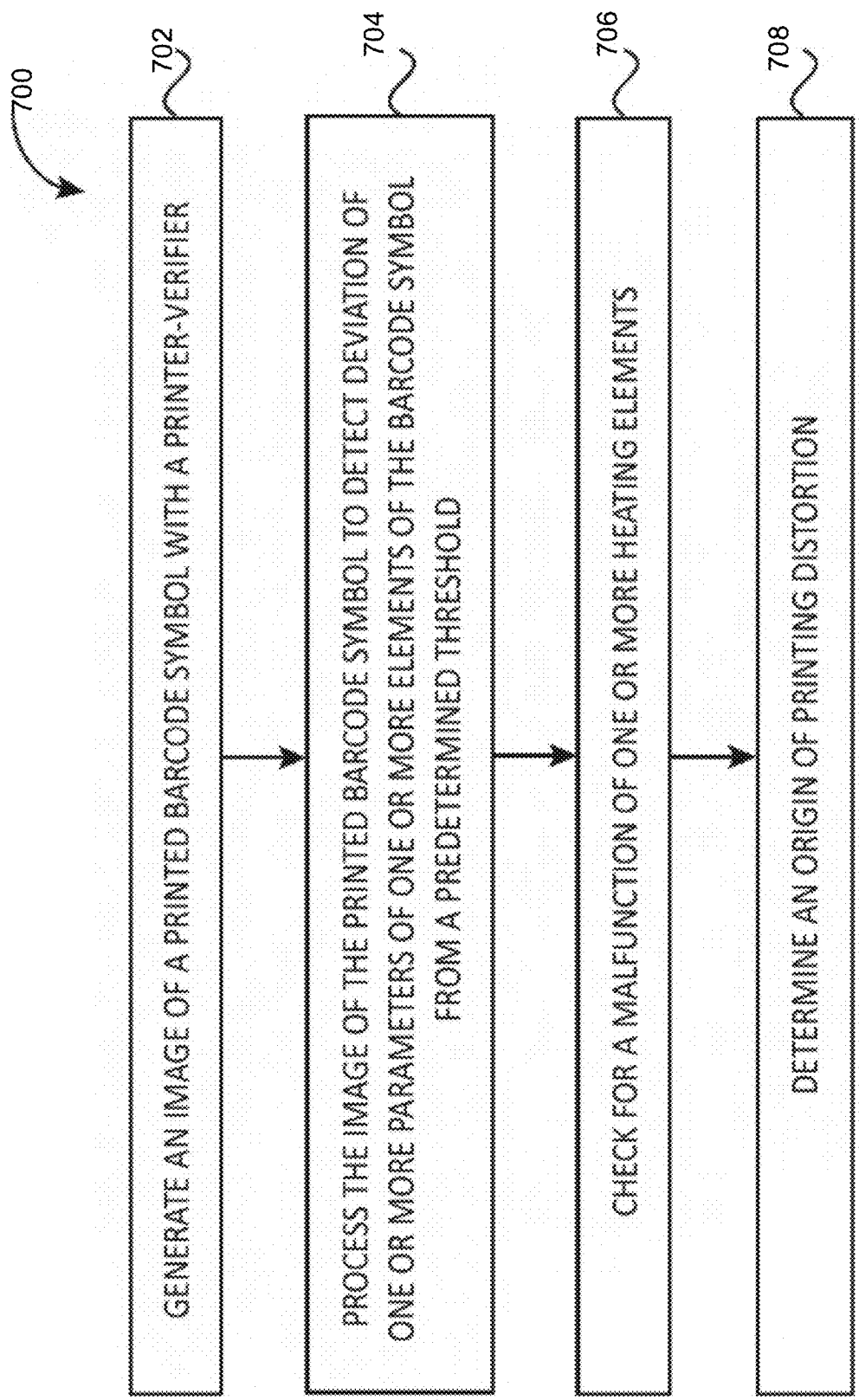
FIG. 7 schematically depicts a method for determining an origin of printing distortion, according to an embodiment.

FIG. 7 shows a method 700 for determining an origin of printing distortion, according to an embodiment. At step 702, an image of a printed barcode symbol is generated with a printer-verifier. At step 704, the image of the printed barcode symbol is processed to detect deviation of one or more parameters of one or more elements of the barcode symbol from a predetermined threshold. At 706, checking for a malfunction of one or more heating elements is performed. At step 708, an origin of printing distortion is determined.

In an embodiment, processing the image of the printed barcode symbol at 704 can include calculating widths of the one or more elements of the barcode symbol. The method 700 can further include averaging the calculated widths for a group of the elements of the barcode symbol. Additionally, the averaged widths can be plotted. Processing the image at 704 can also include comparing the image with a reference image. Additionally, processing the image can include processing the image with an image processor.

Checking for a malfunction of one or more heating elements can include checking for a burnout of one or more heating elements. For example, the method 700 can include sensing temperature and/or resistance of the thermal printhead.

Figure 8:
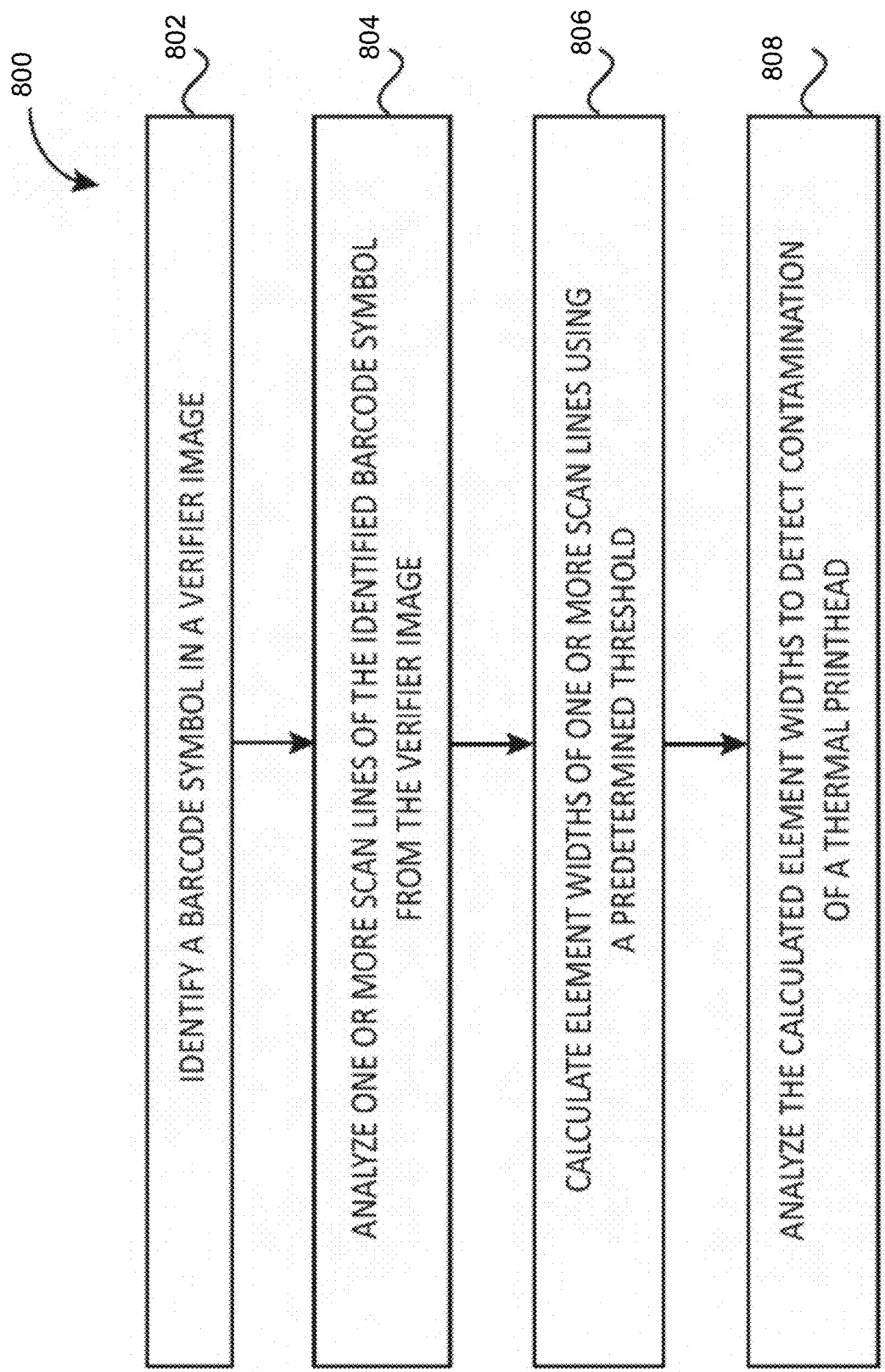
FIG. 8 schematically depicts a method for detecting a contaminated thermal printhead, according to an embodiment.

FIG. 8 shows a method 800 for detecting a contaminated thermal printhead, according to an embodiment. At step 802, a barcode symbol is identified in a verifier image. At step 804, one or more scan lines of the identified barcode symbol from the verifier image are analyzed. At step 806, element widths of the one or more scan lines are calculated using a predetermined threshold. At step 808, the calculated element widths are analyzed to detect contamination of a thermal printhead.

In an embodiment, identifying a barcode symbol in a verifier image at step 802 can include identifying a barcode symbol in an image obtained from a verifier device, for example an integrated printer-verifier device. Analyzing the calculated element widths at step 808 can include plotting an average deviation within a group of the element widths. Calculating element widths at step 806 can include calculating widths of one or more narrow bars and/or narrow spaces between bars of the barcode. The method 800 can further include issuing a notification reporting the detected contamination, and prescribing a recommended course of action.

Figure 9:
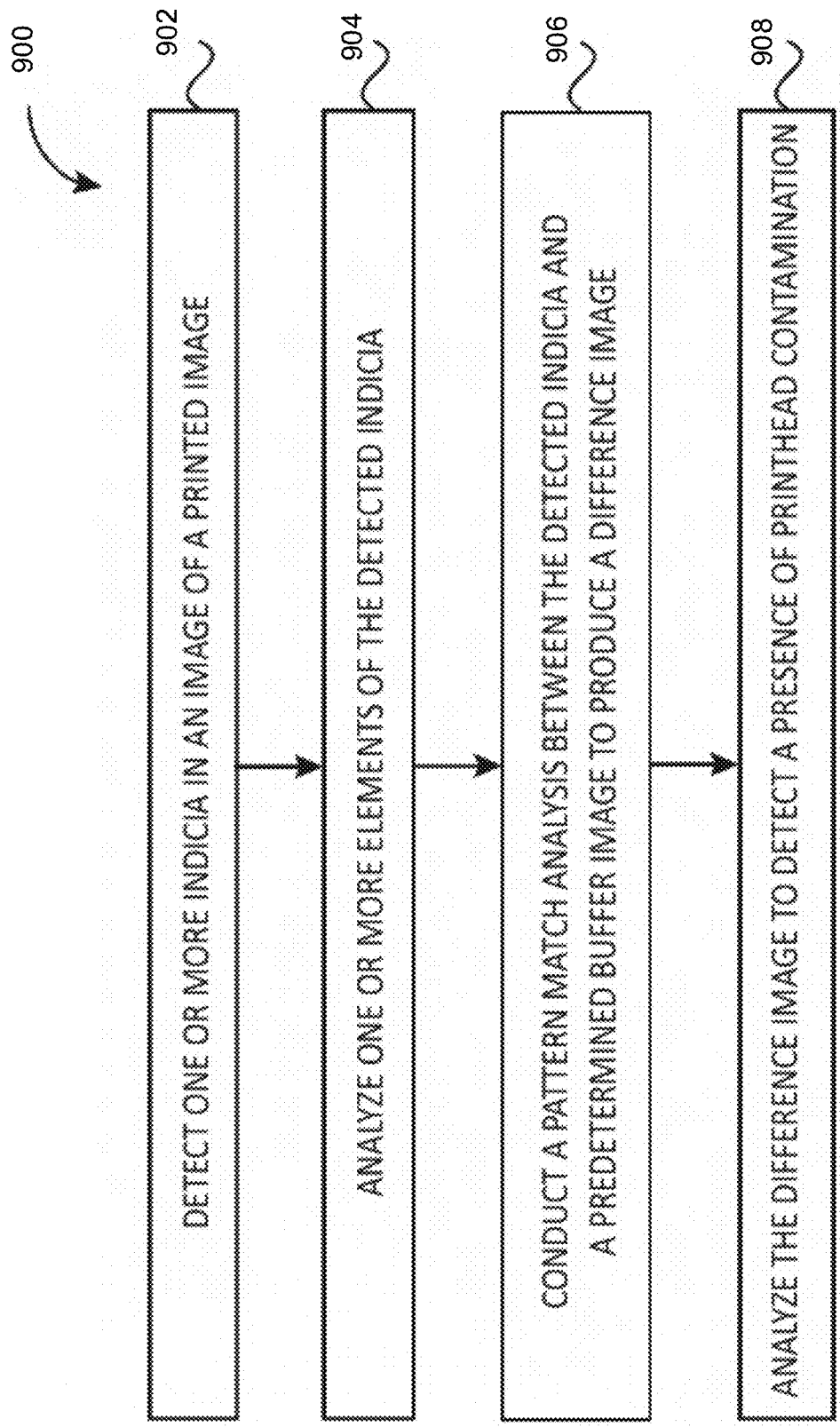
FIG. 9 schematically depicts a method for detecting printhead contamination, according to an embodiment.
Figure 10:
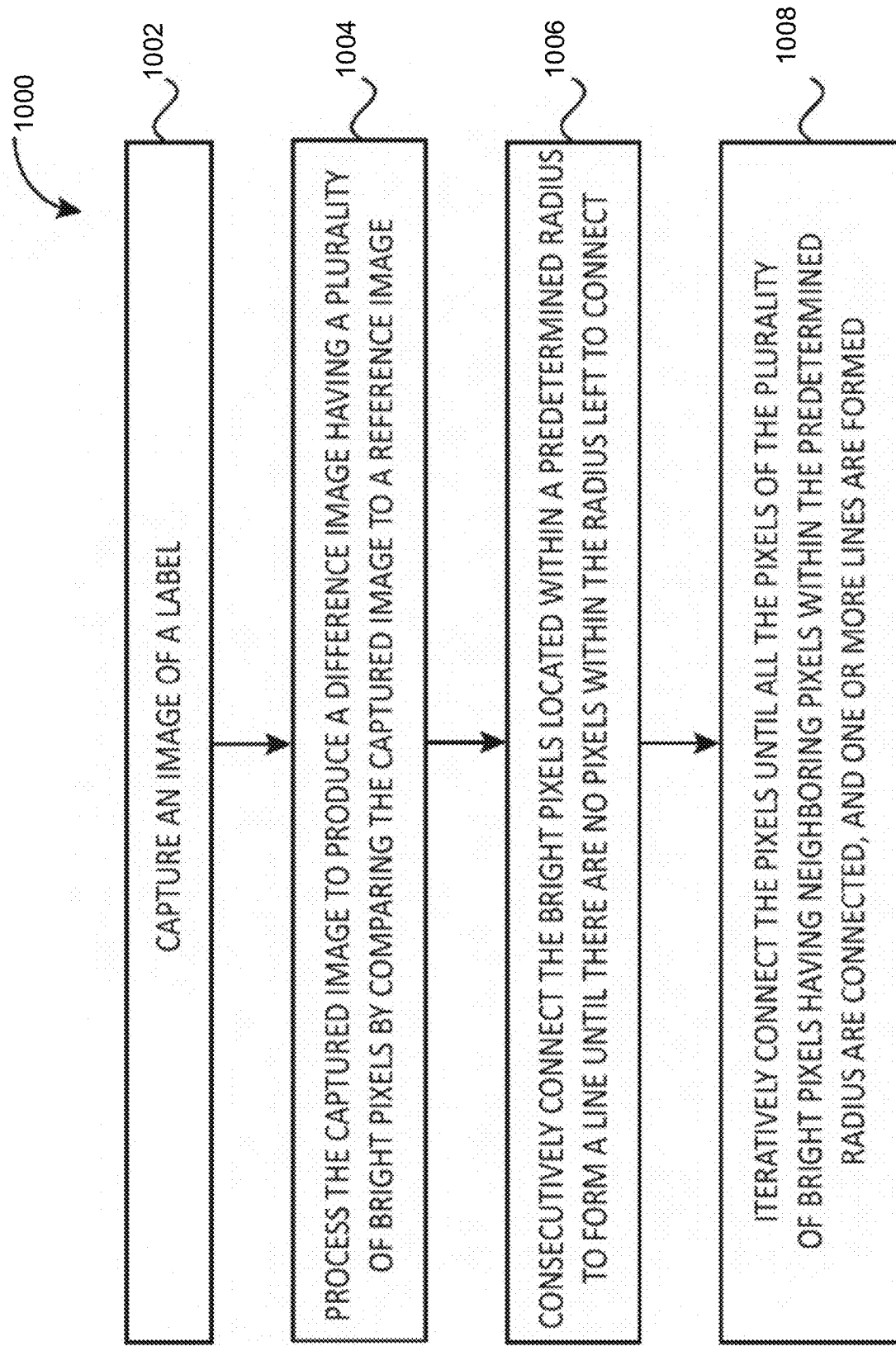
FIG. 10 schematically depicts an image processing method, according to an embodiment.

FIG. 9 shows a method 900 for detecting printhead contamination, according to an embodiment. At step 902, one or more indicia are detected in an image of a printed image. At step 904, one or more elements of the detected indicia are analyzed. At step 906, a pattern match analysis is conducted between the detected indicia and a reference image to produce a difference image. At step 908, the difference image is analyzed to detect a presence of printhead contamination.

In an embodiment, detecting one or more indicia at step 902 can include detecting indicia using a verifier integrated into a thermal printer. Detecting indicia can include detecting one or more 1D barcodes, 2D barcodes, graphics, and/or text.

The method 900 can further include reporting the presence of printhead contamination. The reporting can include sending a message to an entity responsible for printhead maintenance and/or printing a specifically formatted label. The method 900 can further include triggering one or more predetermined actions in response to the detected contamination, wherein the predetermined actions are selected based on user sensitivity or preference to print quality. For example, some users may want to know only if there is a speck of contamination that impacts scannability, while others may be highly sensitive to minor fluctuations in print quality.

IV. PLATEN ROLLER CONTAMINATION AND WRINKLE DEFECTS DETECTION

FIG. 1000 shows an image processing method 1000, according to an embodiment. At step 1002, an image of a label is captured. At step 1004, the captured image is processed to produce a difference image having a plurality of bright pixels by comparing the captured image to a reference image. At step 1006, the bright pixels located within a predetermined radius are consecutively connected to form a line until there are no pixels within the radius left to connect. At step 1008, the pixels are iteratively connected until all the pixels of the plurality of bright pixels having neighboring pixels within the predetermined radius are connected, and one or more lines are formed.

In an embodiment, consecutively connecting the pixels at step 1006 can further include monitoring a running average slope defining an orientation of the line being formed. Monitoring a running average slope can include determining an angle of the slope with a point-slope technique. Additionally, the method 1000 can include making a connection between two consecutive pixels when a resulting change in the running average slope does not exceed a predetermined angle threshold (such as a predetermined static and/or dynamic angle value). The method 1000 can further include monitoring an average direction of the running average slope, and making a connection between two consecutive pixels when such connection follows a forward direction of the slope.

A. Wrinkle Detection

Figure 11:
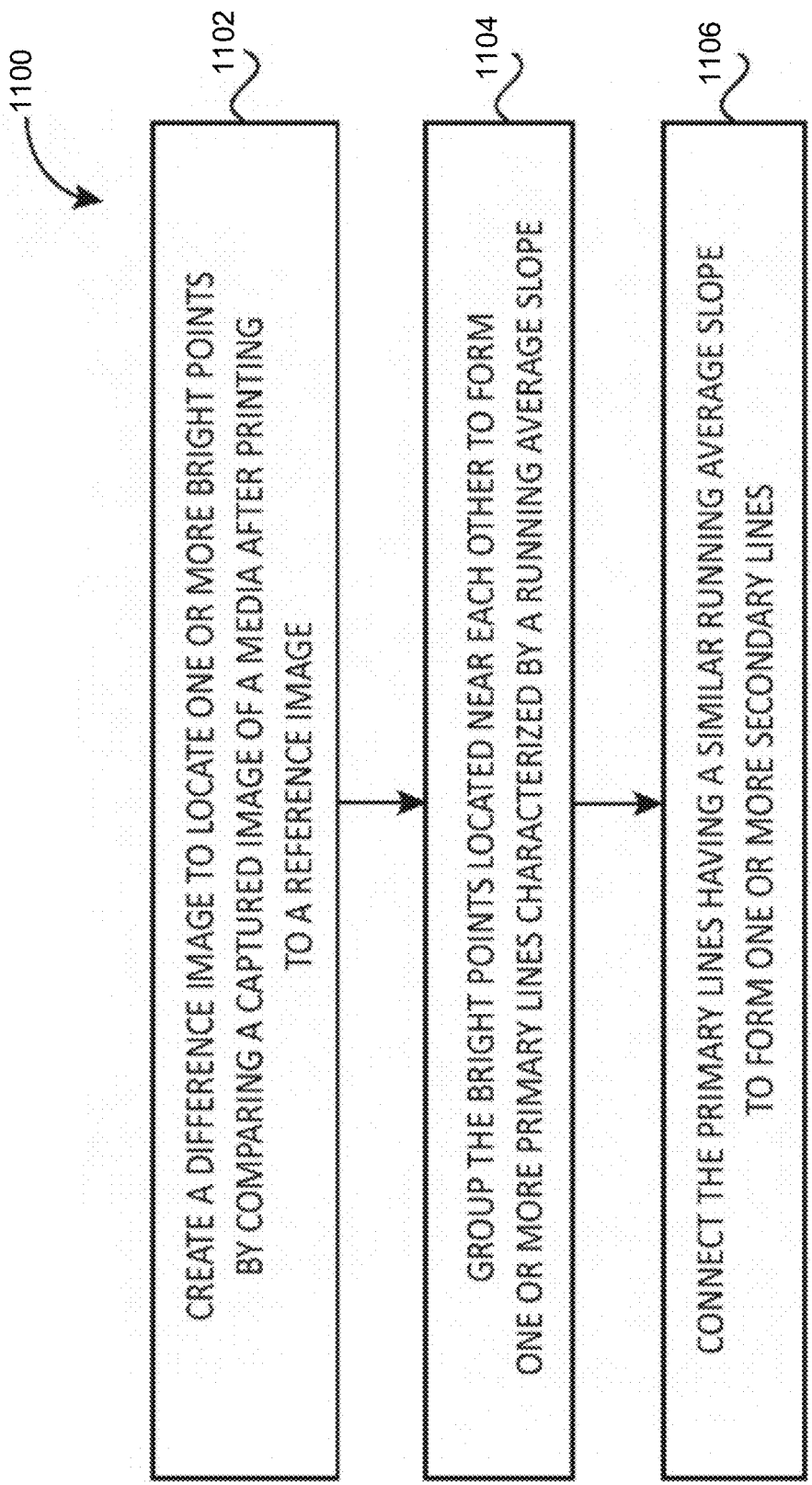
FIG. 11 schematically depicts a method for determining a ribbon wrinkle, according to an embodiment.

FIG. 11 shows a method 1100 for determining ribbon wrinkle, according to an embodiment. At step 1102, a difference image is created to locate one or more bright points by comparing a captured image of a media after printing to a reference image. At step 1104, the bright points located near each other are grouped to form one or more primary lines characterized by a running average slope. At step 1106, the primary lines having a similar running average slope are connected to form one or more secondary lines.

In an embodiment, the method 1100 can include assigning a confidence level value to the one or more primary and/or secondary lines. Additionally, the method 1100 can include requesting capturing an additional image to replace the captured image having one or more primary and/or secondary lines with low confidence level values.

Creating a difference image at step 1102 can include using the reference image stored in a self-learning database. Depending on an embodiment, the database can be external or internal. Additionally, comparing a captured image of a media can include comparing a captured image of a media displaying a barcode.

Figure 12A:
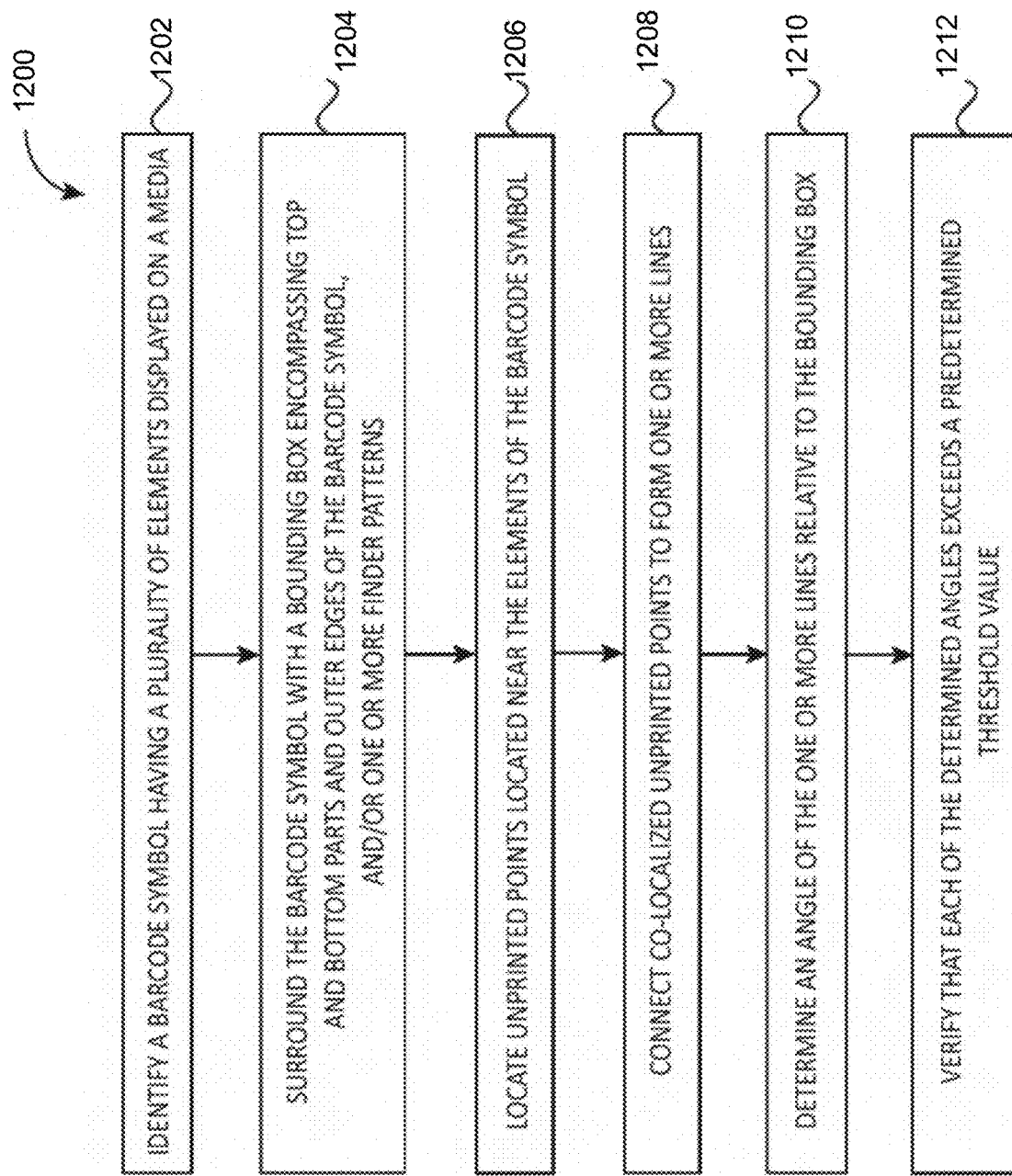
FIG. 12A schematically depicts a ribbon wrinkle detection method, according to an embodiment.
Figure 12B:
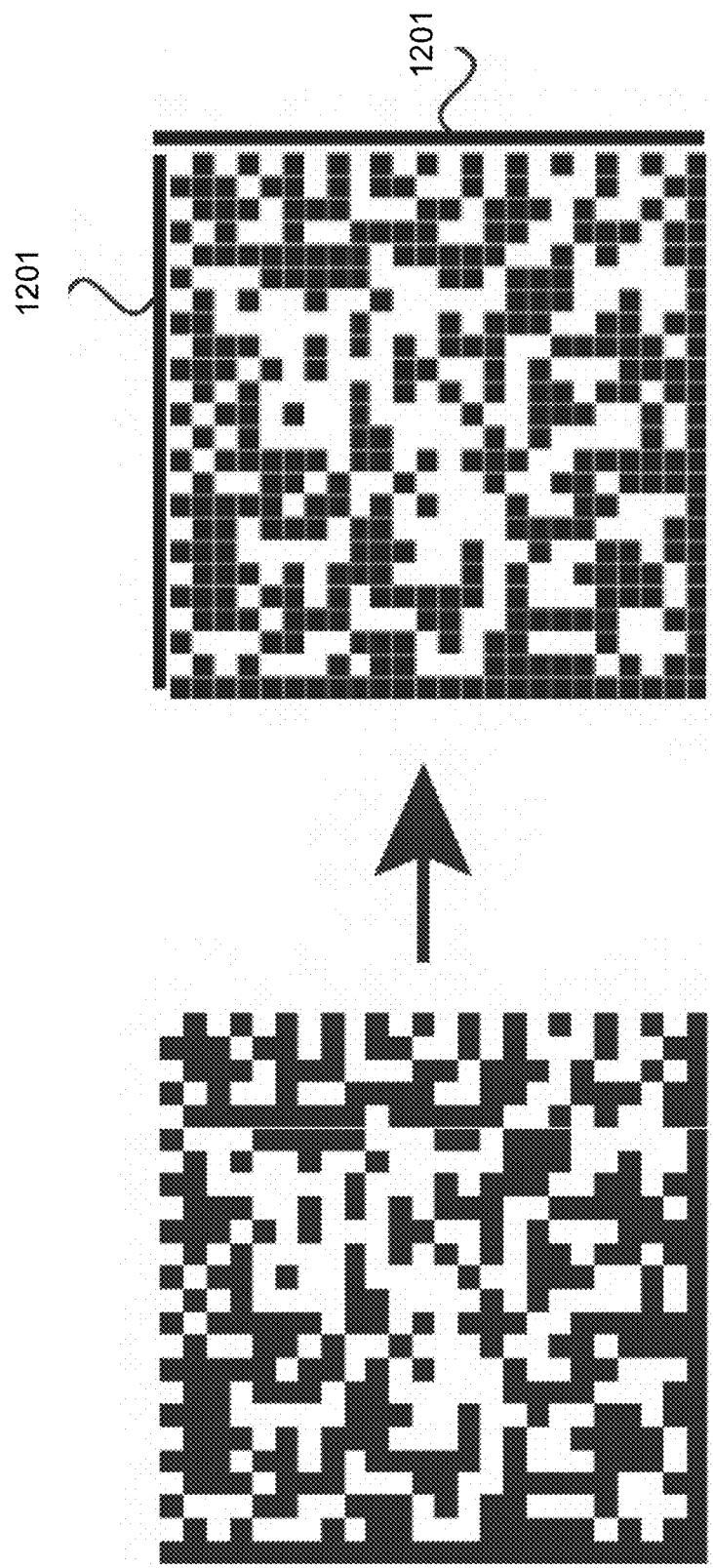
FIG. 12B graphically depicts a 2D barcode symbol (left) and the 2D barcode symbol surrounded with a bounding box (right)

FIG. 12A shows a ribbon wrinkle detection method 1200, according to an embodiment. At step 1202, a barcode symbol having a plurality of elements displayed on a media is identified. At step 1204, the barcode symbol is surrounded with a bounding box encompassing top and bottom parts and outer edges of the barcode symbol, and/or one or more finder patterns. At step 1206, one or more unprinted points located near the elements of the barcode symbol are located. At step 1208, co-localized unprinted points are connected to form one or more lines. At step 1210, an angle of the one or more lines relative to the bounding box is determined. At step 1212, verification that each of the determined angles exceeds a predetermined threshold value is made.

In an embodiment, identifying a barcode symbol at step 1202 can include identifying a two-dimensional barcode symbol. For example, FIG. 12B graphically depicts a 2D barcode (left) and the 2D barcode surrounded with a bounding box 1201 (right). Alternatively, identifying a barcode symbol at step 1202 can include identifying a linear barcode symbol. For example, FIG. 12C graphically depicts a linear barcode (top) and the linear barcode surrounded with a bounding box 1203 (bottom). Additionally, the method 1200 can include determining a number of the one or more lines, and/or displaying a result of the angle verification. Determining an angle at step 1210 can include determining an angle with a point-slope technique. Additionally or alternatively, determining an angle at 1210 can include using a linear regression technique. Verifying that each of the determined angles exceeds a predetermined threshold value at step 1212 can include exceeding a predetermined dynamic angle value, and/or a predetermined fixed angle value.

Figure 13A:
FIG. 13A graphically depicts a printed label having distortions caused by a ribbon wrinkle.
Figure 13B:
FIG. 13B graphically depicts a difference image of the label of FIG. 13A, according to an embodiment.
Figure 13C:
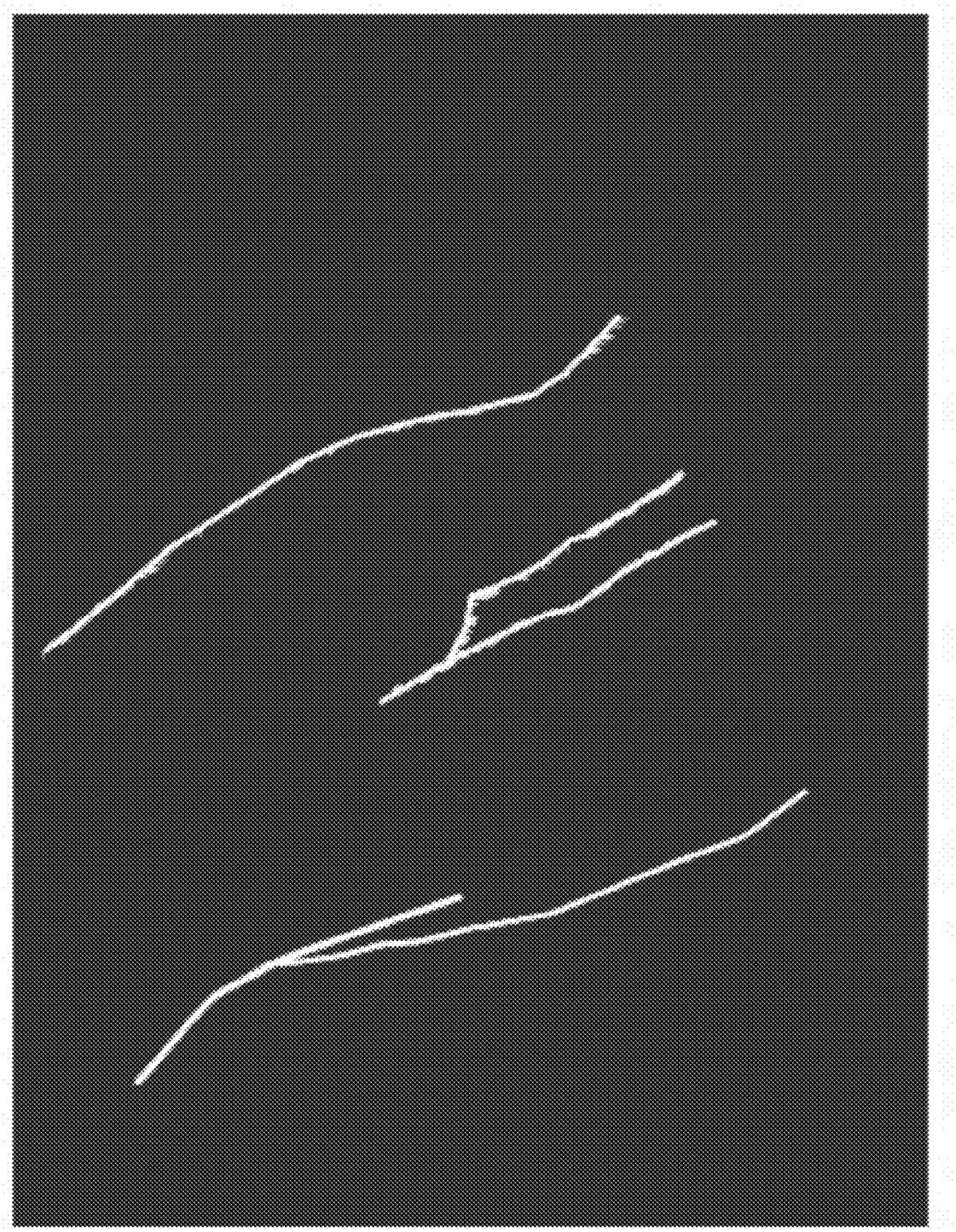
FIG. 13C graphically depicts a pattern made by connecting dots in the difference image of FIG. 13B, according to an embodiment.

FIG. 13A shows a label printed with a wrinkled ribbon. By comparing a computer memory image to be printed to an actual image of the label, one can determine the difference between the intended and the final printed label. As a result, everything that was the same in the intended graphic and the image of the printed label can be shown in black because of a subtractive process. Where there is a difference, any imperfections can be rendered in a grayscale range (where pure white can refer to a full mismatch in pixel comparison). FIGS. 13B and 13C show difference images produced for the label printed with a wrinkled ribbon.

In an embodiment, the difference image can be analyzed using the following algorithm to highlight the bright pixels: based on the (x; y) coordinate of each pixel, vectors between the pixels, their respective slopes, and an average distance between the pixels can be calculated. One can then connect each pixel depending on their proximity with their neighbors as well as the slope change from pixel to pixel, and the void space existing between the pixels.

In an embodiment, a connection algorithm can use the following pixel structure to analyze and group the pixels together during the analysis. Each pixel, noted "P," can have three states:

1. $P_{free}$: the pixel has not been utilized in the algorithm yet;
2. $P_{used}$: the pixel has been used and connected to another pixel; and
3. $P_{bad}$: the pixel is a random dot with no near, usable neighbor pixel.

In addition, each pixel can be assigned a group (1, 2, 3 . . . ) representing the number of an individual wrinkle line found. Hence, a pixel can be defined in a structure with the following information: P {x; y; state; group}. The starting pixel P can be chosen based on P(min(x);min(y)). Its group can then be assigned to 1 and its state can be set to $P_{used}$.

To connect the pixels based on distance, a radius variable can be defined to help determine if a bright pixel belongs to the same group. The algorithm can first check if there is any pixel within the predetermined radius to connect to. If none are present, then the pixel can be marked as $P_{bad}$, meaning that it is a random defect and that it should be ignored. For a pixel that has a neighbor within the vicinity, the algorithm can then check if there are still any pixels free. In this case, P can be connected to the nearest free pixel P'. Once the connection is done, P' can then be assigned the same group number as P, and its state can be changed to $P_{used}$; P' can become the new starting point, and the algorithm can then try to connect P' to the next nearest pixel to form a line. In the case that all nearest pixels are used, the algorithm can jump to:

$$P''(\max(x);\max(y)) \in P_{used}(P(\text{group})),$$

and P'' can become a new starting point.

In the case where P'' has no more free neighbors (all marked $P_{used}$ within the predetermined radius), the algorithm can mark the end of a line for the current wrinkle. The algorithm can then move to the next $P_{free}$ pixel, increasing the group number by one to detect a new wrinkle line. The algorithm can continue until there are no more free pixels; then the algorithm can end, as all or almost all wrinkles have been detected.

In an embodiment, when attempting to link a pixel, a ribbon wrinkle detection algorithm can also take into consideration a slope change when looking at the nearest pixel. The algorithm can calculate a running average slope to determine an orientation of the wrinkle being currently analyzed. If the slope change exceeds a predetermined threshold (+/−60 degrees, for example), then the connection may not be made unless the distance between P and P':

$$\text{dist}(P,P') < (\text{Radius}/k),$$

where k is a rational and positive number.

If the slope does not carry information on the direction of the line, the algorithm may also check if the connection to P' is going "backward" from the existing average direction. Again, the connection may not be made in this case unless dist(P,P')<(Radius/p) is a rational and positive number.

Figure 13D:
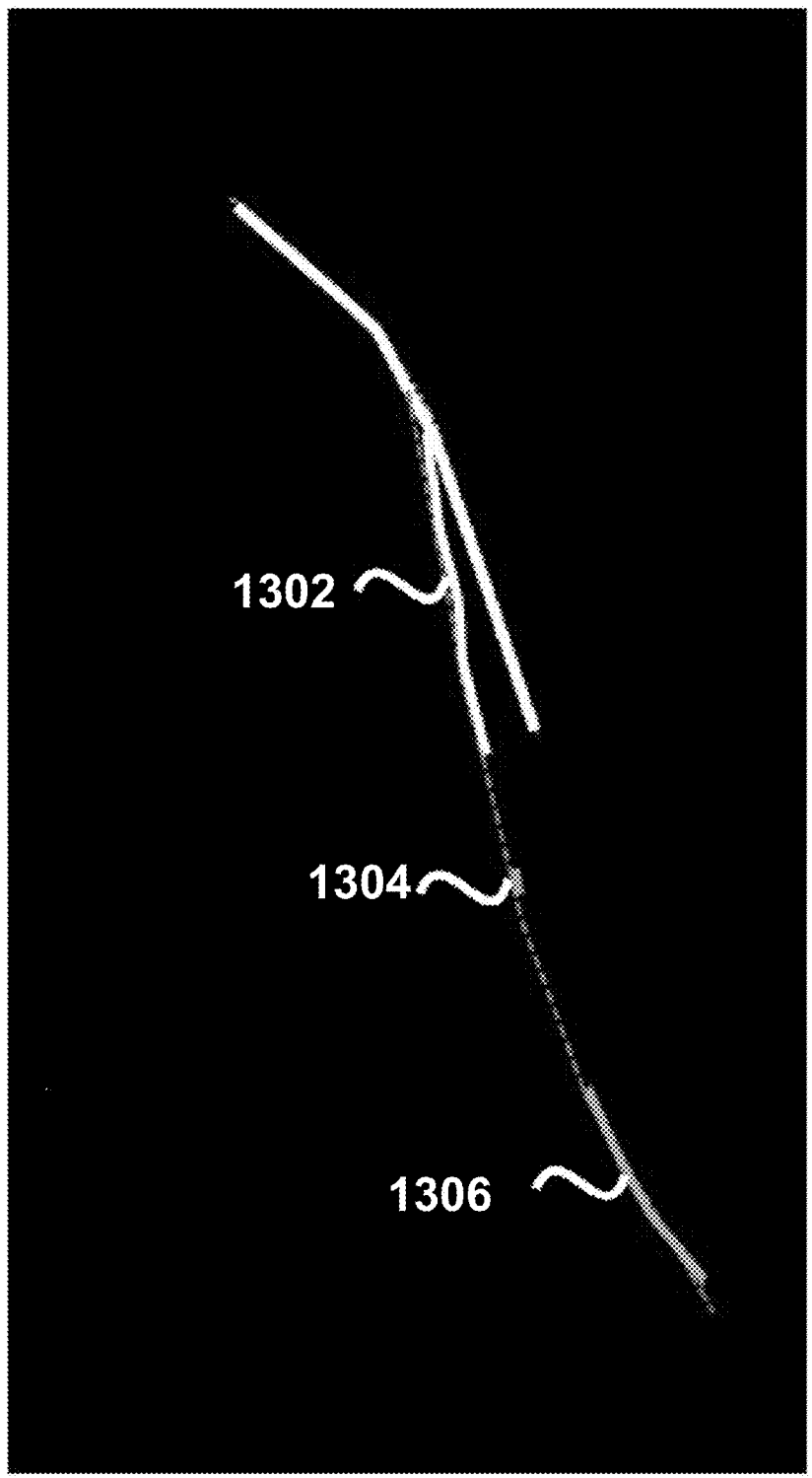
FIG. 13D graphically depicts a portion of a difference image with three separately detected wrinkle lines having a similar running average slope, according to an embodiment.
Figure 13E:
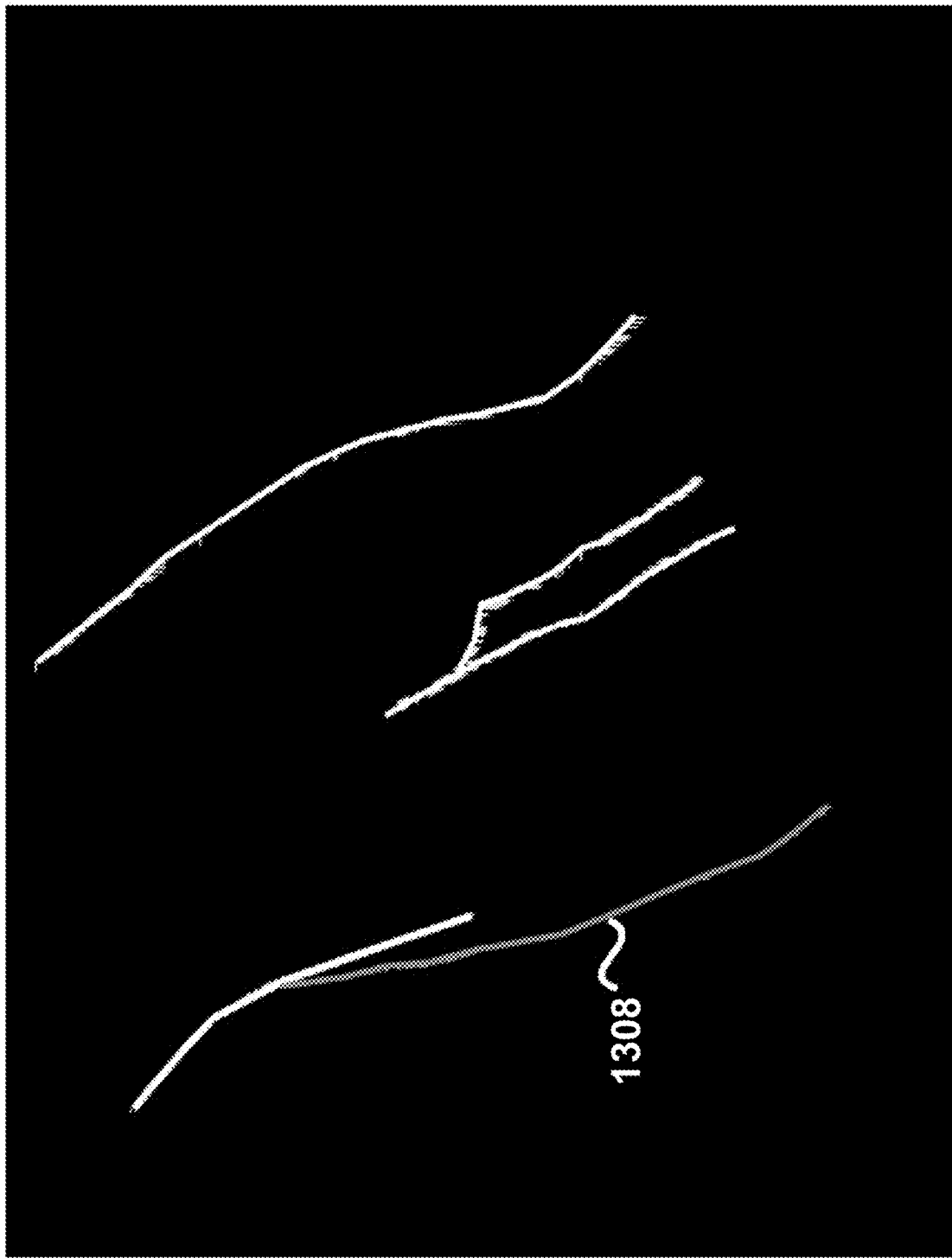
FIG. 13E graphically depicts a line formed by connecting the three lines of FIG. 13D, according to an embodiment.

In some cases, some wrinkle lines have a similar slope, and are running on the similar average line (even though they appear disconnected at first because the edge of the wrinkle detected may be separated by more than the radius distance). The algorithm may connect such lines together to make them belong to the same group. FIG. 13D shows three different wrinkle lines detected separately during a first pass of the algorithm, shown as lines 1302, 1304, and 1306, respectively. All the lines are located on the similar running average slope, meaning that they can belong to the same group. FIG. 13E shows reconnection of the three lines 1302, 1304, and 1306 from FIG. 13D as belonging to the same wrinkle group (shown on the left side of the figure as a single gray line 1308) for a final analysis and detection. FIG. 13C shows the type of connections made and a resulting pattern. Specifically, FIG. 13C shows a pattern made by connecting the pixels in a difference image of a label that was printed with a wrinkled ribbon and/or media. These white lines in the difference image can be analyzed and recorded in a verification report. Optionally, the printer can display a message or send a message to the host suggesting that the user adjust the ribbon and/or media.

In an embodiment, the algorithm can also perform a defect analysis, by having the printer either access a database of defects stored internally in the printer memory, or access an external database, such as a cloud database. The external database may be updated to include a history of printing issues that can be found over time. During the defect analysis, the algorithm may also assign a confidence level (CL) value indicating how certain it is in detecting the current issue, for example a wrinkle. A high CL value can be given when the defect detected matches one or more criteria in the wrinkle database. In case of lower CL value, one or more additional printed samples may be required before triggering an error message. Additionally, the database can be self-learning based on the number of occurrence and frequency of the ribbon wrinkle issue in order to define the root cause and best solution more accurately over time.

B. Void/Platen Roller Contamination Detection

Figure 14A:
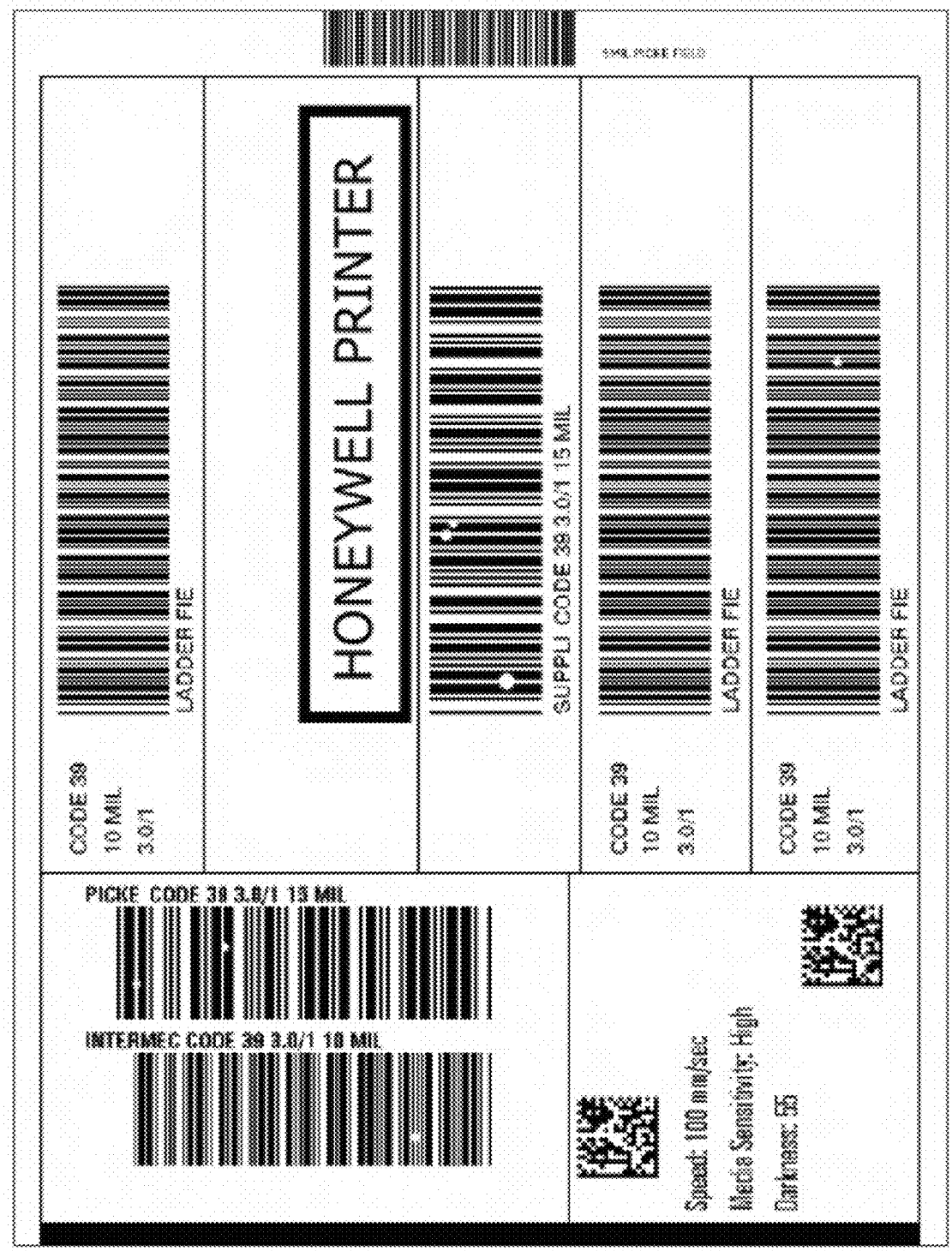
FIG. 14A graphically depicts a printed label having distortions caused by a contaminated platen roller.
Figure 14B:
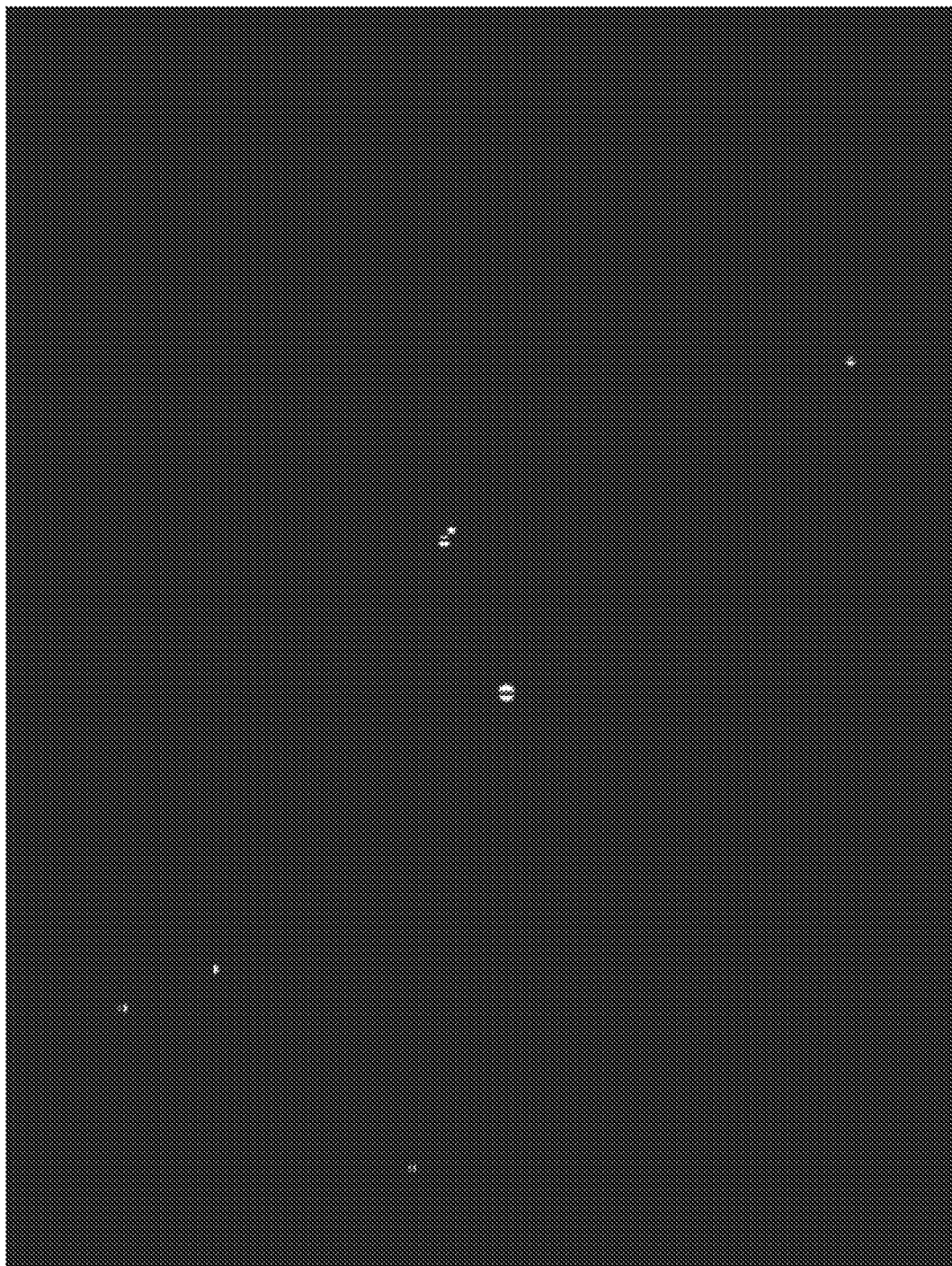
FIG. 14B graphically depicts a difference image of the label of FIG. 14A, according to an embodiment.
Figure 14C:
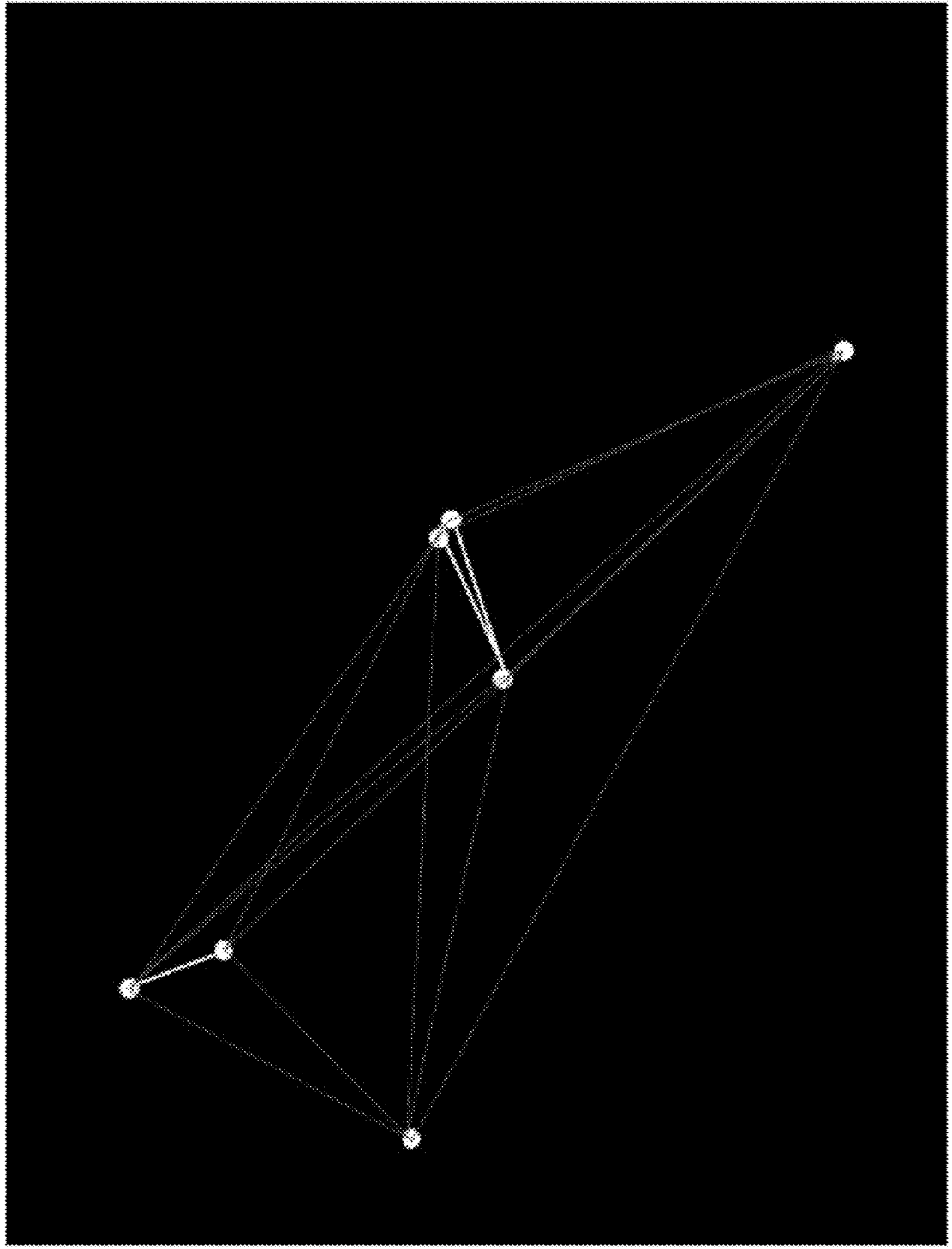
FIG. 14C graphically depicts a relationship between bright points in the difference image of FIG. 14B, according to an embodiment.

FIG. 14A shows a label printed with a platen roller contamination. FIG. 14B shows difference images produced for the label printed with a contaminated platen roller. FIG. 14C shows a relationship between the bright points of FIG. 14B.

By comparing a computer memory image to be printed to an actual image of the label, one can determine the difference between the intended and the final printed label. As a result, everything that was the same in the intended graphic and the image of the printed label can be shown in black because of a subtractive process. Where there is a difference, any imperfections can be rendered in a grayscale range where pure white can refer to a full mismatch in pixel comparison.

In an embodiment, an algorithm can be created to determine whether the images in FIGS. 14B and 14C were caused by platen roller contamination based on the bright points. A bright point caused by platen roller contamination may be defined as one or more areas of white whose total extent falls within a circular area (for example, an area of no more than 0.120 inches (36 pixels in a 300 dpi difference image)). If there is more than one bright point, then each other bright point has to be separated by at least a predetermined distance (for example 0.15 inches (or 45 pixels)). If there are three to six bright points, then no three bright points can lie on a straight line. If there are more than six bright points, then no group of five bright points can lie on a straight line. If these criteria are met, then the printed label can be deemed to have defects caused by a contaminated platen roller. After evaluation of the white points, a platen roller contamination remedy process can be executed.

In an embodiment, to highlight the bright pixels, the difference image may be analyzed using the following algorithm. Because each pixel has its own (x; y) coordinate, vectors between the pixels, their respective slopes, and an average distance between the pixels can be calculated. One can then connect each pixel (or group each cluster of pixels, in case of analyzing printing defects caused by dust, grit, etc., here referred to as "void analysis") depending on their proximity with their neighbors as well as the slope change from pixel to pixel, and the void space existing between the pixels.

In an embodiment, a connection algorithm can use the following pixel structure to analyze and group the pixels together during the analysis. Each pixel, noted "P," can have three states:

1. $P_{free}$: the pixel has not been utilized in the algorithm yet;
2. $P_{used}$: the pixel has been used and connected to another pixel;
3. $P_{bad}$: the pixel is a random dot with no near, usable neighbor pixel.

In addition, each pixel can be assigned a group (1, 2, 3 . . . ) representing the number of an individual void found. Hence a pixel can be defined in a structure with the following information: P{x; y; state; group}. The starting pixel P can be chosen based on P(min(x);min(y)). Its group can then be assigned to 1 and its state can be set to $P_{used}$.

To connect the pixels based on distance, a radius variable can be defined to help determine if a bright pixel belongs to the same group. The algorithm can first check if there is any pixel within the predetermined radius to connect to. If none are present then the pixel can be marked as $P_{bad}$, it is a random defect and should be ignored. For a pixel that has a neighbor within the vicinity, the algorithm can then check if there are still any pixels free. In this case, P can be connected to the nearest free pixel P'. Once the connection is done, P' can then be assigned the same group number as P, and its state can be changed to $P_{used}$. P' can become the new starting point, and the algorithm can then try to connect P' to the next nearest pixel to form a cluster of pixels marking the void. In the case that all nearest pixels are used, the algorithm can jump to:

$$P''(\max(x);\max(y)) \in P_{used}(P(group)),$$

and P'' can become a new starting point.

Figure 14D:
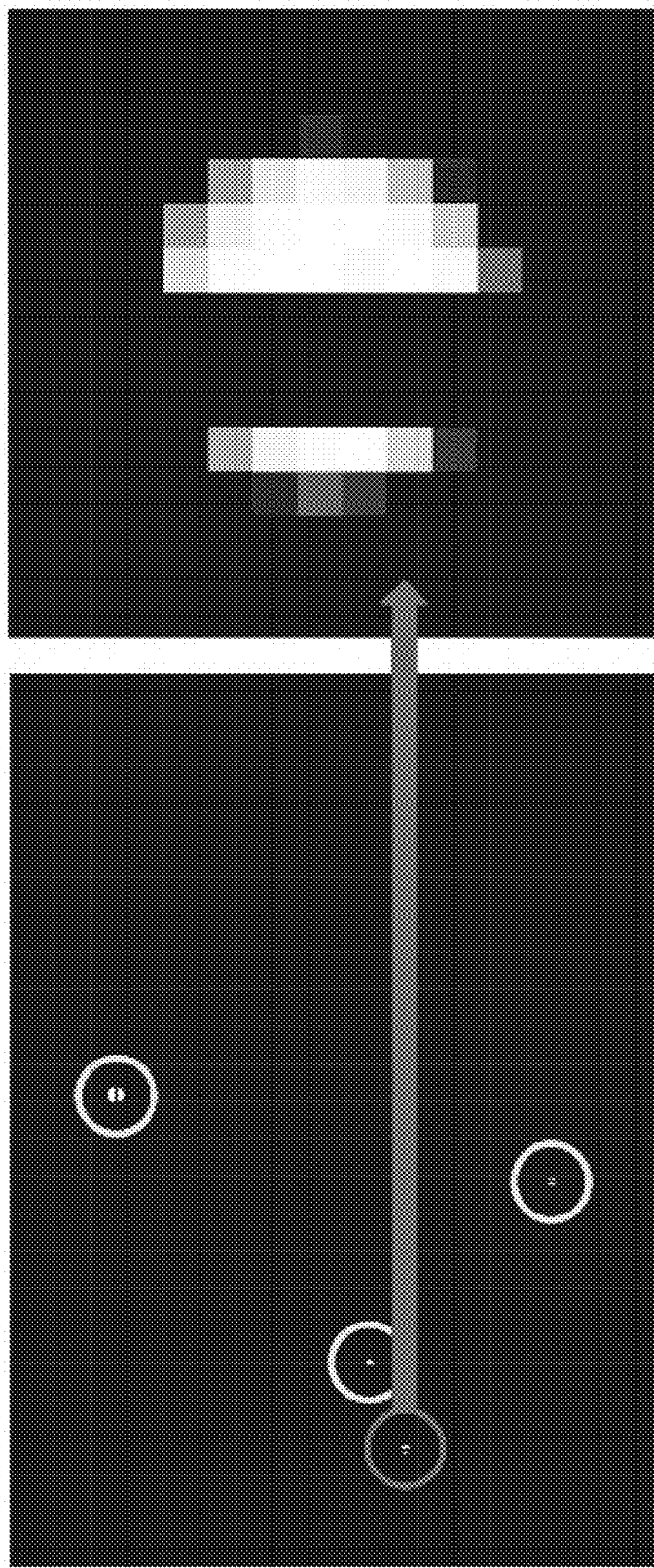
FIG. 14D graphically depicts a relationship between four different voids (left) and a zoomed-in image of one of the voids (right), according to an embodiment.

In the case where P'' has no more free neighbors (all marked $P_{used}$ within the predetermined radius), the algorithm can mark the end of a cluster for the current Void group. The algorithm can then move to the next $P_{free}$ pixel, increasing the group number by one to detect a new void mark. The algorithm can continue until there are no more free pixels; then the algorithm can end, as all or almost all voids have been detected. FIG. 14D highlights four different void groups made using the above algorithm (left) and a zoom on one of the voids (right), showing all the pixels belonging to the same void group.

In an embodiment, the algorithm can also perform a defect analysis by having the printer either access a database of defects stored internally in the printer memory, or access an external database, such as a cloud database. The external database may be updated to include a history of printing issues that can be found over time. During the defect analysis, the algorithm may also assign a confidence level (CL) value indicating how certain it is in detecting the current issue, for example a void. A high CL value can be given when the defect detected matches with different criteria of void detection when the comparison is performed with void database. In case of lower CL value, one or more additional printed samples may be required before triggering an error message. Additionally, the database can be self-learning based on the number of occurrence and frequency of the voiding issue, in order to define the root cause and best solution more accurately over time.

In an embodiment, an image processing method can include recognizing a void pattern. A void pattern can include following unique particularities: void points can be small, making the total ratio of bright spots in comparison black surface small; the groups of points indicating a void can be separated by distances much greater than the distances between individual void points. If any of these criteria are fulfilled, the method can ensure that the voids are detected.

Each group can be delimited by its own lowest pixel and highest pixel in the X, Y direction. Thus, a boundary can be made using P(min(x);min(y)) and P(max(x);max(y)) with both pixels belonging to the same Group j. Simple rectangular or circular boundaries can be formed.

In one embodiment, a method of checking for voids can include calculating the "ratio of coverage," where the surface covered by the void over the label surface can be calculated, followed by checking if it is lower than a predefined ratio "VoidCoefficient" to detect a void:

TotalVoidSurface/LabelSurface<VoidCoefficient

When this comparison is true, a void is detected.

In another embodiment, a method of checking for voids can include using the distance between each group, as the distance is likely to be rather large compared to a pixel/dot size. The algorithm can calculate the average distance between each group and compare it to a defined value "VoidDistance":

AverageDistanceBetweenGroups>VoidDistance

If the comparison is true, then a void is detected.

In an embodiment, the method can include determining if the void is caused by contamination on the platen roller or media. To determine if one or more void marks are due to contamination on the platen roller or the media, the algorithm can check for a repeat pattern. The platen roller has a fixed circumference, which means that the majority of the void marks caused by platen roller contamination will repeat at a fixed distance approximately equal to the platen roller circumference.

Figure 14E:
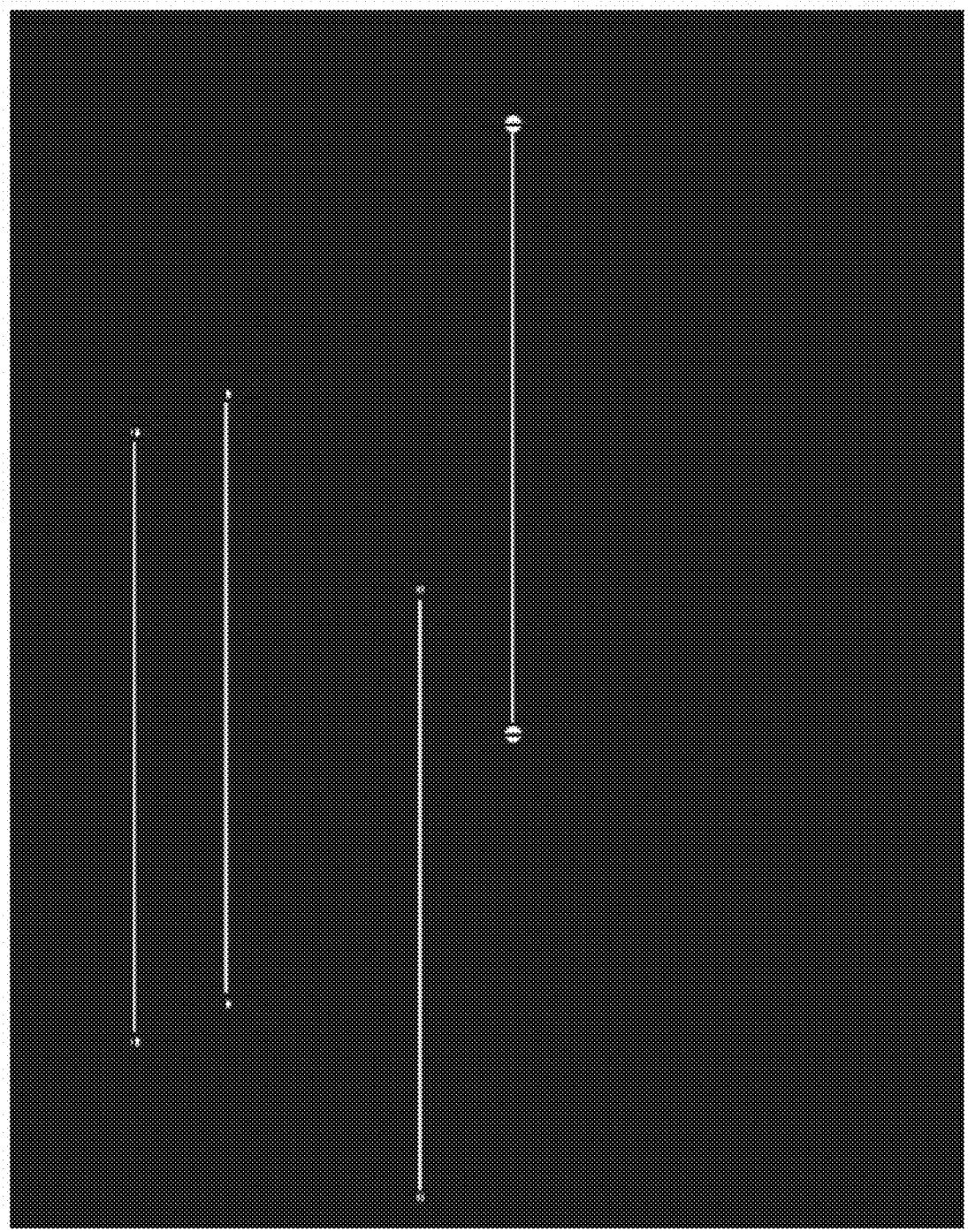
FIG. 14E graphically depicts repeated void marks on a label printed with a contaminated platen roller.

For a long label, the repeat void group can be on the same X-axis while separated by a fixed Y distance equal to the platen roller circumference, plus or minus a small margin for measurement error. FIG. 14E shows an example of repeating void marks due to platen roller contamination.

In an embodiment, once it is determined that a platen roller or the media is contaminated, a printer-verifier can communicate to the user or to the host system the nature and extent of the contamination. For instance, if two or three bright points are found, the printer can issue a low priority message to clean the platen roller at the next media change. If the label similar to the one shown in FIG. 14A is produced (which has at least six void areas), the printer can issue a "Stop Print" notification so the operator or maintenance team can address the problem immediately. Alternatively, a fully automated method can be installed in the printer such as one or more nozzles connected to a compressed air supply. When platen roller contamination is detected, a brief blast of compressed air in close proximity to the roller can be initiated. The following label can then be analyzed according to the method described herein to see if the voiding is reduced or eliminated. The process can be repeated, if necessary.

V. MULTIPLE DEFECTS DETECTION

Figure 15:
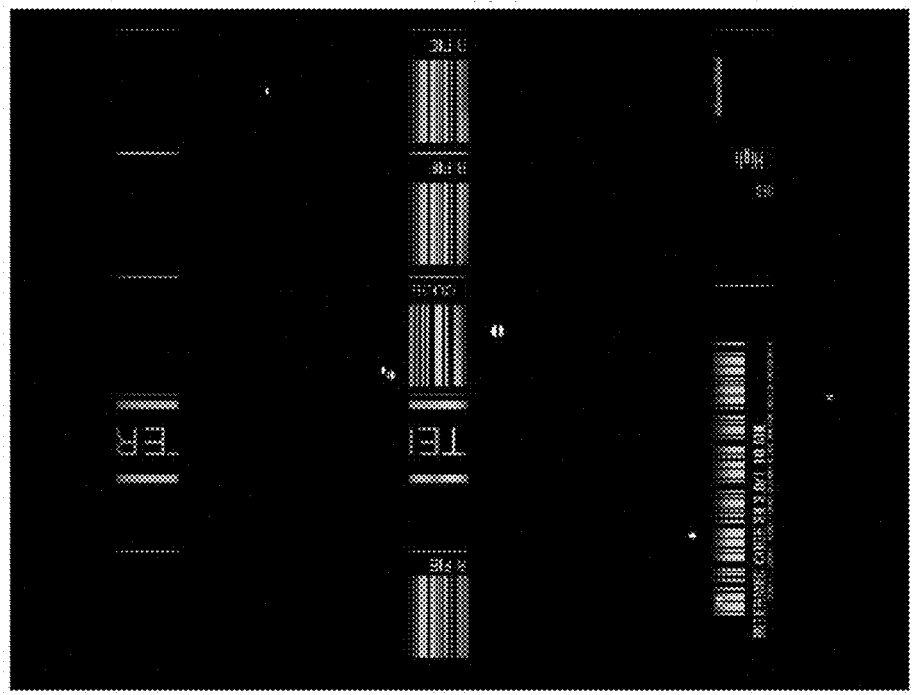
FIG. 15 depicts an example of a label printed with a combination of a void and banding defects.
Figure 15:
Figure 16:
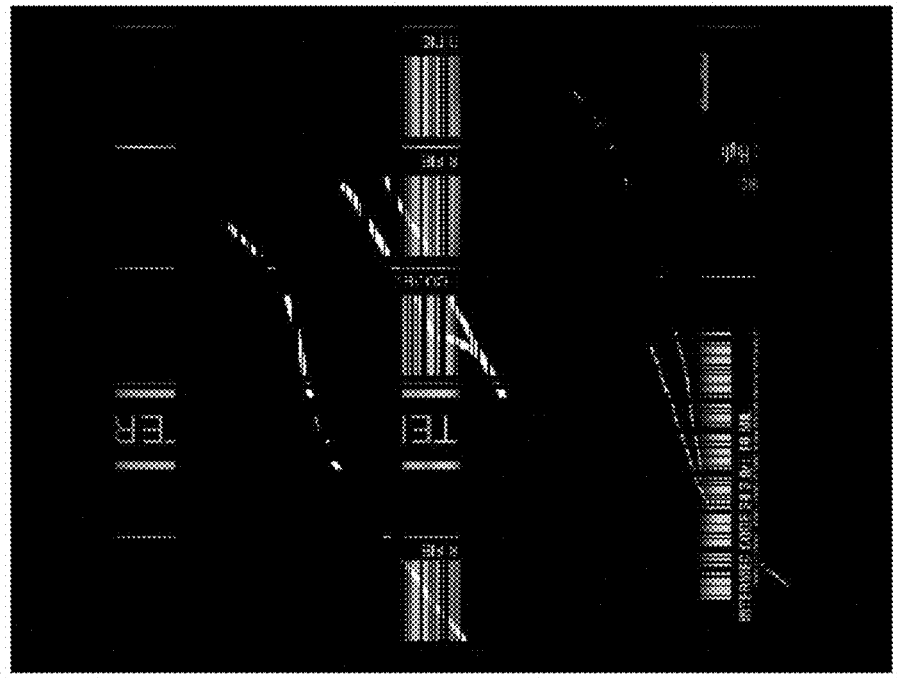
FIG. 16 depicts an example of a label printed with wrinkle and banding defects.
Figure 16:
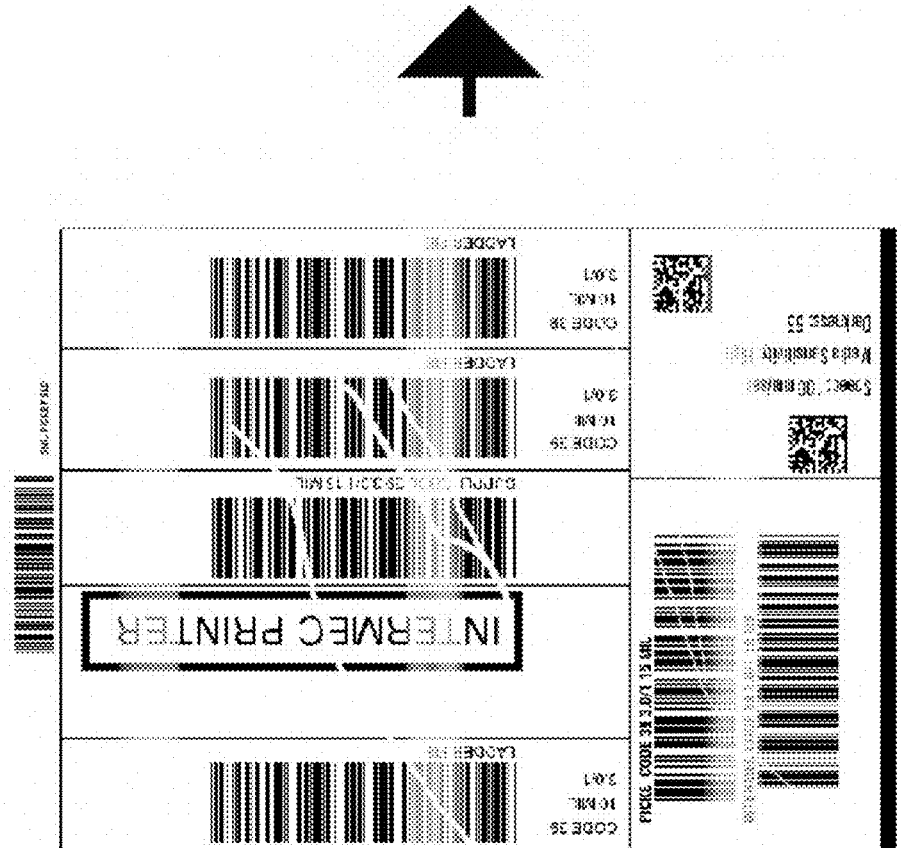

When more than one defect occurs within one label, refining the grouping is especially important. For example, a label printed with a combination of a void and banding defects is shown in FIG. 15. FIG. 16 shows a label printed with wrinkle and banding issues. Left-hand sides of FIGS. 15 and 16 display images of the labels, whereas right-hand sides show difference images obtained by comparing scanned images of those labels to corresponding reference images. In FIG. 16, areas of the defect overlap are marked with boxes in the difference image. In such areas, bright pixels can belong to both types of defect, and thus further refinement may be necessary.

Once the difference image is produced, one or more defect detection algorithms can be applied to detect printing defects of various types (such as ribbon wrinkle, banding, ink split, etc.) by producing rendered images, where bright pixels are assigned to corresponding defect groups. Such rendered images can then be overlapped and analyzed to determine if any bright pixels are common to more than one output image. When such pixels are found in two or more images, additional image processing methods can be used to refine, extract and reassign each pixel to its correct defect group.

Figure 17A:
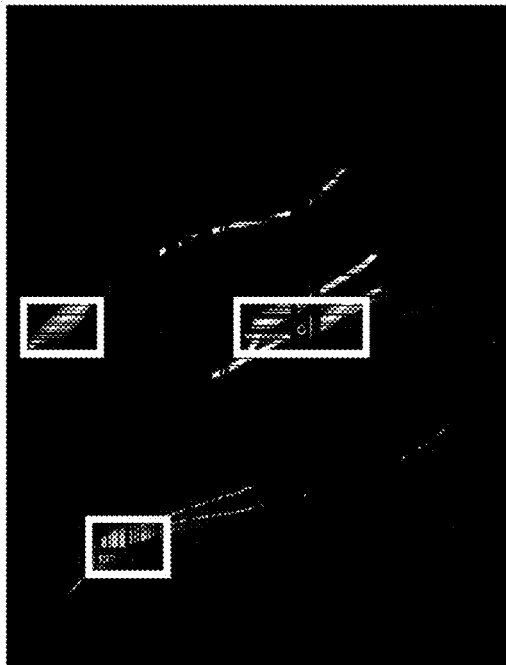
FIGS. 17A-17D depict an example of a label containing wrinkle and banding defects before and after refinement.
Figure 17B:
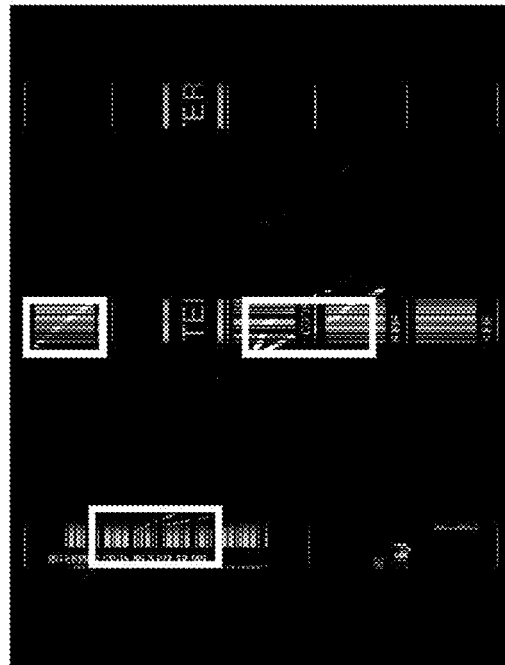
Figure 17C:
Figure 17D:
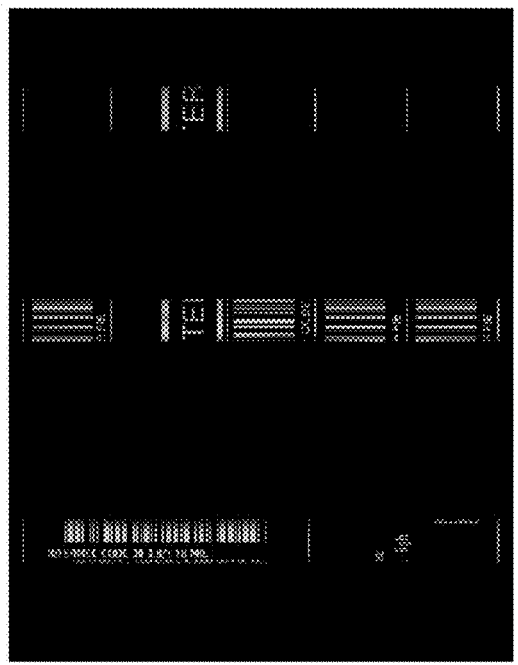

FIGS. 17A-17D show an example of a label containing wrinkle and banding defects before and after being refined by the algorithm. Specifically, FIG. 17A shows ribbon wrinkle analysis output when both wrinkle and banding issues are present. In FIG. 17A, outlined with the boxes are areas of incorrect detection before refining the group. FIG. 17B shows banding analysis output when both wrinkle and banding issue are present. In FIG. 17B, outlined with the boxes are areas of incorrect detection before refining the group. FIG. 17C shows refined wrinkle analysis with bright pixels belonging to the banding defect removed from the image. FIG. 17D shows refined banding analysis with bright pixels belonging to the wrinkle defect removed from the image.

Each refined group is assigned a Confidence Level value. The Confidence Level (CL) value aims to indicate how certain the system is in detecting an error. Using the refined data, the algorithm can calculate such values as a ratio of bright pixels over the total number of pixels of the entire scanned image as well as within each group. Based on the ratio value for each defect type, the algorithm can either use a look-up table to retrieve the Confidence Level value, or it can calculate it by using one or more formulas. A simplified flow is described below for an ease of understanding; more components can be taken into account to improve the confidence level calculation.

For example, each group found can contain at least the following information obtained from a corresponding refined image output: the x-coordinate of the leftmost pixel defined by Group.n(min(x)); the x-coordinate of the right-most pixel defined by Group.n(max(x)); the y-coordinate of the lower-most pixel defined by Group.n(min(y)); the y-coordinate of the upper-most pixel defined by Group.n(max(y)); the number of bright pixels within the group defined as Group.n(#bright pixels); and the surface area covered by the group in number of pixels, defined by:

Group.$n$TotalPix=Group.$n$(max($x$)−min($x$))×(max($y$)−min($y$)).

Figure 18:
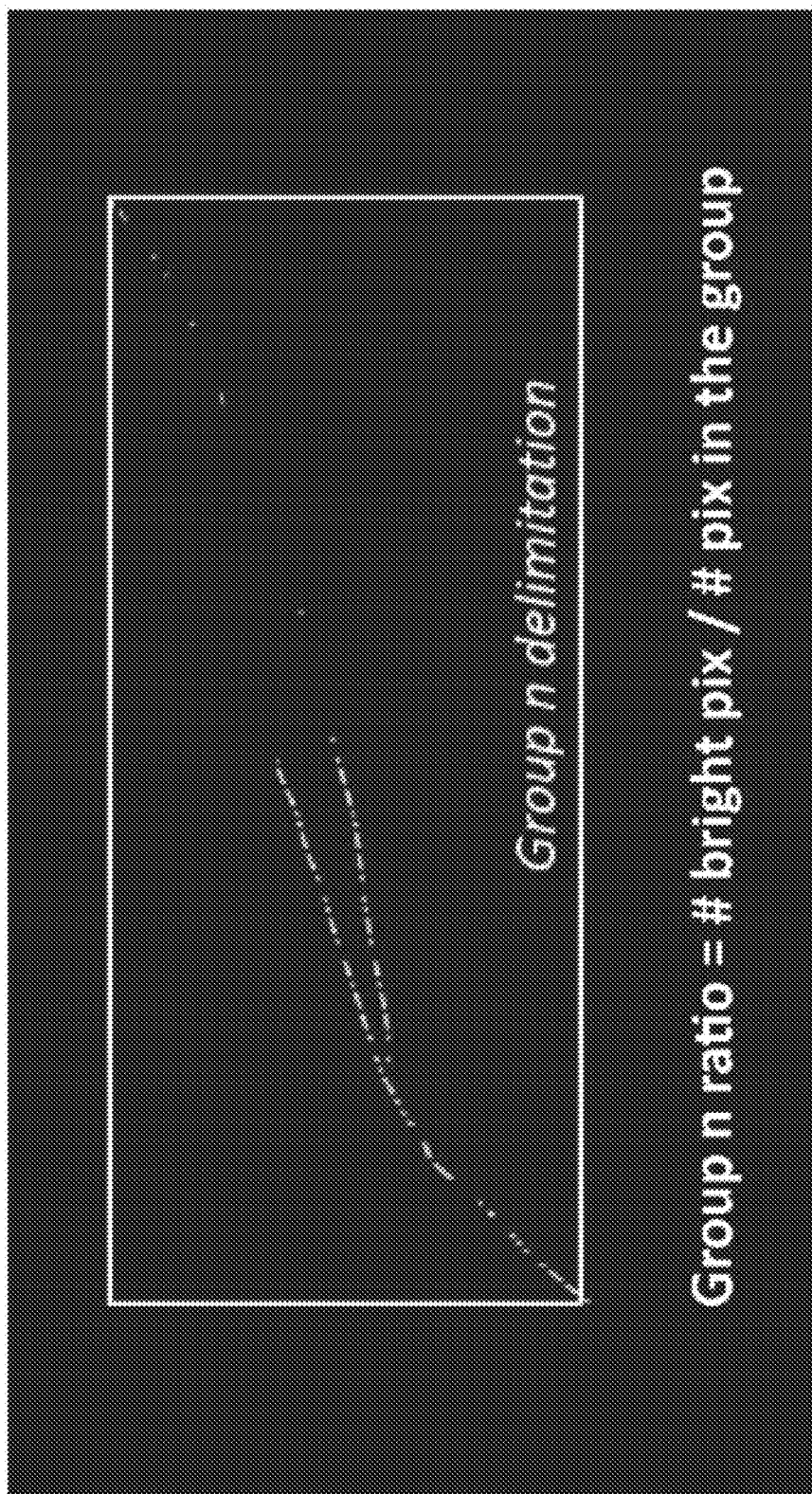
FIG. 18 depicts a group information data used for confidence level value calculation, according to an embodiment.

Using this information, the algorithm can calculate the ratio of bright pixels over total number of pixels in each group. For example, FIG. 18 shows a group information data used for calculating such ratio. The area is delimited by the top right and bottom left pixels, and is outlined with a box in the figure. The equation to determine the ratio:

$$\text{Group.}n_{W\% \, ratio} = \frac{\text{Group.}n(\# \text{ bright pixels})}{\text{Group.}nTotalPix}.$$

In addition to the ratio within a group, the algorithm can calculate the ratio of bright pixels over total number of pixels for the entire image:

$$Image_{W\% \, ratio} = \frac{\text{Image (\# bright pixels)}}{\text{Image (\# pixels)}},$$

where Image(#bright pixels)=$\Sigma_{i=1}^{k}$ Group.i(#bright pixels), with k being the number of group found in the picture. Additionally, further definition is possible:

Image(#pixels)=image.PixHeight×image.PixLength.

Several methods can be used to assign the Confidence Level values in the process of detecting visual print quality defects and identifying which defect is observed. For example, such methods can use the "image$_{W\%ratio}$" and/or the "Group.n$_{W\%ratio}$" to compare to predefined values, which may be stored in a look-up table. Table 1 shows a simplified example of the look-up table. The values listed in Table 1 are provided for illustrative purposes only.

TABLE 1

Confidence level values for various printing defect types.

| Image W % ratio, % | Confidence Level value | | | |
|---|---|---|---|---|
| | Void | Wrinkle | Ink Split | Banding |
| 0-3 | 60 | 1 | 1 | 0 |
| 3-5 | 85 | 14 | 5 | 0 |
| 5-15 | 15 | 67 | 17 | 0 |
| 15-25 | 3 | 19 | 65 | 1 |
| 25-30 | 0 | 3 | 74 | 4 |
| 30-45 | 0 | 0 | 27 | 19 |
| 45-70 | 0 | 0 | 0 | 73 |
| 70-90 | 0 | 0 | 0 | 54 |
| 90-100 | 0 | 0 | 0 | 12 |

For example, if the ratio found is 17% based on the refined image for the void detection, then the CL value is 3, indicating a low chance that void is present. However, if the ratio is 1%, the CL value jumps to 60, showing an above average probability that void type contamination is present in the label.

Alternatively or additionally, assigning confidence level value to various defect types can involve other calculations. For example, the following equation can be used:

$$CL = A \times e^{-\frac{1}{2} \times \frac{(imageBWratio - offset)^2}{spread^2}},$$

where values A, offset and spread are unique to each defect type, and can have either fixed or dynamic values.

In an embodiment, the algorithm can be configured to determine what type of action, warning or error message to trigger in order to alert the user and solve the issue, based on the current and/or past CL data.

In cases when the detected CL value is high, an error message may be triggered immediately. However, some printing defects may be progressive in nature, and exhibit a stronger effect over time. For example, when a platen roller is wearing out, at first the effect in creating banding is minimal, and it can be difficult to determine whether it is a true issue or not. To overcome this kind of uncertainty, the history algorithm can be configured to monitor how the Confidence Level value varies over time, and determine whether to activate an error correction sequence.

FIG. 19 shows an exemplary embodiment of the history algorithm 1900. Such a flow chart can be applied to each error type. For illustrative purposes, variables in the depicted flow chart do not identify the error type, although each variable can be unique to the error type, e.g., CL.n can refer to CL.n.void, CL.n.wrinkle, etc.

At step 1902, the history algorithm 1900 collects CL.n values for each defect type. At step 1904, the history algorithm 1900 calculates the CL Slope, which shows how fast the CL values changes from previous image to current image. At step 1906, the history algorithm 1900 determines whether the CL Slope exceeds a certain threshold.

When the CL Slope does not exceed the threshold at step 1906, the algorithm 1900 can then check if there is a trend of a negative CL slope. For example, the algorithm 1900 may calculate the total value of negative slope as shown at step 1908, and determine whether the total value of negative slope exceeds a threshold (noIssueCnt) at step 1910. If this is the case, the Total CL value for the current defect can be reset to 0 at step 1912, and the next sample is collected at step 1914. If no, there is no reset of the Total CL value.

When the CL slope exceeds the defined threshold at step 1906, the algorithm 1900 can then verify the slope value at step 1916. Based on the result of verification, the algorithm 1900 can increase the CL.Total value at steps 1918 and 1920, and may additionally increasing the total value of positive slope observed at step 1918.

At step 1922, the CL.Total value can then be checked to verify if the Total Confidence Level has reached an error threshold to trigger the alarm and/or initiate corrective actions. If the CL.Total value exceeds the error threshold, then the algorithm 1900 determines whether error type makes printout unreadable at step 1928. If so, then the algorithm 1900 triggers error warning at step 1926. If error type does not make printout unreadable, the algorithm 1900 further determines whether the total value of positive slope exceeds a threshold (RapidErrorCnt) at step 1930. If so, then the algorithm 1900 may trigger an error warning at step 1926. If not, the algorithm 1900 may proceed with collecting the next sample at step 1914.

At step 1922, if the CL.Total value is increasing slowly and steadily without reaching the error threshold, the algorithm 1900 examine whether the total value of positive slope exceeds a safety limit at step 1924. If so, the algorithm 1900 can notify the user and/or mark the issue as highly probable to occur on a future label to be printed at step 1926. If not, the algorithm 1900 may proceed with collecting the next sample at step 1914.

Through the history algorithm, the system can be configured to trigger a corrective or preventative action (such as alert or error message) when a certain visual defect type is detected. There are various actions that the printing system can be configured to take when a printing defect is detected. For instance, the printer can transmit a message over Wi-Fi, network, or by other means of communication, such as cellular wireless communication, sounds, and/or flashing lights to the IT department or other departments responsible for maintenance, such as quality control or inventory. A message can also be transmitted to the maintenance department to perform a maintenance process within a predetermined timeframe, such as the next hour for instance. Based on the type of the defect, the printer can also provide guidance on how to resolve the issue. Additionally or alternatively, a specially formatted printed label can notify the user to stop the print run and/or take one or more predetermined actions to address the detected issue. The algorithm may also include modifying the thermal management setting, while notifying the user/maintenance/IT.

Additionally, error detection feedback can be provided to an internal and/or external database, and/or an external storage unit such as a cloud database. The external cloud database can be updated based not only on local data of onset printer, but also include history of visual printing defect issues that can be found over time and over a wide range of printers at various locations. The database can be self-learning, and take into account the frequency of occurrence of each detected issue, to improve determination of the root cause and/or issue resolution in the future.

Using previously obtained data, the database can be configured to dynamically update various algorithms, such as the CL value assignment and/or calculation. For example, if, for a certain defect, the Confidence Level value always (or often) slowly increases, and it takes about 50 labels to reach the threshold, then after detecting this trend enough times, certain actions can be taken during its next occurrence, such as lowering the threshold or boosting up the confidence level value assigned to it, so that it takes only 15 labels to reach the trigger level in the future. Additionally, the algorithm can be configured to provide an improved output rendered image to facilitate future defect detection.

Figure 20:
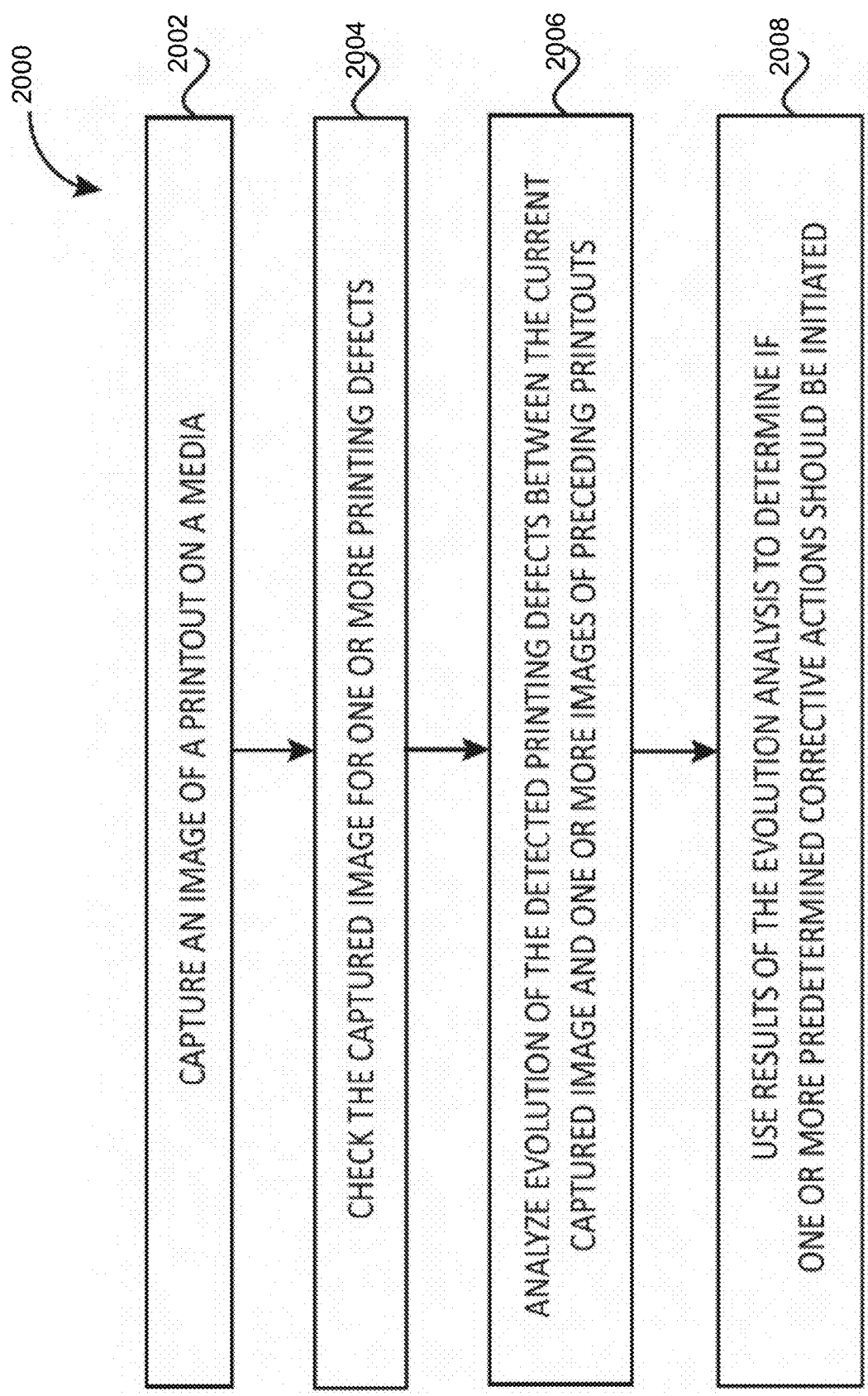
FIG. 20 schematically depicts a method for printing defect analysis, according to an embodiment.

FIG. 20 shows a method 2000 for printing defect analysis, according to an embodiment. At step 2002, an image of a printout on a media is captured. At step 2004, the captured image is checked for one or more printing defects. At step 2006, evolution of the detected printing defects between the current captured image and one or more images of preceding printouts is analyzed. At step 2008, results of the evolution analysis are used to determine if one or more predetermined corrective actions should be initiated.

In an embodiment, checking for printing defects at step 2004 can include generating and analyzing a difference image obtained by comparing the captured image to a reference image, and/or processing the captured image to detect printhead, platen roller and/or media contamination. Generating a difference image can include comparing a binary version of the captured image to a binary version of the reference image. Checking the captured image for one or more printing defects can include detecting at least one of ribbon wrinkles, printhead, platen roller and/or media contamination, black and/or white banding, and/or black and/or white ink split.

In an embodiment, analyzing evolution at step 2006 can include comparing one or more evolution characteristics (such as confidence level values) of the defects to a predetermined threshold. The method 2000 can further include verifying the one or more evolution characteristics when one or more characteristics are found to exceed the predetermined threshold, and determining if one or more predetermined corrective actions should be initiated. Additionally or alternatively, the method 2000 can further include initiating one or more predetermined corrective actions (such as preemptive maintenance) when the one or more evolution characteristics are slowly rising without exceeding the predetermined threshold. Initiating corrective actions can include (but are not limited to) triggering an alert, producing an error message, stopping printer operation, and/or prescribing a recommended course of action.

Additionally, the method 2000 can include providing feedback to a self-learning defect database. The provided feedback can then be used to dynamically update one or more algorithms for checking the image for printing defects, and/or for analyzing evolution of the detected defects. Capturing an image of a printout on a media at step 2002 can include scanning an image with a printer-verifier device.

VI. ADDITIONAL IMPLEMENTATION DETAILS

In the specification and figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments, unless indicated otherwise.

Various embodiments of the present invention may be implemented in a printer connected to a verifier, or a printer-verifier. The processor of the printer or the verifier may carry out steps of methods in accordance with various embodiments of the present invention.

Figure 21A:
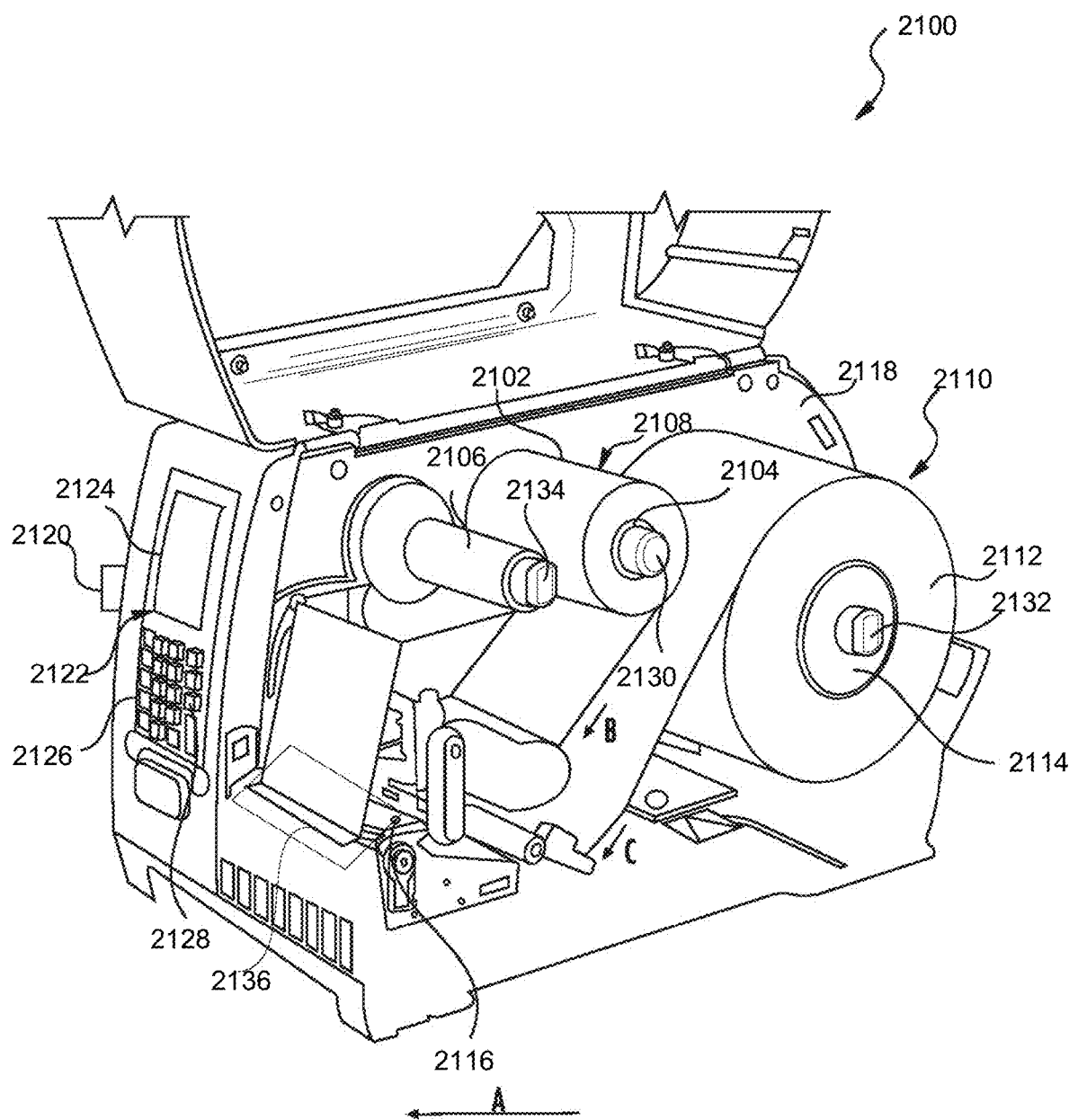
FIG. 21A graphically illustrates a portion of an exemplary printer-verifier (a cover of the printer-verifier is removed to illustrate an interior thereof), according to an embodiment.
Figure 21B:
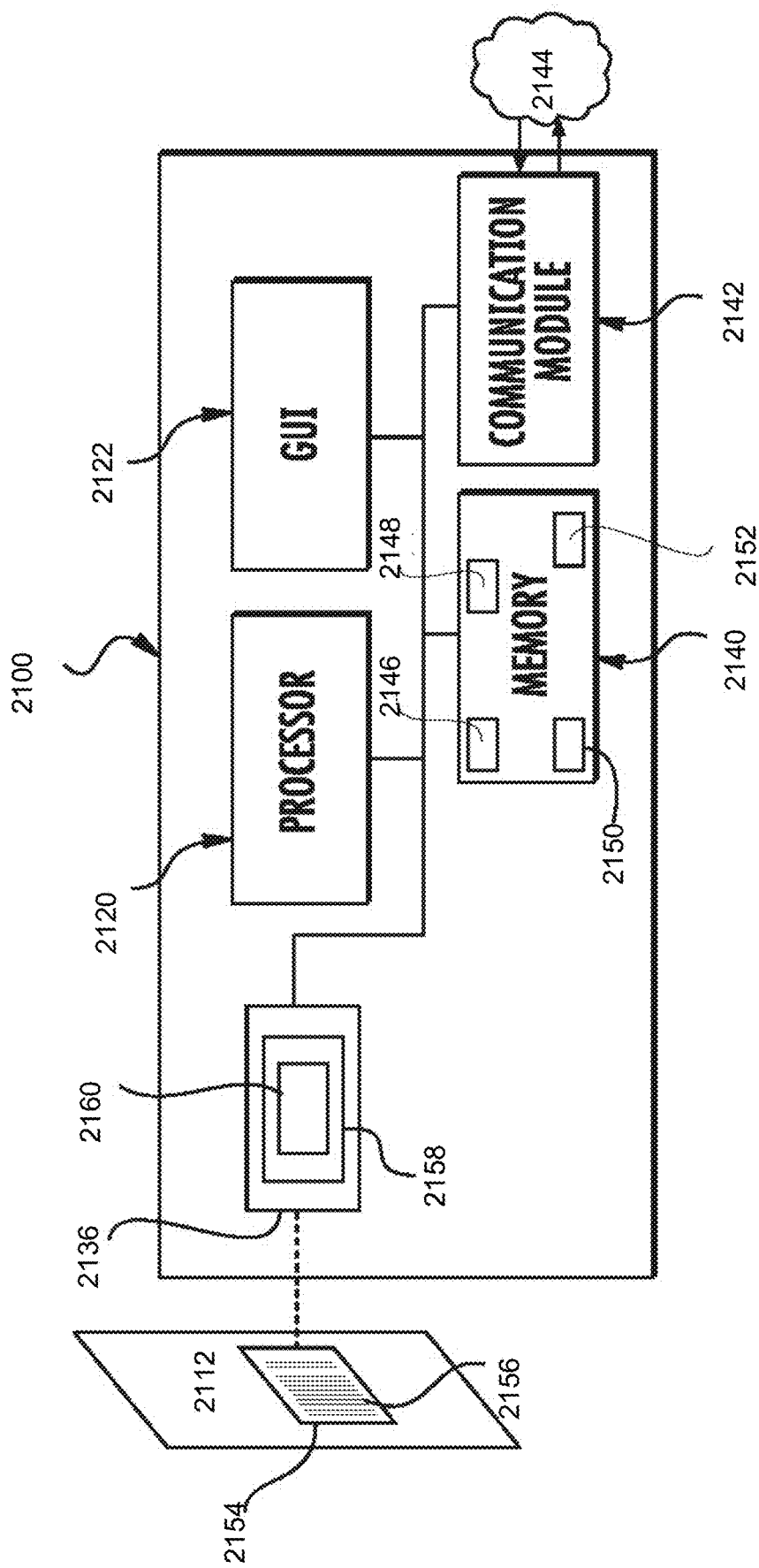
FIG. 21B schematically depicts a block diagram of the printer-verifier of FIG. 21A, according to an embodiment.

Referring now to FIGS. 21A-21B, an exemplary printer-verifier 2100 (printing mechanism) capable of printing on print media 2112 is partially shown. The depicted printer-verifier 2100 of FIG. 21A has a body 2118 for enclosing an interior thereof. The printer-verifier 2100 further comprises a power source and a moveable cover for accessing the interior and any components therein.

In various embodiments, the printer-verifier 2100 is a thermal transfer printer-verifier that includes a ribbon supply spindle 2130 contained within the body 2118. A ribbon supply roll 2108 is configured to be disposed on the ribbon supply spindle 2130. The ribbon supply roll 2108 comprises ink ribbon 2102 wound on a ribbon supply spool 2104. The ink ribbon supplies the media (e.g., ink) that transfers onto the print media. The printer-verifier 2100 may further comprise a thermal printhead 2116 utilized to thermally transfer a portion of ink from the ink ribbon 2102 to the print media 2112 as the ink ribbon is unwound from the ribbon supply spool 2104 along a ribbon path (arrow B in FIG. 21A), and the print media 2112 is unwound from a media supply spool 2114 along a media path (arrow C in FIG. 21A).

A media supply roll 2110 comprises the print media 2112 wound on the media supply spool 2114. A media supply spindle 2132 on which the media supply roll 2110 is configured to be disposed is contained within the body 2118. A ribbon rewind spindle 2134 on which unwound ribbon is wound up may also be contained within the body 2118. A ribbon take-up 2106 may be disposed on the ribbon rewind spindle 2134, although the ribbon take-up 2106 on the ribbon rewind spindle 2134 may not be necessary.

The printer-verifier 2100 may further comprise one or more motors for rotating the ribbon supply spindle 2130 and the ribbon supply roll 2108 disposed thereon (if present) in a forward (arrow A in FIG. 21A) or a backward rotational direction (dependent on the ink surface), for rotating the media supply roll 2110 disposed on the media supply spindle 2132 in a forward rotational direction, and for rotating the ribbon rewind spindle 2134. In a thermal direct printer-verifier, the ribbon supply spool, the ribbon rewind spool, and the ribbon may be eliminated and a thermally sensitive paper places the print media. These components are also included in a printer-verifier 2100 as described above.

The printer-verifier 2100 may include a GUI 2122 for communication between a user and the printer-verifier 2100. The GUI 2122 may be communicatively coupled to the other components of the printer-verifier for displaying visual and/or auditory information and receiving information from the user (e.g., typed, touched, spoken, etc.). As depicted in FIG. 21A, the body 2118 of the printer-verifier 2100 may include the GUI 2122 with, for example, a display 2124 and a keypad 2126 with function buttons 2128 that may be configured to perform various typical printing functions (e.g., cancel print job, advance print media, and the like) or be programmable for the execution of macros containing preset printing parameters for a particular type of print media. The graphical user interface (GUI) 2122 may be supplemented or replaced by other forms of data entry or printer control, such as a separate data entry and control module linked wirelessly or by a data cable operationally coupled to a computer, a router, or the like. The GUI 2122 may be operationally/communicatively coupled to a processor (CPU) 2120 for controlling the operation of the printer-verifier 2100, in addition to other functions. In some embodiments, the user interface may be other than depicted in FIG. 21A. In some embodiments, there may not be a user interface.

Referring now to FIG. 21B, an example block diagram of the printer-verifier 2100 is shown. The printer-verifier 2100 may comprise the processor 2120, a memory 2140 communicatively coupled to the processor 2120, and a power source. The printer may further comprise a communications module 2142 communicatively coupled to one or more of the other printer components.

The central processing unit (CPU) (i.e., the processor 2120) is the electronic circuitry within a computer that carries out the instructions of a computer program by performing the basic arithmetic, logical, control and input/output (I/O) operations specified by the instructions as described above. The printer-verifier 2100 may be communicatively connected using the communications module 2142 to a computer or a network 2144 via a wired or wireless data link. In a wireless configuration, the communications module 2142 may communicate with a host device over the network 2144 via a variety of communication protocols (e.g., WI-FI®, BLUETOOTH®), CDMA, TDMA, or GSM). In accordance with various embodiments of the present invention, the memory 2140 is configured to store a print quality verification program 2146, a reference image 2148, an offset value 2150, and a drifting offset value 2152 as described above.

Still referring to FIGS. 21A and 21B, an imaging module 2136 is disposed in the printer-verifier 2100 and is configured to capture a representation of the printed image (e.g., printed barcode 2154 on print medium 2112 within a field of view 2156), using an image sensor 2158 (i.e., the imaging module 2136 comprises the image sensor 2158) to obtain a captured image. The image sensor 2158 comprises a light source 2160 for illuminating the field of view. The image sensor 2158 uses an imaging lens (or lenses) to form a real image of the field of view 2156 on an array of photo sensors (e.g., a linear or 2D array CCD, CMOS sensor, etc.). Electronic signals from the photo sensors are used to create gray level or color images, which would result in a digital image similar to that which may be obtained by a digital camera. The processor 2120 is further configured to carry out steps of methods as described above in accordance with various embodiments of the present invention.

Figure 22:
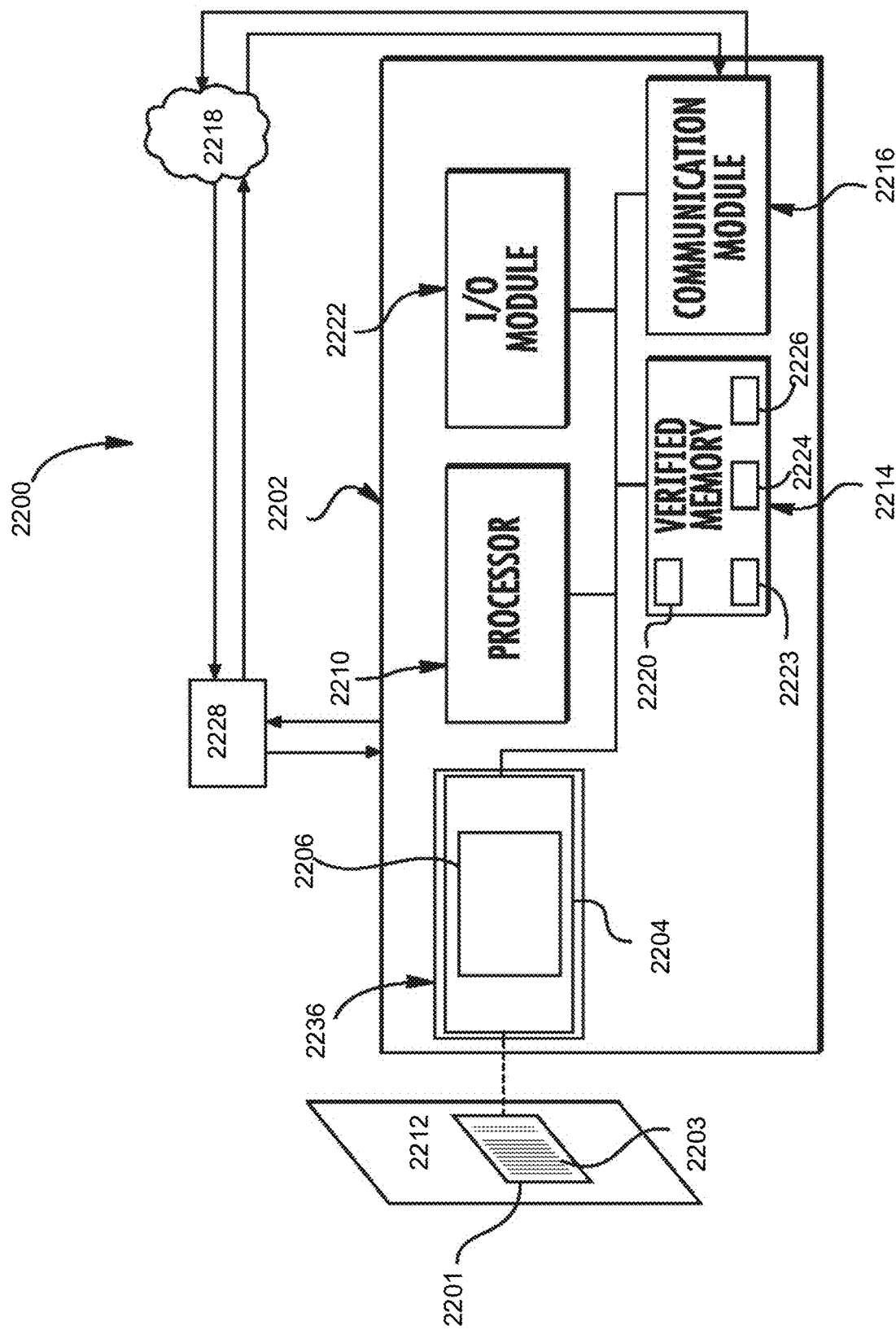
FIG. 22 schematically depicts an exemplary printer communicatively coupled to a verifier in a system for detecting printing defects, according to an embodiment.

Referring now to FIG. 22, an example printer 2228 (printing mechanism) communicatively coupled to verifier 2202 in system 2200 for printing an image and verifying a print quality of the image is shown. Printer 2228 may be similar to the printer-verifier 2100 depicted in FIGS. 21A-21B, except that the imaging module of the verifier is separated from the printer in system 2200.

Similar to the printer-verifier 2100 described above in connection with FIGS. 21A-21B, the printer 2228 may comprise a processor, a memory communicatively coupled to the processor, and a power source. The printer may further comprise a communications module communicatively coupled to one or more of the other printer components. The printer 2228 may have a fewer or greater number of components as described above.

The verifier 2202 comprises imaging module 2236, a memory (a verifier memory 2214) communicatively coupled to the imaging module 2236 and a central processing unit (CPU) (herein a "verifier processor" 2210) communicatively coupled to the verifier memory 2214 and imaging module 2236. The verifier 2202 may further comprise an I/O module 2222 and a verifier communication module 2216.

The subsystems in the verifier 2202 of FIG. 22 are electrically connected via a coupler (e.g., wires, traces, etc.) to form an interconnection subsystem. The interconnection system may include power buses or lines, data buses, instruction buses, address buses, etc., that allow operation of the modules/subsystems and the interaction there between. The I/O module 2222 may include a verifier graphical user interface. In various embodiments, the verifier 2202 may be communicatively connected using the verifier communication module 2216 to the computer or the network 2218 via a wired or wireless data link. In a wireless configuration for the wireless data link, the verifier communication module 2216 may communicate with a host device, such as the computer, or the network 2218, via a variety of communication protocols (e.g., WI-FI®, BLUETOOTH®, NFC®, RFID®), CDMA, TDMA, or GSM). The verifier memory 2214 may store a print quality verification program 2220, the reference image 2223, the offset 2224, and the drifting offset 2226.

While FIG. 22 depicts a verifier memory 2214 and a verifier processor 2210 in the verifier 2202, it is to be understood that only the printer 2228 or only the verifier 2202, or both the printer 2228 and verifier 2202 communicatively coupled thereto may comprise the memory and the processor for executing the steps as described above (i.e., at least one of the verifier and the printer comprises a memory communicatively coupled to the imaging module and a processor communicatively coupled to the imaging module and memory). The verifier 2202 that is attached to the printer may rely on the memory and the processor of printer for executing the steps as described above while the verifier 2202 that is a standalone device has its own verifier memory 2214 and verifier processor 2210 for executing the steps as described above. Additionally, or alternatively, the printer may rely on the verifier memory 2214 and the verifier processor 2210 of verifier 2202 attached to the printer for executing the steps as described above.

The imaging module 2236 disposed in verifier 2202 is configured to capture the representation of the printed image (e.g., the printed barcode 2201 on the print media 2212 in FIG. 22) within a field of view 2203, using the image sensor 2204 (i.e., the imaging module 2236 comprises the image sensor 2204). The image sensor 2204 comprises the light source 2206 for illuminating the field of view. The image sensor 2204 uses an imaging lens (or lenses) to form a real image of the field of view 2203 on an array of photo sensors (e.g., a linear or 2D array CCD, CMOS sensor, CIS device, etc.). Electronic signals from the photo sensors are used to create gray level or color images, e.g., which would result in a digital image that may be obtained by a digital camera.

While a thermal transfer printer-verifier and printer are described, it is to be understood that various embodiments of the present invention may be used in other types of printers (e.g., ink-drop printer, laser-toner printer, etc.).

VII. INCORPORATION BY REFERENCE

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Patent No. D702,237; U.S. Design Patent No. D716,285; U.S. Design Patent No. D723,560; U.S. Design Patent No. D730,357; U.S. Design Patent No. D730,901;U.S. Design Patent No. D730,902; U.S. Design Patent No. D734,339; U.S. Design Patent No. D737,321; U.S. Design Patent No. D754,205; U.S. Design Patent No. D754,206; U.S. Design Patent No. D757,009; U.S. Design Patent No. D760,719; U.S. Design Patent No. D762,604; U.S. Design Patent No. D766,244; U.S. Design Patent No. D777,166; U.S. Design Patent No. D771,631; U.S. Design Patent No. D783,601; U.S. Design Patent No. D785,617; U.S. Design Patent No. D785,636; U.S. Design Patent No. D790,505; U.S. Design Patent No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent
Application Publication No. 2014/0025584; U.S. Patent
Application Publication No. 2014/0034734; U.S. Patent
Application Publication No. 2014/0036848; U.S. Patent
Application Publication No. 2014/0039693; U.S. Patent
Application Publication No. 2014/0049120; U.S. Patent
Application Publication No. 2014/0049635; U.S. Patent
Application Publication No. 2014/0061306; U.S. Patent
Application Publication No. 2014/0063289; U.S. Patent
Application Publication No. 2014/0066136; U.S. Patent
Application Publication No. 2014/0067692; U.S. Patent
Application Publication No. 2014/0070005; U.S. Patent
Application Publication No. 2014/0071840; U.S. Patent
Application Publication No. 2014/0074746; U.S. Patent
Application Publication No. 2014/0076974; U.S. Patent
Application Publication No. 2014/0097249; U.S. Patent
Application Publication No. 2014/0098792; U.S. Patent
Application Publication No. 2014/0100813; U.S. Patent
Application Publication No. 2014/0103115; U.S. Patent
Application Publication No. 2014/0104413; U.S. Patent
Application Publication No. 2014/0104414; U.S. Patent
Application Publication No. 2014/0104416; U.S. Patent
Application Publication No. 2014/0106725; U.S. Patent
Application Publication No. 2014/0108010; U.S. Patent
Application Publication No. 2014/0108402; U.S. Patent
Application Publication No. 2014/0110485; U.S. Patent
Application Publication No. 2014/0125853; U.S. Patent
Application Publication No. 2014/0125999; U.S. Patent
Application Publication No. 2014/0129378; U.S. Patent
Application Publication No. 2014/0131443; U.S. Patent
Application Publication No. 2014/0133379; U.S. Patent
Application Publication No. 2014/0136208; U.S. Patent
Application Publication No. 2014/0140585; U.S. Patent
Application Publication No. 2014/0152882; U.S. Patent
Application Publication No. 2014/0158770; U.S. Patent
Application Publication No. 2014/0159869; U.S. Patent
Application Publication No. 2014/0166759; U.S. Patent
Application Publication No. 2014/0168787; U.S. Patent
Application Publication No. 2014/0175165; U.S. Patent
Application Publication No. 2014/0191684; U.S. Patent
Application Publication No. 2014/0191913; U.S. Patent
Application Publication No. 2014/0197304; U.S. Patent
Application Publication No. 2014/0214631; U.S. Patent
Application Publication No. 2014/0217166; U.S. Patent
Application Publication No. 2014/0231500; U.S. Patent
Application Publication No. 2014/0247315; U.S. Patent
Application Publication No. 2014/0263493; U.S. Patent
Application Publication No. 2014/0263645; U.S. Patent
Application Publication No. 2014/0270196; U.S. Patent
Application Publication No. 2014/0270229; U.S. Patent
Application Publication No. 2014/0278387; U.S. Patent
Application Publication No. 2014/0288933; U.S. Patent
Application Publication No. 2014/0297058; U.S. Patent
Application Publication No. 2014/0299665; U.S. Patent
Application Publication No. 2014/0332590; U.S. Patent
Application Publication No. 2014/0351317; U.S. Patent
Application Publication No. 2014/0362184; U.S. Patent
Application Publication No. 2014/0363015; U.S. Patent
Application Publication No. 2014/0369511; U.S. Patent
Application Publication No. 2014/0374483; U.S. Patent
Application Publication No. 2014/0374485; U.S. Patent
Application Publication No. 2015/0001301; U.S. Patent
Application Publication No. 2015/0001304; U.S. Patent
Application Publication No. 2015/0009338; U.S. Patent
Application Publication No. 2015/0014416; U.S. Patent
Application Publication No. 2015/0021397; U.S. Patent
Application Publication No. 2015/0028104; U.S. Patent
Application Publication No. 2015/0029002; U.S. Patent
Application Publication No. 2015/0032709; U.S. Patent
Application Publication No. 2015/0039309; U.S. Patent
Application Publication No. 2015/0039878; U.S. Patent
Application Publication No. 2015/0040378; U.S. Patent
Application Publication No. 2015/0049347; U.S. Patent
Application Publication No. 2015/0051992; U.S. Patent
Application Publication No. 2015/0053769; U.S. Patent
Application Publication No. 2015/0062366; U.S. Patent
Application Publication No. 2015/0063215; U.S. Patent
Application Publication No. 2015/0088522; U.S. Patent
Application Publication No. 2015/0096872; U.S. Patent
Application Publication No. 2015/0100196; U.S. Patent
Application Publication No. 2015/0102109; U.S. Patent
Application Publication No. 2015/0115035; U.S. Patent
Application Publication No. 2015/0127791; U.S. Patent
Application Publication No. 2015/0128116; U.S. Patent
Application Publication No. 2015/0133047; U.S. Patent
Application Publication No. 2015/0134470; U.S. Patent
Application Publication No. 2015/0136851; U.S. Patent
Application Publication No. 2015/0142492; U.S. Patent
Application Publication No. 2015/0144692; U.S. Patent
Application Publication No. 2015/0144698; U.S. Patent
Application Publication No. 2015/0149946; U.S. Patent
Application Publication No. 2015/0161429; U.S. Patent
Application Publication No. 2015/0178523; U.S. Patent
Application Publication No. 2015/0178537; U.S. Patent
Application Publication No. 2015/0178685; U.S. Patent
Application Publication No. 2015/0181109; U.S. Patent
Application Publication No. 2015/0199957; U.S. Patent
Application Publication No. 2015/0210199; U.S. Patent
Application Publication No. 2015/0212565; U.S. Patent
Application Publication No. 2015/0213647; U.S. Patent
Application Publication No. 2015/0220753; U.S. Patent
Application Publication No. 2015/0220901; U.S. Patent
Application Publication No. 2015/0227189; U.S. Patent
Application Publication No. 2015/0236984; U.S. Patent
Application Publication No. 2015/0239348; U.S. Patent
Application Publication No. 2015/0242658; U.S. Patent
Application Publication No. 2015/0248572; U.S. Patent
Application Publication No. 2015/0254485; U.S. Patent
Application Publication No. 2015/0261643; U.S. Patent
Application Publication No. 2015/0264624; U.S. Patent
Application Publication No. 2015/0268971; U.S. Patent
Application Publication No. 2015/0269402; U.S. Patent
Application Publication No. 2015/0288689; U.S. Patent
Application Publication No. 2015/0288896; U.S. Patent
Application Publication No. 2015/0310243; U.S. Patent
Application Publication No. 2015/0310244; U.S. Patent
Application Publication No. 2015/0310389; U.S. Patent
Application Publication No. 2015/0312780; U.S. Patent
Application Publication No. 2015/0327012; U.S. Patent
Application Publication No. 2016/0014251; U.S. Patent
Application Publication No. 2016/0025697; U.S. Patent
Application Publication No. 2016/0026838; U.S. Patent
Application Publication No. 2016/0026839; U.S. Patent
Application Publication No. 2016/0040982; U.S. Patent
Application Publication No. 2016/0042241; U.S. Patent
Application Publication No. 2016/0057230; U.S. Patent
Application Publication No. 2016/0062473; U.S. Patent
Application Publication No. 2016/0070944; U.S. Patent
Application Publication No. 2016/0092805; U.S. Patent
Application Publication No. 2016/0101936; U.S. Patent
Application Publication No. 2016/0104019; U.S. Patent
Application Publication No. 2016/0104274; U.S. Patent
Application Publication No. 2016/0109219; U.S. Patent
Application Publication No. 2016/0109220; U.S. Patent Application Publication No. 2016/0109224; U.S. Patent Application Publication No. 2016/0112631; U.S. Patent Application Publication No. 2016/0112643; U.S. Patent Application Publication No. 2016/0117627; U.S. Patent Application Publication No. 2016/0124516; U.S. Patent Application Publication No. 2016/0125217; U.S. Patent Application Publication No. 2016/0125342; U.S. Patent Application Publication No. 2016/0125873; U.S. Patent Application Publication No. 2016/0133253; U.S. Patent Application Publication No. 2016/0171597; U.S. Patent Application Publication No. 2016/0171666; U.S. Patent Application Publication No. 2016/0171720; U.S. Patent Application Publication No. 2016/0171775; U.S. Patent Application Publication No. 2016/0171777; U.S. Patent Application Publication No. 2016/0174674; U.S. Patent Application Publication No. 2016/0178479; U.S. Patent Application Publication No. 2016/0178685; U.S. Patent Application Publication No. 2016/0178707; U.S. Patent Application Publication No. 2016/0179132; U.S. Patent Application Publication No. 2016/0179143; U.S. Patent Application Publication No. 2016/0179368; U.S. Patent Application Publication No. 2016/0179378; U.S. Patent Application Publication No. 2016/0180130; U.S. Patent Application Publication No. 2016/0180133; U.S. Patent Application Publication No. 2016/0180136; U.S. Patent Application Publication No. 2016/0180594; U.S. Patent Application Publication No. 2016/0180663; U.S. Patent Application Publication No. 2016/0180678; U.S. Patent Application Publication No. 2016/0180713; U.S. Patent Application Publication No. 2016/0185136; U.S. Patent Application Publication No. 2016/0185291; U.S. Patent Application Publication No. 2016/0186926; U.S. Patent Application Publication No. 2016/0188861; U.S. Patent Application Publication No. 2016/0188939; U.S. Patent Application Publication No. 2016/0188940; U.S. Patent Application Publication No. 2016/0188941; U.S. Patent Application Publication No. 2016/0188942; U.S. Patent Application Publication No. 2016/0188943; U.S. Patent Application Publication No. 2016/0188944; U.S. Patent Application Publication No. 2016/0189076; U.S. Patent Application Publication No. 2016/0189087; U.S. Patent Application Publication No. 2016/0189088; U.S. Patent Application Publication No. 2016/0189092; U.S. Patent Application Publication No. 2016/0189284; U.S. Patent Application Publication No. 2016/0189288; U.S. Patent Application Publication No. 2016/0189366; U.S. Patent Application Publication No. 2016/0189443; U.S. Patent Application Publication No. 2016/0189447; U.S. Patent Application Publication No. 2016/0189489; U.S. Patent Application Publication No. 2016/0192051; U.S. Patent Application Publication No. 2016/0202951; U.S. Patent Application Publication No. 2016/0202958; U.S. Patent Application Publication No. 2016/0202959; U.S. Patent Application Publication No. 2016/0203021; U.S. Patent Application Publication No. 2016/0203429; U.S. Patent Application Publication No. 2016/0203797; U.S. Patent Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

The invention claimed is:

1. A method comprising:

capturing an image of printed content;

generating a difference image based on a comparison of the captured image of the printed content and a reference image, wherein the reference image correlates to the printed content;

analyzing the difference image to identify at least one bright point, wherein the at least one bright point corresponds to at least one defect in the printed content; and determining at least one cause for the at least one defect in the printed content based on at least one parameter associated with the at least one bright point, wherein the at least one cause for the at least one defect in the printed content comprises ribbon wrinkle, wherein the at least one cause for the at least one defect in the printed content is determined based on whether the at least one bright point lies on a line.

2. The method of claim 1 further comprising in response to determining that the at least one bright point is non-collinear, determining that the at least one defect in the printed content is caused by contaminated platen roller.

3. The method of claim 1 further comprising determining whether a bright point of the at least one bright point is within a predetermined distance from another bright point the at least one bright point.

4. The method of claim 3 further comprising, in response to determining that the bright point is within the predetermined distance of the other bright point, creating a cluster of bright points that includes the bright point and the other bright point.

5. The method of claim 4 further comprising determining whether the cluster of bright points is collinear based on attempting to connect three bright points in the cluster of bright points on a straight line.

6. The method of claim 5 further comprising in response to determining that the at least one bright point is collinear, determining that the at least one defect is caused by wrinkles on a ribbon.

7. The method of claim 5 further comprising connecting the at least one bright point to create the line.

8. The method of claim 7 further comprising determining a slope of the line and comparing the slope of the line with a predetermined angle.

9. The method of claim 8 further comprising detecting the cause of the at least one defect as wrinkles on a ribbon.

10. The method of claim 1, wherein the printed content includes a barcode symbol.

11. A printer-verifier apparatus comprising:

a verifier configured to:

capture an image of printed content;

generate a difference image based on a comparison of the captured image of the printed content and a reference image, wherein the reference image correlates to the printed content;

analyze the difference image to identify at least one bright point, wherein the at least one bright point corresponds to at least one defect in the printed content; and determining at least one cause for the at least one defect based on at least one parameter associated with the at least one bright point, wherein the at least one cause for the at least one defect in the printed content comprises ribbon wrinkle, wherein the at least one cause for the at least one defect in the printed content is determined based on whether the at least one bright point lies on a line.

12. The printer-verifier apparatus of claim 11, wherein the verifier is configured to, in response to determining that the at least one bright point is non-collinear, determine that the at least one defect in the printed content is caused by contaminated platen roller.

13. The printer-verifier apparatus of claim 11, wherein the verifier is further configured to determine whether a bright point of the at least one bright point is within a predetermined distance from another bright point the at least one bright point.

14. The printer-verifier apparatus of claim 13, wherein the verifier is further configured to: in response to determining that the bright point is within the predetermined distance of the other bright point, create a cluster of bright points that includes the bright point and the other bright point.

15. The printer-verifier apparatus of claim 14, wherein the verifier is further configured to determine whether the cluster of bright points is collinear based on attempting to connect three bright points in the cluster of bright points on a straight line.

16. The printer-verifier apparatus of claim 15, wherein the verifier is further configured to: in response to determining that the at least one bright point is collinear, determine that the at least one defect is caused by wrinkles on a ribbon.

17. The printer-verifier apparatus of claim 15, wherein the verifier is further configured to connect the at least one bright point to create the line.

18. The printer-verifier apparatus of claim 17, wherein the verifier is further configured to determine a slope of the line and compare the slope of the line with a predetermined angle, wherein the verifier is configured to detect the cause of the at least one defect as wrinkles on a ribbon based on the comparison of the slope of the line with the predetermined angle.

* * * * *